(12) United States Patent
Maeda

(10) Patent No.: US 7,274,841 B2
(45) Date of Patent: Sep. 25, 2007

(54) OPTICAL SIGNAL AMPLIFYING TRIODE AND OPTICAL SIGNAL TRANSFER METHOD, OPTICAL SIGNAL RELAY DEVICE, AND OPTICAL SIGNAL STORAGE DEVICE USING THE SAME

(75) Inventor: Yoshinobu Maeda, Yokkaichi (JP)

(73) Assignee: Japan Science and Technology Agency, Kawaguchi (JP)

( * ) Notice: Subject to any disclaimer, the term of this patent is extended or adjusted under 35 U.S.C. 154(b) by 118 days.

(21) Appl. No.: 10/532,422

(22) PCT Filed: Sep. 19, 2003

(86) PCT No.: PCT/JP03/11961

§ 371 (c)(1),
(2), (4) Date: Jul. 22, 2005

(87) PCT Pub. No.: WO2004/038492

PCT Pub. Date: May 6, 2004

(65) Prior Publication Data

US 2006/0008203 A1    Jan. 12, 2006

(30) Foreign Application Priority Data

Oct. 23, 2002 (JP) ............................ 2002-308946
Mar. 6, 2003 (JP) ............................ 2003-059382
Aug. 6, 2003 (JP) ............................ 2003-287576

(51) Int. Cl.
*G02B 6/28* (2006.01)
(52) U.S. Cl. ......................................... 385/24; 385/15
(58) Field of Classification Search .................... None
See application file for complete search history.

(56) References Cited

U.S. PATENT DOCUMENTS 5,264,960 A    11/1993    Glance (Continued)

FOREIGN PATENT DOCUMENTS

JP    A-09-074245    3/1997

(Continued)

OTHER PUBLICATIONS

Shieh et al., "A Wavelength-Routing Node Using Multifunctional Semiconductor Optical Amplifiers and Multiple-Pilot-Tone-Coded Subcarrier Control Headers," IEEE Photonics Technology Letters, vol. 9, No. 9, Sep. 1997, pp. 1268-1270.

(Continued)

*Primary Examiner*—Sung Pak
(74) *Attorney, Agent, or Firm*—Oliff & Berridge, PLC

(57) ABSTRACT

When in an optical signal amplifying triode 10, light of a second wavelength $\lambda_2$, selected from among light from a first optical amplifier 26, into which a first input light $L_1$ of a first wavelength $\lambda_1$ and a second input light $L_2$ of second wavelength $\lambda_2$ have been input, and a third input light (control light) $L_3$ of a third wavelength $\lambda_3$ are input into a second optical amplifier 34, an output light $L_4$ of the third wavelength $\lambda_3$, selected from among the light output from the second optical amplifier 34, is light that is modulated in response to the intensity variation of one or both of the first input light $L_1$ of the first wavelength $\lambda_1$ and the third input light $L_3$ of the third wavelength $\lambda_3$ and is an amplified signal, with which the signal gain with respect to the third input light (control light) $L_3$ of the third wavelength $\lambda_3$ is of a magnitude of 2 or more. An optical signal amplifying triode 10, which can directly perform an optical signal amplification process using control input light, can thus be provided.

8 Claims, 30 Drawing Sheets

U.S. PATENT DOCUMENTS

| | | |
|---|---|---|
| 6,810,407 B1 | 10/2004 | Jaques et al. |
| 7,130,109 B2 * | 10/2006 | Maeda ..................... 359/337 |
| 2002/0145776 A1 | 10/2002 | Chow et al. |
| 2002/0181831 A1 | 12/2002 | Myers et al. |

FOREIGN PATENT DOCUMENTS

| | | |
|---|---|---|
| JP | A-2001-264825 | 9/2001 |
| JP | A-2002-098931 | 4/2002 |
| JP | A-2002-262319 | 9/2002 |
| JP | A-2003-005240 | 1/2003 |
| WO | WO 02/061502 A1 | 8/2002 |

OTHER PUBLICATIONS

Tanaka et al., "Optical Label Switching Using Optical Label Based on Wavelength and Pilot Tone Frequency," IEICE Trans. Commun., vol. E84-B, No. 5, May 2001, pp. 1127-1134.

Xin-Liang et al., "A Novel Scheme for XGM Wavelength Conversion Based on Single-Port-Coupled SOA," 2001 Chin. Phys. Soc. and IOP Publishing Ltd., vol. 10, No. 2, Feb. 2001, pp. 124-127.

Chelles et al., "Extinction Ratio of Cross-Gain Modulated Multistage Wavelength Converters: Model and Experiments," *IEEE Photonics Technology Letters*, vol. 9, No. 6, pp. 758-760, Jun. 1997.

Maeda et al., "All-Optical Triode Based on a Tandem Wavelength Converter Using Reflective Semiconductor Optical Amplifiers," *IEEE Photonics Technology Letters*, vol. 15, No. 2, pp. 257-259, Feb. 2003.

Maeda, "All-Optical Triode Using Dual-Stage Wavelength Converter in Erbium-Doped Fiber Amplifiers," *Jpn. J. Appl. Phys.*, vol. 41, Part 1, No. 7B, pp. 4828-4830, Jul. 2002.

* cited by examiner

OPTICAL SIGNAL AMPLIFYING TRIODE AND OPTICAL SIGNAL TRANSFER METHOD, OPTICAL SIGNAL RELAY DEVICE, AND OPTICAL SIGNAL STORAGE DEVICE USING THE SAME

TECHNICAL FIELD

This invention concerns (a) an optical signal amplifying triode that amplifies, controls, or switches optical signals, particularly an optical signal amplifier favorable for optical communication, optical image processing, optical computers, optical measurements, optical integrated circuits and other optoelectronic applications enabling advanced information processing, (b) an optical signal transfer method and an optical signal relay device for transferring optical signals, which have been propagated via an optical fiber or other predetermined transmission path, to other transmission paths indicated by routing information included in the optical signals, and (c) an optical signal storage device that stores optical signals, which have been propagated via an optical fiber or other predetermined transmission path, and enables the optical signals to be taken out at any arbitrary time.

BACKGROUND ART

Wide deployment of moving image communication, video distribution, and other new broadband services, using optical fiber communication that enables broadband and high-speed transmission, is anticipated. However, a functional (signal amplification) element, which, for example, corresponds to a triode transistor in electronics, that is, an optical functional element that performs signal amplification of optical signals by direct control by other optical signals has not been realized as of yet.

Thus presently, optical signals that have been transmitted at high speed are converted once into electrical signals, which are then subject to information processing in an electronic circuit, and the processed signals are converted back into and transmitted as optical signals. A limit is thus placed in the speed of signal processing due to the inability to directly control light by light. It is said that if signal processing can be performed on optical signals as they are, parallel processing will be enabled and further shortening of the processing time can be anticipated.

In this regard, the devices described in Document 1 or Document 2 are simply devices that switch light, in other words, gate switching devices that make use of wavelength conversion by Mach-Zehnder optical interferometry, and these devices had problems of being weak against temperature change and vibration and being strict in terms of setting conditions. Such conventional arts do not disclose anything in regard to arranging an optical signal amplifying triode, which, like a transistor in an electronic circuit, is equipped with a function of using input light as control light to obtain signal-amplified output light.

In the field of optical communication enabling broadband, high-speed, and high-capacity signal transmission, it is anticipated that communication, transfer, and distribution of optical signals be performed without degradation of the properties of high speed and high capacity. For an optical network based on wavelength division multiplexing (WDM), which is predicted to be constructed in the relatively near future, an optical signal transfer (optical signal relaying) art, of transferring wavelength division multiplexed optical signals, which are a plurality of types of laser light differing in wavelength and which have been transmitted from one optical transmission path, to desired optical transmission paths according to wavelength, will be important. In optical signal transfer for transferring an optical signal train (for example, a packet signal) that has been propagated via an optical fiber or other predetermined transmission path (for example, a wavelength bus) to other transmission paths indicated by labels, tags, or other routing information attached to the optical signal train, that is for example, in routing within an optical network or among optical networks, the high-capacity and high-speed characteristics of optical signal transmission must not be degraded and routers, that is, optical signal relay (transfer) devices are required to perform transfer processes at high-speed, be high in reliability, and be compact.

An optical path cross-connection device, such as that described in Document 3, has been proposed for this purpose. This device is equipped with a wavelength splitter, which splits a wavelength bus for wavelength multiplex transmission link into N wavelength group buses of G wavelengths each, and a routing processor, which executes a routing process on each of the wavelength groups split by the wavelength splitter, and is thus arranged to perform the routing process according to wavelength group. The routing processor of this optical path cross-connection device comprises a wavelength converter, which performs wavelength conversion according to each wavelength group, and an optical matrix switch, which distributes the wavelength-converted light and is controlled by a controller. This optical matrix switch is arranged with a mechanically-operated reflecting mirror switch that is positioned at the intersection of matrix-like optical paths and is alternatively operated by the controller to make one wavelength group, among the plurality of wavelength groups, be reflected by the reflecting mirror switch and thereby be output to a desired transmission path (paragraph 0042, FIG. 10(1)), or has an optical switch, which is alternatively operated by the controller, and mesh wiring and is arranged to make one wavelength group, among the plurality of wavelength groups, be transmitted by the optical switch and thereby be output to one transmission path inside the mesh wiring (paragraph 0043, FIG. 10(2)).

However, with the above-described conventional optical path cross-connection device, since the routing process is performed by the reflecting mirror switch or the optical switch, the operation of which is controlled by the controller, the switching operation of the reflecting mirror switch or the optical switch is performed in accordance with a command signal, which indicates the routing destination (destination) and is an output that is electronically processed at the controller. A portion of the optical signal thus had to be converted to an electrical signal, the destination information contained in the electrical signal, that is, a transfer-related signal included in a label or tag of a packet had to be extracted, and the optical signal had to transferred upon electrically controlling the operation of the reflecting mirror switch or the optical switch in accordance with the transfer-related signal. Thus, an adequate response speed could not be obtained. Also besides the above-described routing processor, since a wavelength converter, for performing wavelength conversion in accordance with the wavelength of the transmission path (wavelength bus) of the transfer destination, is equipped, and such a wavelength converter is disposed in addition to the routing processor, the device became large and in some cases, especially when a mechanically operated reflecting mirror switch is used, reliability could not be obtained.

Furthermore, in the field of optical communication enabling broadband, high-speed, and high-capacity signal transmission, it is anticipated that the identification, multiplexing and splitting, switching, and routing (transfer, distribution) of optical signals (optical data, such as packet signals) be performed without degrading the characteristics of broadband, high speed, and high capacity. In this field of optics, optical signal storage devices, which enable temporary storage and take-out at desired timings of optical signals, are generally demanded for optical signal processing systems that process optical signals and are represented, for example, by photonic router systems. This is because, just as memories are essential in signal processing in the field of electronics, optical signal storage devices, referred to as optical memories or optical buffers, are essential in the field of optical signal processing.

In this regard, optical memory devices, such as that described in Patent Document 1, have been proposed. With this device, a plurality of optical waveguide means 105 to 108, respectively arranged from optical fibers of different length in order to provide a plurality of types of delay times, are prepared, and arrangements to pass an optical signal through any of optical waveguide means 105 to 108 and enable storage of the optical signal by just the delay time corresponding to the propagation time in the corresponding optical waveguide means among optical waveguide means 105 to 108.

However, with this conventional optical memory device, the storage time of an optical signal is only determined in advance by the delay time corresponding to the propagation time in the optical waveguide means among optical waveguide means 105 to 108 through which the optical signal is made to propagate and the optical signal thus cannot be taken out at a desired timing. The degree of freedom of optical signal processing was thus limited and lowering of signal processing efficiency could not be avoided.

[Document 1] K. E. Stubkjaer, "Semiconductor optical amplifier-based all-optical gates for high-speed optical processing," IEEE J. Quantum Electron., vol. 6, no. 6, pp. 1428-1435, November/December 2000.

[Document 2] T. Durhuus, C. Joergensen, B. Mikkelsen, R. J. S. Pedersen, and A. E. Stubkjaer, "All optical wavelength conversion by SOAs in a Mach-Zehnder configuration," IEEE Photon. Technol. Lett., vol. 6, pp. 53-55, January 1994.

[Document 3] Japanese Published Unexamined Patent Application No. 2002-262319

[Document 4] Japanese Published Unexamined Patent Application No. Hei 8-204718

This invention has been made with the above circumstances as a background, and a first object thereof is to provide an optical signal amplifying triode that can perform an amplification process directly on optical signals by using control light. A second object is to provide an optical signal transfer method and an optical signal relay device, with which the routing of optical signals can be processed at high speed or by a compact device. A third object is to provide an optical signal storage device that enables storage of optical signals and taking out of the optical signals at an arbitrary time.

Upon carrying out various examinations with the above circumstances as the background, the present inventor found that in an optical amplifier, such as a semiconductor optical amplifier, a rare-earth-element-doped fiber amp, etc., spontaneously emitted light of peripheral wavelengths of an input light of a predetermined wavelength $\lambda_1$ vary in intensity in response to intensity variations of the input light and this intensity variation varies inversely with respect to that of the signal intensity variation of the input light, and found a laser-induced signal enhancement effect, that is, a phenomenon wherein when laser light of another wavelength $\lambda_2$ within the wavelength range of the spontaneously emitted light, that is, within the peripheral wavelength range of the input light is made incident upon being multiplexed with the input light, the overall intensity increases suddenly, with the signal (amplitude) variation of the spontaneously emitted light being maintained. The present inventor grasped this phenomenon as a wavelength conversion function from wavelength $\lambda_1$ to $\lambda_2$ and conceived an optical triode based on a tandem wavelength converter (All-Optical Triode Based on Tandem Wavelength Converter), with which this wavelength conversion is connected in two stages, and thus came to conceive an optical signal amplifying triode. A first aspect of this invention was made based on this knowledge.

The present inventor also noted that the optical amplifier of the above-mentioned optical signal amplifying triode not only has the function of wavelength conversion from wavelength $\lambda_1$ to $\lambda_2$ but is also a functional element equipped with the wavelength conversion function and a switching function and found that, by multiplexing optical signals with routing information by amplitude modulation, the functional element can be used favorably as a routing device, that is, a transfer device for wavelength multiplexed signals. A second and a third aspect of this invention was made based on this knowledge.

The present inventor also found that by making an optical amplifier of an optical signal amplifying triode, which exhibits the above-described phenomenon, perform the function of wavelength conversion from wavelength $\lambda_1$ to $\lambda_2$ and at the same time combining this optical amplifier with a wavelength splitter that performs distribution to different output transmission paths in accordance with the input wavelengths and interposing this combination in a ring transmission path in which optical signals circulate, the optical signals that are stored by being made to circulate can be taken out at an arbitrary timing. A fourth aspect of this invention was made based on this knowledge.

DISCLOSURE OF THE INVENTION

First Aspect of the Invention

This aspect of the invention provides an optical signal amplifying triode comprising (a) a first semiconductor optical amplifier and a second semiconductor optical amplifier, each equipping an active layer formed of a pn junction and amplifying, performing wavelength conversion on, and then outputting an optical signal input therein; (b) a first optical input means, inputting a first input light of a first wavelength and a second input light of a second wavelength into the first semiconductor optical amplifier; (c) a first wavelength selector, selecting light of the second wavelength from among the light from the first semiconductor optical amplifier; (d) a second optical input means, inputting the light of second wavelength that has been selected by the first wavelength selector and a third input light of a third wavelength into the second semiconductor optical amplifier; and (e) a second wavelength selector, selecting output light of the third wavelength from among the light from the second semiconductor optical amplifier; (f) wherein the output light of the third wavelength is modulated in response to the intensity variation of either or both of the first input light of the first wavelength and the third input light of the third wavelength and the signal gain with respect to the third input light of the third wavelength is 2 or more.

With this arrangement, when the light of the second wavelength, selected from the light from the first semiconductor optical amplifier into which the first input light of the first wavelength and the second input light of the second wavelength have been input, and the third input light of the third wavelength are input into the second semiconductor optical amplifier, the output light of the third wavelength, selected from the light emitted from the second semiconductor optical amplifier, is light that is modulated in response to the intensity variation of either or both of the above-mentioned first input light of the first wavelength and the third input light of the third wavelength and is an amplified signal with a signal gain of a magnitude of 2 or more with respect to the above-mentioned third input light of the third wavelength. An optical signal amplifying triode, which can perform an amplification process directly on optical signals by using control input light, can thus be provided. Also, since each of the first semiconductor optical amplifier and the second semiconductor optical amplifier is an optical amplifier equipped with an active layer comprising a pn junction, the optical signal amplifying triode is made compact and higher in signal gain.

Preferably, this aspect of the invention provides the optical signal amplifying triode, wherein the first input light of the first wavelength is modulated light, the second input light of the second wavelength is continuous light, the third input light of the third wavelength is control light, and the output light of the third wavelength has a signal waveform, with which the modulation signal of the first input light is amplified, in the input interval of the control light. In this case, the output light of the third wavelength will be amplified light that has been modulated in response to the intensity variation of the first input light of the first wavelength in the input interval of the control light. An optical signal amplifying triode, which can perform a switching process directly on amplified optical signals by using control input light, can thus be provided.

Preferably, this aspect of the invention provides the optical signal amplifying triode, wherein the third wavelength is the same as the first wavelength. In this case, since the first input light and the third input light, which are the signal input light of the optical signal amplifying triode, and the output light will be of the same wavelength, connection of a plurality of the optical signal amplifying triodes with a common wavelength is enabled and an optical circuit of a high degree of integration can be arranged using the plurality of the optical signal amplifying triodes.

Preferably, this aspect of the invention provides the optical signal amplifying triode, wherein the signal gain of the output light of the third wavelength with respect to the control light of the third wavelength is 10 or more. The signal gain of the optical signal amplifying triode can then be increased further.

Preferably, this aspect of the invention provides the optical signal amplifying triode, wherein the active layers of the semiconductor optical amplifiers are arranged from quantum wells, a strained-layer superlattice, or quantum dots. Since a semiconductor optical amplifier, equipped with an active layer comprising quantum wells or quantum dots, is thus used, high-speed response is enabled. Especially in the case where quantum dots are used, a response speed of 100 GHz or more can be obtained. Also, polarization dependence is lessened by the use of a strained-layer superlattice.

Preferably, this aspect of the invention provides the optical signal amplifying triode, further comprising a reflecting means, reflecting light that has been transmitted through the active layer of an above-mentioned semiconductor optical amplifier towards the semiconductor optical amplifier or the other semiconductor optical amplifier. Since the transmission path in the active layer will then be elongated practically by the reflecting means equipped at one end face, the signal gain can be increased further. The modulation degree of the output signal is also increased further by the feedback effect.

Preferably, this aspect of the invention provides the optical signal amplifying triode, wherein either or each of the first semiconductor optical amplifier and second semiconductor optical amplifier is equipped at one face thereof with a reflecting means that selectively reflects light, and the reflection means is optically coupled via a lens to either or each of the first semiconductor optical amplifier and second semiconductor optical amplifier. Here, a microlens can be used favorably as a converging lens and the input light and the output light are transmitted via optical fibers.

Preferably, this aspect of the invention provides the optical signal amplifying triode, wherein the reflecting means comprises a first wavelength selective mirror, which, among the light from the first semiconductor optical amplifier, does not reflect the first input light of the first wavelength but reflects light of the second wavelength to the second semiconductor optical amplifier; and a second wavelength selective mirror, which, among the light from the second semiconductor optical amplifier, does not reflect the second input light of the first wavelength but reflects light of the third wavelength. In this case, the reflecting means is arranged from the wavelength selective mirror that functions as the first wavelength selector and the wavelength selective mirror that functions as the second wavelength selector.

Preferably, this aspect of the invention provides the optical signal amplifying triode, wherein a wavelength selective filter, which does not transmit light of the first wavelength but transmits light of the second wavelength, is disposed between one end face of the first semiconductor optical amplifier and the reflecting means for reflecting light, and a wavelength selective filter, which does not transmit light of the second wavelength but transmits the wavelength of the control light, is disposed between one end face of the second semiconductor optical amplifier and the reflecting means for reflecting light. In this case, the first wavelength selector and the second wavelength selector are arranged from the first wavelength selection filter and the second wavelength selection filter. Also, since the first input light, that is, light of the first wavelength, which is the wavelength of the signal light, is not transmitted by the first wavelength selection filter, even better characteristics are provided.

Preferably, this aspect of the invention provides the optical signal amplifying triode, wherein the reflecting means functions as either or both of the first wavelength selector and second wavelength selector and the output light from an above-mentioned semiconductor optical amplifier is input into the other semiconductor optical amplifier by changing one or both of the incidence angle of the input light and the emission angle of the output light with respect to the reflecting means.

Preferably, this aspect of the invention provides the optical signal amplifying triode, wherein a plurality of sets of the first semiconductor optical amplifier and second semiconductor optical amplifier are disposed in optical waveguides formed on a semiconductor substrate and these sets are integrated as a single chip. In this case, the optical signal amplifying triode can be made to have the smaller monolithic structure of a single integrated chip.

Preferably, this aspect of the invention provides the optical signal amplifying triode, further comprising an optical circulator or a directional coupler, which makes input light be input into an above-mentioned semiconductor optical amplifier through one end face of the semiconductor optical amplifier, and guides light, output from the semiconductor optical amplifier through the one end face, to an optical path that differs from that of the input light. In this case, light that exits from the other end face of the semiconductor amplifier will not enter a waveguide, which guides light that is to be made incident on the other end face, but will mainly be guided to another output waveguide.

Preferably, this aspect of the invention provides the optical signal amplifying triode, wherein a wavelength selective mirror or wavelength selective filter that functions as the first wavelength selector or second wavelength selector is disposed inside an optical path and is arranged from any among the group consisting of a grating filter, with which the refractive index is varied periodically in the light propagation direction, a multilayer film filter, formed by layering a plurality of sets of layers that differ in refractive index, and a photonic crystal, having a photonic bandgap. In this case, the second wavelength or the third wavelength is extracted favorably from the light from the first semiconductor optical amplifier or the second semiconductor optical amplifier.

Preferably, this aspect of the invention provides the optical signal amplifying triode, wherein the optical signal amplifying triode makes up an optical NAND gate, an optical NOR gate, an optical flip-flop circuit, or an optical operational amplifier. In this case, an optical digital circuit or an optical analog circuit can be arranged favorably from the above-described optical signal amplifying triode.

Also, with the above-described optical signal amplifying triode, components, such as the first semiconductor optical amplifier, the second semiconductor optical amplifier, the first wavelength selector, the second wavelength selector, an optical coupler, which multiplexes light to be input into the above components, etc., may be coupled by means of optical waveguides formed on a semiconductor substrate or a substrate formed of a light transmitting substance, such as a glass substrate.

Second Aspect of the Invention

This aspect of the invention provides an optical signal transfer method of transferring an optical signal train, which has been transmitted via a predetermined transmission path, to transmission paths, among a plurality of transmission paths, that correspond to routing information contained in the optical signal, the optical signal transfer method comprising: (a) an input step of inputting the optical signal train, to which the routing information have been applied, to the main optical signal amplifying triode unit; (b) a wavelength conversion step of supplying control light of wavelengths, corresponding to signals indicating the routing information, to the main optical signal amplifying triode unit, and making optical signals of the wavelengths of the control light be output from the main optical signal amplifying triode unit; and (c) an optical distribution step of inputting the optical signals, output from the main optical signal amplifying triode unit, into an optical distributor and distributing the optical signals according to their wavelengths among the plurality of optical transmission paths connected to the optical distributor. Amplitude modulation signals are thus added to the optical signal train as the routing information and the optical signal train is thereby arranged to be transferred to the destinations indicated by the amplitude modulation signals.

With this arrangement, the optical signal train, to which the routing information have been provided, is input into the main optical signal amplifying triode unit, the control light of the wavelengths corresponding to the amplitude modulation signals are supplied to the main optical signal amplifying triode unit, optical signals of the wavelengths of the control light are output to the optical distributor from the main optical signal amplifying triode unit, and routing is carried out by the output optical signals being distributed according to their wavelengths among the plurality of optical transmission paths connected to the optical distributor. Since the routing information are thus added to the optical signals, the main optical signal amplifying triode unit, having a wavelength conversion function and a switching function, can output optical signals of wavelengths corresponding to the routing information and these signals can then be distributed by the optical distributor. A routing device, that is, an optical signal transfer device or optical signal relay device of high speed and compact size can thus be realized.

Here, the routing information are information, such as IP addresses, source addresses, destination addresses, source routing and other route information, data link layer connection information, etc., which are related to the determination of the transfer destinations of optical signals.

Preferably, this aspect of the invention provides the optical signal transfer method, wherein the optical signal train is amplitude modulated at a modulation degree of no more than 90%. In this case, optical signals will not be degraded and the routing information will be added securely to the optical signals.

Preferably, this aspect of the invention provides the optical signal transfer method, wherein the optical signal train is a packet signal and the routing information are label information or tag information provided at a head portion of the packet signal. Also preferably, the above-mentioned optical signal train is a packet signal and the above-mentioned routing information are label information or tag information provided at a head portion of the packet signal. Label information or tag information can thus be added by amplitude modulation to a label portion or tag portion provided at the head portion of the optical signal train that makes up the packet signal.

Preferably, this aspect of the invention provides the optical signal transfer method, wherein in the wavelength conversion step, amplitude modulation using the control light is applied to the optical signals, output from the main optical signal amplifying triode unit, to add new routing information to the optical signals. In this case, the transfer destinations can be added-as suited inside a transfer device. Dynamic routing, by which the transfer route is determined, for example, according to the link state, node state, and traffic state, is thus enabled.

Third Aspect of the Invention

This aspect of the invention provides an optical signal relay device, which, among optical signal transmission networks, transfers an optical signal train, having routing information added thereto by amplitude modulation, from one network to transmission paths, among the transmission paths of another network, that correspond to the routing information contained in the optical signal, comprising: (a) a control light generator, generating, based on the amplitude modulation signals of the optical signal train, control light of wavelengths corresponding to the destinations indicated by the amplitude modulation signals; (b) a main optical signal amplifying triode unit, converting the optical signal train into an optical signal of the wavelengths of the control light; and (c) an optical distributor, distributing the optical signal, output from the main optical signal amplifying triode unit, among a plurality of optical transmission paths in accordance with the wavelengths of the optical signal.

With this arrangement, when an optical signal train, having amplitude modulation signals added as routing information, arrives upon being transmitted, control light of wavelengths corresponding to the destinations indicated by the amplitude modulation signals are generated by the control light generator based on the amplitude modulation signals of the optical signal train, the optical signal train is converted into optical signals of the wavelengths of the above-mentioned control light by the main optical signal amplifying triode unit, and the optical signals output from the main optical signal amplifying triode unit are distributed among the plurality of optical transmission paths in accordance with their wavelengths by the optical distributor. Since the main optical signal amplifying triode unit, having a wavelength conversion function and a switching function, can thus output optical signals of wavelengths corresponding to the routing information and these signals can then be distributed by the optical distributor, a routing device, that is, an optical signal transfer device or optical signal relay device of high speed and compact size can be realized.

Preferably, this aspect of the invention provides the optical signal relay device, further comprising an electronic controller or an all-optical controller, which, in accordance with the amplitude modulation signals contained in the optical signal, makes control light of wavelengths, which are in accordance with the routing information indicated by the amplitude modulation signals, be generated from the control light generator. In this case, since the control light generator is controlled by the electronic controller or the all-optical controller to generate the control light of the wavelengths that are in accordance with the routing information indicated by the amplitude modulation signals contained in the optical signals, the main optical signal amplifying triode unit, having a wavelength conversion function and a switching function, can output optical signals of wavelengths corresponding to the routing information and these signals can then be distributed by the optical distributor. A routing device, that is, an optical signal transfer device or optical signal relay device of high speed and compact size can thus be realized. Also in the case where the electronic controller is an all-optical controller that optically extracts just the amplitude modulation signals contained in the optical signals input from the above-mentioned main optical waveguide and makes control light of wavelengths corresponding to the address signals be generated from the control light generator, the merit that the confidentiality of the optical signals can be secured is provided since electromagnetic waves corresponding to signals besides the address signals are not generated.

Preferably, this aspect of the invention provides the optical signal relay device, further comprising: (a) an optical splitter, branching a portion of the optical signal; (b) a photoelectrical signal converter, converting the optical signal branched by the optical splitter to an electrical signal and supplying the electrical signal to the electronic controller; and (c) an optical delay element, disposed at the downstream side of the optical splitter and delaying the optical signal that is to be input into the main optical signal amplifying triode unit upon passage through optical splitter; and wherein the electronic controller extracts the amplitude modulation signals contained in the optical signal and makes control light of wavelengths, which are in accordance with the routing information indicated by the amplitude modulation signals, be generated from the control light generator. Since the main optical signal amplifying triode unit, having a wavelength conversion function and a switching function, can thus output optical signals of wavelengths corresponding to the routing information and these signals can then be distributed by the optical distributor, a routing device, that is, an optical signal transfer device or optical signal relay device of high speed and compact size can be realized.

Preferably, this aspect of the invention provides the optical signal relay device, further comprising: an optical signal storage element, temporarily storing an optical distributed from the optical signal distributor; and an optical feedback transmission path, feeding back the optical signal output from the optical signal storage element to the input side; and wherein when the optical signal is an optical packet signal that is to be stored temporarily, the electronic controller makes a control optical signal, for converting the optical packet signal to a priorly set storage wavelength, be output, and the optical distributor distributes the optical packet signal, after conversion to the storage wavelength, to the optical signal storage element and makes the optical packet signal be stored temporarily in the optical signal storage element. Here, a merit is provided in that when a plurality of optical packet signals that are subject to relay processing are to be output to the same transmission path, one of the optical packet signals is converted to the priorly set storage wavelength, the optical wavelength splitter distributes the optical packet signal after conversion to the storage wavelength to the above-mentioned optical signal storage element, and after being stored in the storage element temporarily, the optical packet signal is returned to the input side and subject anew to the relay process.

Preferably, this aspect of the invention provides the optical signal relay device, wherein the optical signal storage element is equipped with a plurality of optical fibers, which are disposed in parallel and differ in optical propagation length in order to receive optical signals distributed by the optical distribution device, the electronic controller makes a control optical signal, for converting the optical packet signal to be stored temporarily to a priorly set storage wavelength in accordance with the storage time required of the optical packet signal, be output, and the optical distributor distributes the optical packet signal, after conversion to the storage wavelength, to an optical fiber among the plurality of optical fibers of the optical signal storage element and temporarily stores the optical packet signal in the optical fiber. In this case, an optical packet signal is temporarily stored in the process of being propagated inside an optical fiber, which, among the plurality of optical fibers disposed in parallel, is in accordance with the storage time required of the optical packet signal.

Preferably, this aspect of the invention provides the optical signal relay device, wherein the all-optical controller comprises: an optical coupler, branching a portion of the first input light; a continuous light source, generating continuous light of the same wavelengths as the control light; an optical coupler, multiplexing the continuous light from the continuous light source with the portion of the first input light from the optical coupler; and a semiconductor optical amplifier, receiving the light from the optical coupler, outputting control light having the modulation signals contained in the first input light, and being of slower response speed than the semiconductor optical amplifier. A controller can thus be arranged in an all-optical manner.

Preferably, this aspect of the invention provides the optical signal relay device, wherein when output light that are from the main optical signal amplifying triode unit are input, the optical distributor selectively distributes the output light, which have been input, to optical transmission paths, among the plurality of optical transmission paths, that correspond to the wavelengths of the control light. For example, the optical distributor is an array waveguide grating type wavelength splitter equipped with a first slab waveguide, connected to an input port, a second slab waveguide, connected to a plurality of output ports, and a plurality of array waveguides of different lengths, disposed between the first slab waveguide and the second slab waveguide, and distributes the input light, input into the input port, among the plurality of output ports according to the wavelengths of the input light. Such arrangements include a diffraction grating type or prism type optical distributor, which uses the refraction angles of a diffraction grating or a prism that differ according to wavelength to selectively distribute input light among a plurality of array waveguides aligned in array form. With such an arrangement, an output light, which is output from the above-described optical triode and is of a wavelength corresponding to the control light, is distributed selectively according to wavelength to one of the plurality of branch waveguides.

Fourth Aspect of the Invention

This aspect of the invention provides an optical signal storage device, storing an optical signal input from an input optical transmission path and enabling taking out of the optical signal at an arbitrary time, comprising: (a) a control light generator, generating control light for converting the optical signal input from the input optical transmission path to wavelengths, which correspond to the transmission destinations contained in the input signal and are the same as or different from that of the optical signal; (b) a main optical signal amplifying triode unit, receiving the optical signal that has been input and the control light and converting the optical signal that has been input to optical signals of the wavelengths of the control light; (c) an optical distributor, distributing the optical signals, output from the main optical signal amplifying triode unit, in accordance with the wavelengths of the optical signals; (d) an optical buffer memory element, temporarily storing an optical signal of a storage wavelength that has been distributed by the optical distributor; (e) an optical feedback transmission path, feeding back the optical signal output from the optical buffer memory element to the input optical transmission path to re-input the optical signal into the main optical signal amplifying triode unit; and (f) an optical signal storage control means, making the control light generator output control light for conversion of the optical signal, which is repeatedly circulated through the main optical signal amplifying triode unit, optical distributor, optical buffer memory element, and the optical feedback transmission path, to an output wavelength at the main optical signal amplifying triode unit.

With this fourth aspect of this invention, when the optical signal, which is made to circulate repeatedly through the above-mentioned main optical signal amplifying triode unit, optical distributor, optical buffer memory element, and optical feedback transmission path, is converted to the output wavelength in the main optical signal amplifying triode unit by the optical signal takeout control means, it is distributed by the distributor to the takeout transmission path based on the output wavelength and thereby taken out as a time optical signal at an arbitrary timing (takeout time). This takeout transmission path is, for example, prepared for subjecting the optical signal that has been taken out to a multiplexing process (so-called optical adding process) or a splitting process (so-called optical dropping process).

With this invention of the fourth aspect, the above-mentioned optical signal storage control means preferably makes control light, for converting the wavelength of the optical signal to be input into the above-mentioned main optical signal amplifying triode unit to a storage wavelength, be generated by the above-mentioned control light generator. With this arrangement, the storage of an input optical signal is started by the optical signal being converted to the storage wavelength in the main optical signal amplifying triode unit and thereby being made to circulate through the circulation transmission path, which repeatedly passes through the above-mentioned main optical signal amplifying triode unit, optical distributor, optical buffer memory element, and optical feedback transmission path.

Preferably, this aspect of the invention provides the optical signal storage device, further comprising an optical signal gain control means, controlling the optical signal, fed back by the optical feedback transmission path, or the control light supplied to the main optical signal amplifying triode unit in order to restrain the increase and decrease of the gain of the optical signal that is circulated. In this case, since the attenuation of the optical signal due to circulation is prevented, the gain of the optical signal is kept fixed.

Preferably, this aspect of the invention provides the optical signal storage device, wherein the main optical signal amplifying triode unit comprises: a first semiconductor optical amplifier, which performs conversion to a wavelength of a bias light and inversion of the optical signal; and a second semiconductor optical amplifier, which performs conversion to the wavelength of the control light and inversion of the optical signal that has been inverted by the first semiconductor optical amplifier; and the optical signal gain control means controls the optical signal, fed back to the optical feedback transmission path, based on the increase or decrease of the gain of the bias light contained in the output light from the second semiconductor optical amplifier. For example, the optical signal that is fed back by the optical feedback transmission path is attenuated or amplified based on the increase or decrease of the gain of the bias light. Since the optical signal that is fed back by the optical feedback transmission path is thus prevented from attenuating due to circulation by being amplified by the optical signal gain control means, the gain of the optical signal is kept fixed substantially.

Preferably, this aspect of the invention provides the optical signal storage device, wherein the optical signal gain control means comprises: a first gain control optical amplifier, receiving the bias light and a gain control light, which is a continuous light of a wavelength that differs from that of the bias light, and outputs a gain control light, which decreases in gain in accompaniment with an increase of the gain of the bias light; and a second gain control optical amplifier, receiving the output light from the first gain control optical amplifier and the optical signal, which is fed back by the optical feedback transmission path, and outputs an optical signal, which increases in gain in accompaniment with a decrease of the gain of the gain control light. In this case, the gain of the optical signal that is circulated for storage is kept fixed by an all-optical process.

Also, preferably either or each of the first gain control optical amplifier and the second gain control optical amplifier comprises an optical amplifier formed of a light transmitting medium in which a three-level or four-level energy level system is arranged by the doping of a rare earth element. Since such an optical amplifier is slow in the cross-gain modulation response time, the signal component of the optical signal will be smoothed and the lowering or rising of the gain thereof can be detected readily.

Preferably, this aspect of the invention provides the optical signal storage device, wherein the optical signal gain control means comprises: an optical operational controller, which controls the gain of the control light supplied to the main optical signal amplifying triode unit based on the increase/decrease of the gain of the optical signal fed back by the optical feedback transmission path in order to maintain fixed the gain of the optical signal that is circulated. With this arrangement, since the optical signal that is output from the main optical signal amplifying triode unit is amplified by the all-optical operational controller based on the decrease of the gain of the optical signal that is fed back and attenuation of the optical signal due to circulation is thereby prevented, the gain of the optical signal is kept substantially fixed.

Preferably, this aspect of the invention provides the optical signal storage device, further comprising: (a) an electronic controller, controlling the control light generator; (b) a photoelectric signal converter, converting the optical signal branched by the optic splitter into an electrical signal and supplying the electrical signal to the electronic controller; and (c) an optical delay element, disposed at the downstream side of the optical splitter and delaying the optical signal that is to be input into the main optical signal amplifying triode unit upon passage through optical splitter; and (d) wherein the electronic controller makes the control light, for conversion of the optical signal to the output wavelength, be generated from the control light generator in response to an output timing indicated by stored signal output information that is supplied from the exterior or is contained in the optical signal. The optical signal that is stored by circulation can thereby be output by an electronic process in response to the output timing indicated by the storage signal output information supplied from the exterior or contained in the above-mentioned optical signal.

Preferably, this aspect of the invention provides the optical signal storage device, further comprising an all-optical operational controller, which makes the control light, for conversion of the optical signal to the output wavelength, be generated from the control light generator in response to an output timing indicated by stored signal output information that is supplied from the exterior or is contained in the optical signal. The optical signal that is stored by circulation can thereby be output by an all-optical process in response to the output timing indicated by the storage signal output information supplied from the exterior or contained in the above-mentioned optical signal.

BEST MODE FOR CARRYING OUT THE INVENTION

Embodiments of this invention shall now be described in detail with reference to the drawings.

Figure 1:
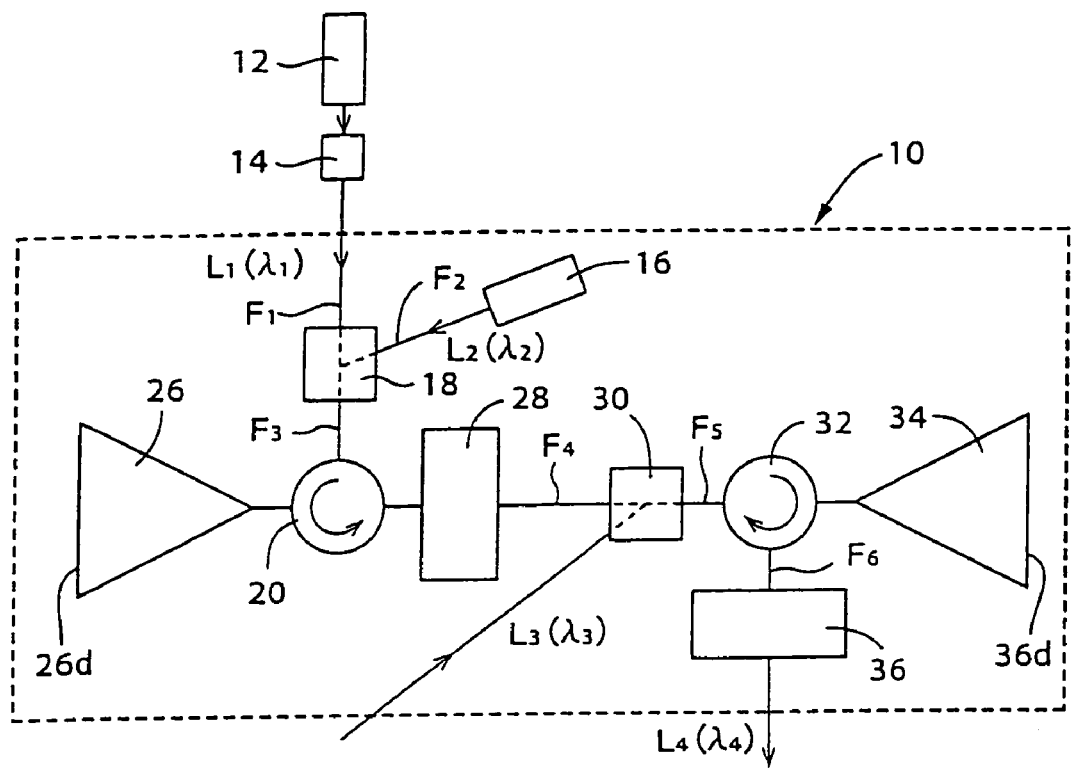
FIG. 1 is a block diagram illustrating the arrangement of an optical signal amplifying triode of an embodiment of this invention.

FIG. 1 through FIG. 15 show embodiments related to an optical signal amplifying triode, and FIG. 1 shows an optical signal amplifying triode 10 of one of the embodiments.

In FIG. 1, a first laser light source 12 outputs a first laser light (first input light) $L_1$ of a first wavelength $\lambda_1$ of, for example, 1555 nm, and this light is propagated via an optical fiber $F_1$ that is provided with a first optical modulator 14. A second laser light source 16 continuously outputs a second laser light (second input light) $L_2$ of a second wavelength $\lambda_2$ of, for example, 1548 nm at a fixed intensity, and this light is propagated via a second optical fiber $F_2$. A wavelength variable semiconductor laser is used for example as the first laser light source 12, and a semiconductor laser of a single wavelength is used for example as the second laser light source 16. The first optical modulator 14 performs, in accordance with an electrical signal or an optical signal from an unillustrated signal generator, intensity modulation of the first laser light $L_1$, which is the transmitted light, so that the light becomes a pulse signal of the frequency of the electrical signal or the optical signal, such as shown by the waveform of the top stage of FIG. 3. A first optical coupler 18 functions as a first optical input means that connects the optical fiber $F_1$ and the optical fiber $F_2$ with an optical fiber $F_3$, overlaps (multiplexes) the first laser light $L_1$ and the second laser light $L_2$, which have been propagated through the optical fiber $F_1$ and the optical fiber $F_2$, and inputs the multiplexed light into a first optical amplifier 26 via the third optical fiber $F_3$ and a first optical circulator 20.

Figure 2:
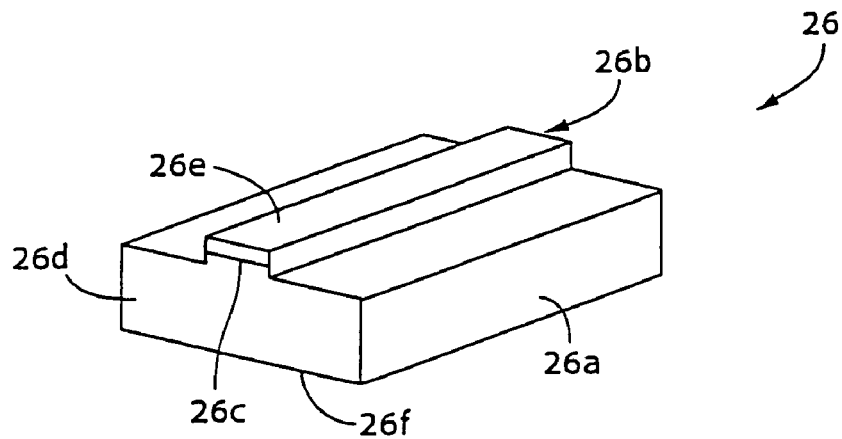
FIG. 2 is a perspective view of the external appearance of an optical amplifier in the embodiment of FIG. 1 in the case where the optical amplifier is arranged from a semiconductor optical amplifier.

The first optical amplifier 26 is arranged from a semiconductor optical amplifier (SOA), such as that shown in FIG. 2.

In FIG. 2, an optical waveguide 26b, which is formed on a semiconductor substrate 26a arranged from a compound semiconductor, such as indium phosphide (InP) or gallium arsenide (GaAs), is a multi-layer film of a group III-V mixed crystal semiconductor, such as InGaAsP, GaInNAs, AlGaInP, etc., that is epitaxially grown on the semiconductor substrate 26a and formed to a predetermined waveguide pattern by photolithography and is formed, for example, to be a tape-like protrusion of predetermined width using photolithography. Since this optical waveguide 26b is formed of a material that is higher in refractive index than the semiconductor substrate 26a, it has a function of propagating light while confining the light in the thickness direction. An active layer 26c, arranged from a pn junction, a cap layer, etc., are included in the multilayer film inside the optical waveguide 26b, and an upper electrode 26e is affixed to the top. In the active layer 26c, an electron-hole pair is formed by a voltage being applied across a lower surface electrode 26f, affixed to the lower surface of the semiconductor substrate 26a, and the upper electrode 26e and an excitation current being made to flow through the pn junction, and light that passes through the active layer 26c is amplified by an induced radiation effect. The active layer 26c is arranged from multiple quantum wells, strained-layer superlattice, or quantum dots. In the case of multiple quantum wells, six pairs of InGaAs (thickness: 100 Å) and InGaAsP (thickness: 100 Å) layers, which have been latticed-matched by being epitaxially grown from an InP semiconductor substrate 26a, are arranged and a guide layer (2000 Å) with a GRIN structure, which is varied in composition (refractive index) in a stepwise manner, is formed successively above the active layer 26c. The device length (optical path length) of this active layer 26c is 600 µm, and it is considered that when electrons, which are injected in energy injection by a current value of, for example, 250 mA, are moved into a valence electron band by induced radiation by transmitted photons, the electrons release optical energy and amplify the transmitted light. For example, by this energy injection by a current value of 250 mA, a gain of approximately 20 dB is obtained for a wavelength of 1555 nm.

A reflecting means 26d, which is a metal film or a dielectric multilayer film, etc., that has been processed to reflect light by the sputtering of a metal or a dielectric, is equipped on one end face of the first optical amplifier 26, and optical input or optical output is thus performed via the other end face at the side opposite the one end face. The multiplexed light of the first laser light $L_1$ and the second laser light $L_2$ is thus input into the first optical amplifier 26 via the other end face, and the light reflected by the reflecting means 26d is again output via the other end face. Inside the active layer 26c of this first optical amplifier 26, spontaneous light of peripheral wavelengths centered about the wavelength $\lambda_1$ of the first laser light $L_1$ is generated by the incidence of the first laser light $L_1$, and this spontaneous light increases or decrease in intensity in inverse proportion to the intensity modulation of the first laser light $L_1$. When in this state, the second laser light $L_2$ of the second wavelength $\lambda_2$, which is within the wavelength range of the spontaneous light, is transmitted, this second wavelength $\lambda_2$ is reinforced while being made to vary in the same manner as the spontaneous light. That is, light of the second wavelength $\lambda_2$ is amplified upon being modulated in the same manner as but inversely in phase with respect to the modulation of the first laser light $L_1$. The first optical amplifier 26, as well as the second optical amplifier 34, is thus equipped with cross gain modulation characteristics, that is, mutual gain modulation characteristics.

The first optical circulator 20 guides the light output from the first optical amplifier 26 not to the third optical fiber $F_3$ but to a fourth optical fiber $F_4$, which is equipped with a first wavelength selector 28. The first wavelength selector 28 is connected to the above-described first optical amplifier 26 and extracts light of the second wavelength $\lambda_2$ of 1548 nm from among the light output from the first optical amplifier 26. This first wavelength selector 28 functions as an optical filter element and, for example, is a fiber grating filter, which is formed by making a portion of the fourth optical fiber $F_4$ vary periodically in refractive index in the longitudinal direction by localized illumination of ultraviolet rays and selectively transmits light at a half-width of 1 nm with respect to a central wavelength of the second wavelength $\lambda_2$. The first wavelength selector 28 may instead be arranged from either a multilayer film filter, formed by layering a plurality of layers that differ in refractive index, or a photonic crystal, having a photonic bandgap.

Figure 3:
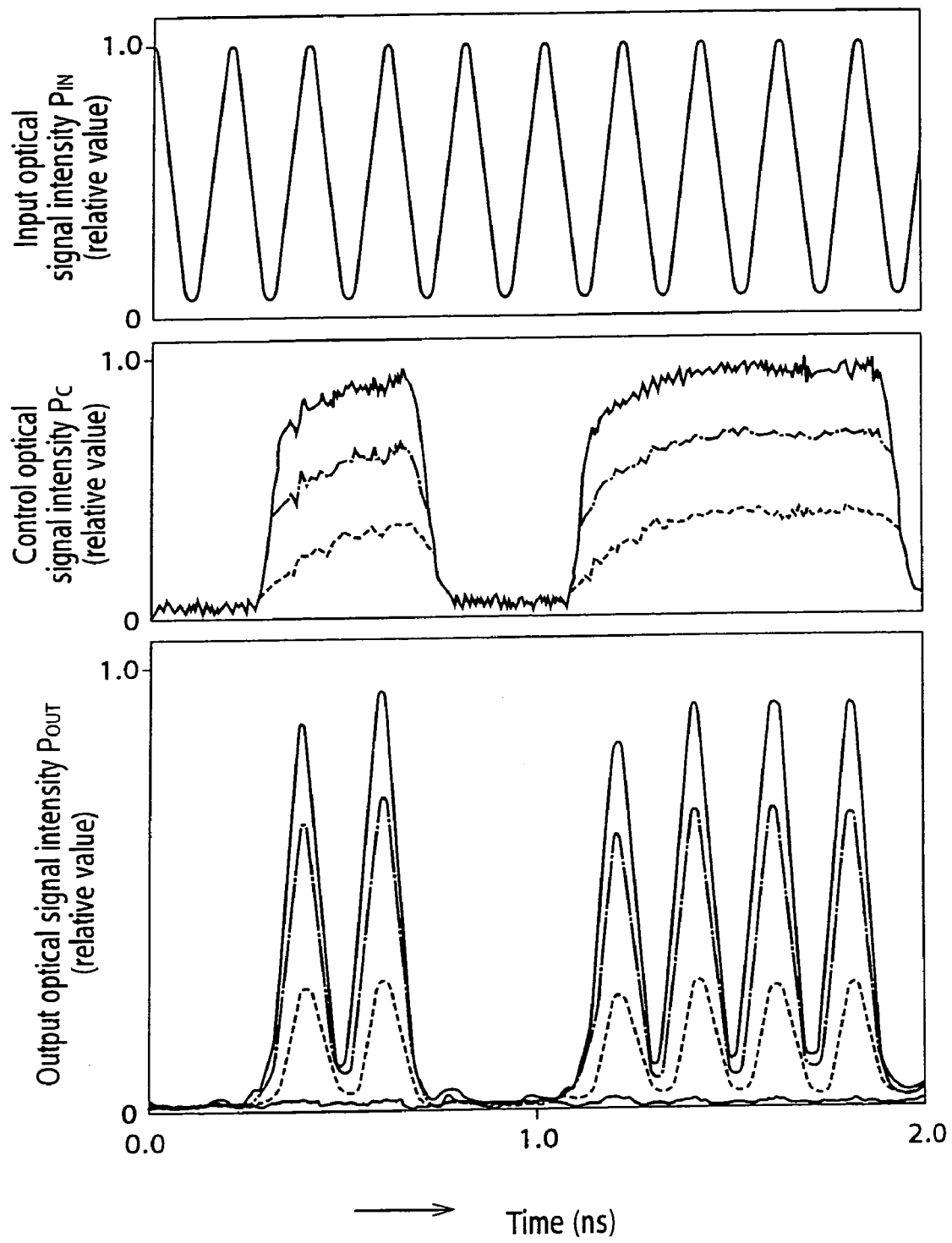
FIG. 3 shows time charts illustrating the actions of the optical signal amplifying triode of FIG. 1 with the waveform of a first input light being indicated in the top stage, the waveforms of control light being indicated in the middle stage, and the waveforms of output light being indicated in the bottom stage.

A second optical coupler 30 functions as a second optical input means that multiplexes light of the second wavelength $\lambda_2$, which has been selected by the first wavelength selector 28 from among the light output from first optical amplifier 26, and the third laser light $L_3$, which is a control light of a third wavelength $\lambda_3$ having, for example, a waveform among those shown in the middle stage of FIG. 3, and inputs the multiplexed light via a fifth optical fiber $F_5$ and a second optical circulator 32 into the second optical amplifier 34, which is arranged in the same manner as the first optical amplifier 26. At the second optical amplifier 34, the modulated second wavelength $\lambda_2$ is subject to further modulation by the control light of the third wavelength $\lambda_3$ that is within the wavelength range of spontaneous light centered about the second wavelength $\lambda_2$, and the waveform of the third wavelength $\lambda_3$ becomes a waveform among those shown in the bottom stage of FIG. 3. The second optical circulator 32 guides the light output from the second optical amplifier 34 not to the fifth optical fiber $F_5$, but to a sixth optical fiber $F_6$, which is equipped with a second optical filter element 36. The second optical filter 36 selects light of the third wavelength $\lambda_3$ from among the light output from the second amplifier 34 and outputs this light as output light $L_4$ shown in the bottom stage of FIG. 3. In FIG. 3, the solid line, alternate long and short dash line, and broken line waveforms of the control light $L_3$ indicated in the middle stage correspond to the solid line, alternate long and short dash line, and broken line waveforms of the output light $L_4$ indicated in the bottom stage, and the output light $L_4$ has a gain of approximately 30 times with respect to the control light $L_3$.

Figure 4:
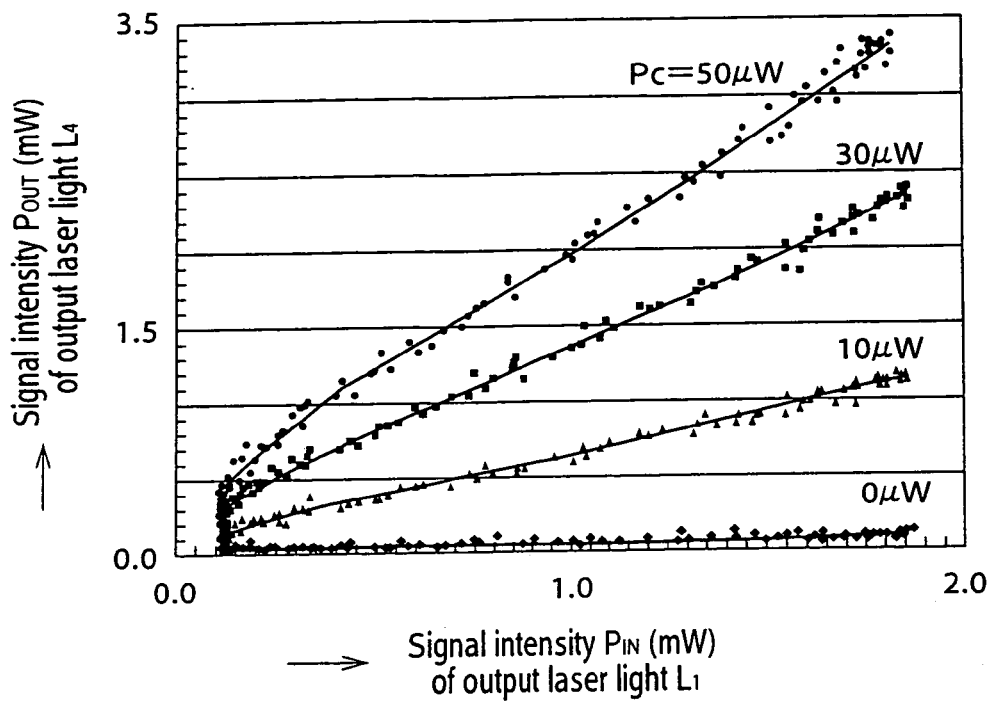
FIG. 4 is a diagram showing the input/output characteristics of the optical signal amplifying triode of FIG. 1.
Figure 5:
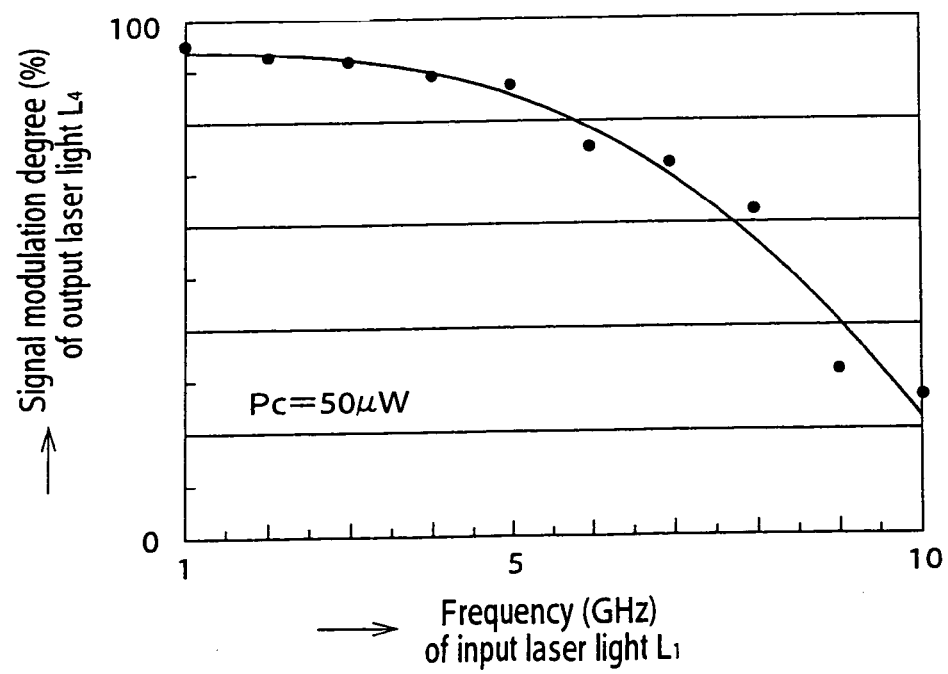
FIG. 5 is a diagram showing the frequency characteristics of the output signal of the optical signal amplifying triode of FIG. 1.

FIG. 4 and FIG. 5 illustrate the characteristics of the cross gain modulation type wavelength conversion actions of the optical signal amplifying triode 10 arranged in the above-described manner. FIG. 4 is an input/output characteristics diagram of the fourth laser light $L_4$ with the signal strength $P_C$ of the control light $L_3$ as a parameter in a two-dimensional coordinate system wherein the abscissa indicates the signal strength $P_{IN}$ of the first laser light $L_1$, which is the first input light, and the ordinate indicates the signal strength $P_{OUT}$ of the fourth laser light $L_4$, which is the output light. As is clear from the Figure, in the same manner as in a triode amplifier, such as a transistor, the signal strength $P_{OUT}$ of the fourth laser light $L_4$ responds to the variation of the signal strength $P_C$ of the control light $L_3$ with the variation being amplified in the modulation process and responds to the variation of signal strength $P_{IN}$ of the first laser light $L_1$, which is the first input light, with the variation being amplified in the modulation process. Also, FIG. 5 shows the frequency characteristics of the fourth laser light $L_4$ in a two-dimensional coordinate system wherein the abscissa indicates the frequency of the first laser light $L_1$, which is the first input light, and the ordinate indicates the signal modulation degree H (%) of the fourth laser light $L_4$, which is the output light. As shown in FIG. 5, lowering of the signal modulation degree H is not seen up to 5 GHz. This signal modulation degree H is expressed, for example, by the Equation (1) shown below. In this Equation, $I_{max}$ is the maximum value of the optical signal and $I_{min}$ is the minimum value of the optical signal. In the case where quantum dots are used in the active layer 26c, lowering of the signal modulation degree H is not seen in the range of 100 GHz and higher.

$$H = 100 \times (I_{max} - I_{min})/(I_{max} + I_{min}) \qquad 1$$

Experiments by the present inventor have shown that when the control light $L_3$ is changed from the third wavelength $\lambda_3$ to the first wavelength $\lambda_1$, the output light $L_4$ of the first wavelength $\lambda_1$ is obtained and the same optical signal amplification effect results as those described above are obtained. Also, though in the above, the second wavelength $\lambda_2$ of the second laser light $L_2$ is shorter than that of the first laser light $L_1$, when the second wavelength $\lambda_2$ of the second laser light $L_2$ is made longer than that of the first laser light $L_1$, not only are the same optical signal amplification effect results as those described above obtained but a further effect that the minimum value, for example, of the waveform of the bottom stage of FIG. 3 approaches zero, in other words, the effect that the baseline of the output light $L_4$ approaches zero, like that of the first laser light $L_1$, is also obtained. Also, when signal modulation is applied to the third input light $L_3$ of the third wavelength $\lambda_3$ with the first input light $L_1$ of the first wavelength $\lambda_1$ being a continuous light (bias light) like the second laser light $L_2$ of the second wavelength $\lambda_2$, the signal of the third input light $L_3$, amplified by a gain of 10 or more, is output as the output light $L_4$ of the third wavelength $\lambda_3$.

Figure 6A:
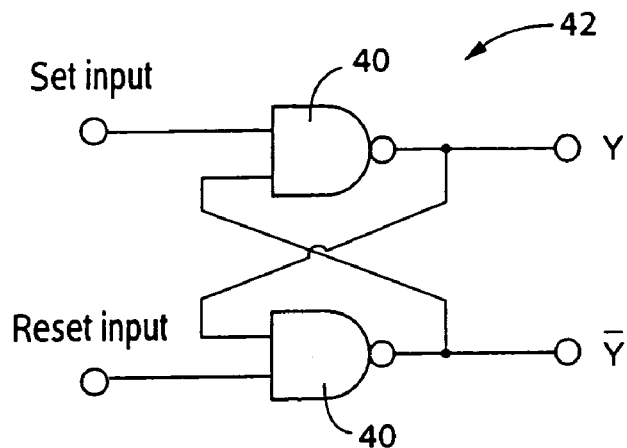
FIG. 6 shows diagrams of optical flip-flop circuits arranged by the optical signal amplifying triode of FIG. 1, with FIG. 6(a) showing an optical flip-flop circuit arranged from a pair of optical NAND gates and FIG. 6(b) showing an optical flip-flop circuit arranged from a pair of optical NOR gates.
Figure 6B:
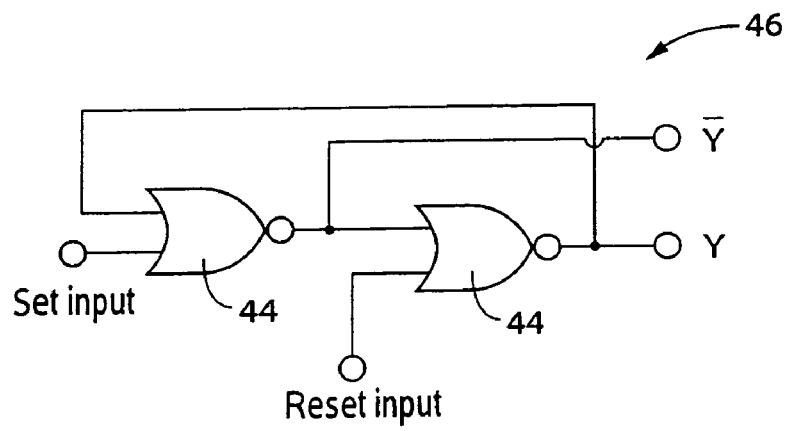

FIG. 6(a) shows a flip-flop circuit 42 arranged from two optical NAND gates 40 to which the above-described optical signal amplifying triode 10 is applied, and FIG. 6(b) shows a flip-flop circuit 46 arranged from two optical NOR gates 44. As is well known, a NAND gate and a NOR gate in an electronic circuit are respectively arranged from a plurality of transistors, and the optical NAND gates 40 and the NOR gates 44 are arranged by providing the above-described optical signal amplifying triodes 10 in place of transistors in optical circuits, and the flip-flop circuits 42 and 46 are arranged from a pair of optical NAND gates 40 and a pair of optical NOR gates 44, respectively. With these flip-flop circuits 42 and 46, information are recorded by means of light.

Figure 7:
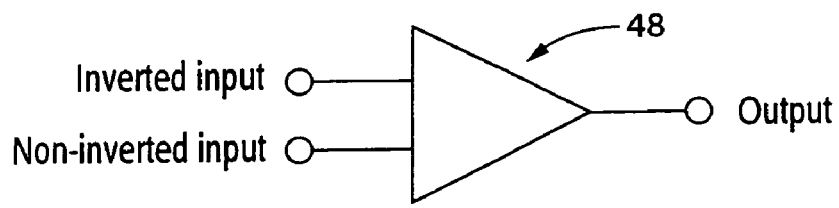
FIG. 7 shows an optical operational amp circuit arranged by the optical signal amplifying triode of FIG. 1.

FIG. 7 shows an optical operational amp 48 to which the above-described optical signal amplifying triode 10 is applied. As is well known, an operational amp in an electronic circuit is arranged from a plurality of transistors, and the optical operational amp 48 is arranged by providing the above-described optical signal amplifying triodes 10 in place of transistors in an optical circuit.

With the optical signal amplifying triode 10 of FIG. 1, arranged as described above, when light of the second wavelength $\lambda_2$, selected from among the light from the first optical amplifier 26 into which the first input light $L_1$ of the first wavelength $\lambda_1$ and the second input light $L_2$ of the second wavelength $\lambda_2$ are input, and the third input light (control light) $L_3$ of the third wavelength $\lambda_3$ are input into the second optical amplifier 34, the output light $L_4$ of the third wavelength $\lambda_3$ that is selected from among the light output from the second optical amplifier 34 is light that is modulated in response to the intensity variation of either or both of the first input light $L_1$ of the first wavelength $\lambda_1$ and the second input light $L_2$ of the second wavelength $\lambda_2$ and is a signal with which the signal gain with respect to the third input light (control light) $L_3$ of the third wavelength $\lambda_3$ is 2 or more. The optical signal amplifying triode 10, which can perform an amplification process on an optical signal directly using control input light, can thus be provided.

Also with the optical signal amplifying triode 10 of the present embodiment, since the first input light $L_1$ of the first wavelength $\lambda_1$ is modulated light, the second input light $L_2$ of the second wavelength $\lambda_2$ is continuous light, the third input light $L_3$ of the third wavelength $\lambda_3$ is control light, and the output light $L_4$ of the third wavelength $\lambda_3$ has, in the input interval of the control light $L_3$, a signal waveform with which the modulated signal of the first input light $L_1$ is amplified, the output light $L_4$ of the third wavelength $\lambda_3$ is amplified light that is modulated in response to the intensity variation of the first input light $L_1$ of the first wavelength $\lambda_1$ in the input interval of the control light $L_3$. The optical signal amplifying triode 10, which can perform a switching process on an amplified optical signal directly using control input light, can thus be provided.

Also with the present embodiment, since the first wavelength $\lambda_1$ and the third wavelength $\lambda_3$ can be made the same, the first input light $L_1$, which is the signal input light into the optical signal amplifying triode 10, the third input light $L_3$, and the output light $L_4$ can be made the same in wavelength, thus enabling a plurality of the optical signal amplifying triodes 10 to be connected with a common wavelength and an optical circuit of a high degree of integration to be arranged from a plurality of optical signal amplifying triodes 10.

Also with the present embodiment, the second wavelength $\lambda_2$ can be made longer than the first wavelength $\lambda_1$, and in this case, the merit that the waveform indicated by the output light $L_3$, which is the amplified light of the modulated first input light $L_1$, has a baseline close to the zero level like the baseline of the waveform of the first input light is provided. The merit of making the modulation degree large is thus provided.

Also with the present embodiment, since the signal gain of the output light $L_4$ of the third wavelength $\lambda_3$ with respect to the control light $L_3$ of the third wavelength $\lambda_3$ takes on a value of 10 or more, the amplification function of the optical signal amplifying triode is increased further and the scope of application thereof is expanded.

Also with the present embodiment, since each of the first optical amplifier 26 and the second optical amplifier 34 is a semiconductor optical amplifier equipped with an active layer formed of a pn junction, the optical signal amplifying triode 10, with which the signal gain and the response speed are increased further, can be obtained.

Also with the present embodiment, since the active layer 26c of each of the first optical amplifier 26 and the second optical amplifier 34 is arranged from quantum wells or quantum dots, the optical signal amplifying triode 10, with which the signal gain and the response speed are increased further, can be obtained. In particular, a response speed of 100 GHz or more can be obtained when quantum dots are used. Also, the polarization dependence is lessened when a strained-layer superlattice is used as the active layer.

Also with the present embodiment, since each of the first optical amplifier 26 and the second optical amplifier 34 has equipped, on one end face thereof, a mirror or other reflecting means 26d, formed by metal deposition, etc., in order to reflect light transmitted via the active layer 26c, and the input light is input and the output light is taken out from the other end face, the transmission path in the active layer 26c is elongated practically by the mirror or other reflecting means 26d equipped on the one end face and the signal gain is increased further. Also, the modulation degree is increased further by the feedback effect.

Also with the present embodiment, since the optical circulators 20 and 32, into which the input light is input upon transmission via the other end faces of the first optical amplifier 26 and the second optical amplifier 34 and which guide the light output through the other end faces to optical paths that differ from those of the input light, are provided, the light output from the other end faces of the first optical amplifier 26 and the second optical amplifier 34 are prevented from entering the waveguides that guide light to be input into the other end faces and are mainly guided to other waveguides for output.

Also with the present embodiment, since either or each of the first wavelength selection element 28 and the second wavelength selection element 36 is arranged from a grating filter, with which the refractive index of the interior of a waveguide or optical fiber is made to vary periodically in the light propagation direction, a multilayer filter, formed by layering a plurality of layers that differ in refractive index, or a photonic crystal, having a photonic bandgap, the second wavelength $\lambda_2$ or the third wavelength $\lambda_3$ is extracted favorably from the light from the first optical amplifier 26 or the second optical amplifier 34.

Also, the above-described optical signal amplifying triodes 10 can be used to arrange the optical NAND gate 40, the flip-flop circuit 42, formed of a pair of optical NAND gates 40, or the optical operational amp 46 and can thereby heighten the functions of an optical integrated circuit.

Also with the first optical amplifier 26 of the present embodiment, since the second wavelength $\lambda_2$ is a wavelength within the wavelength range of the peripheral light of the first input light $L_1$ of the first wavelength $\lambda_1$ and with the second optical amplifier 34, the third wavelength $\lambda_3$ is a wavelength within the wavelength range of the input light of the second wavelength $\lambda_2$, a signal of the second wavelength $\lambda_2$ or the third wavelength $\lambda_3$ that is contained in the output light from the first optical amplifier 26 or the second amplifier 34 is amplified favorably.

In the case where the reflecting means 26, disposed at the one end face of the first optical amplifier 26 is arranged from a wavelength selective reflecting film that transmits light of the first wavelength $\lambda_1$ but reflects light of the second wavelength $\lambda_2$, the first wavelength selector 28 is made unnecessary. When the reflecting means of the second optical amplifier 34, arranged in the same manner as the first optical amplifier 26, is arranged from a wavelength selective reflecting film (wavelength selective mirror) that transmits light of the second wavelength $\lambda_2$ but reflects light of the third wavelength $\lambda_3$, the second wavelength selector 36 is made unnecessary. The above-mentioned wavelength selective reflecting film is formed, for example, of a dielectric multilayer film in which dielectric layers that differ in refractive index are layered in an alternating manner.

Another embodiment shall now be described. In the following description, portions in common to the above-described embodiment shall be provided with the same symbols and description thereof shall be omitted.

Figure 8:
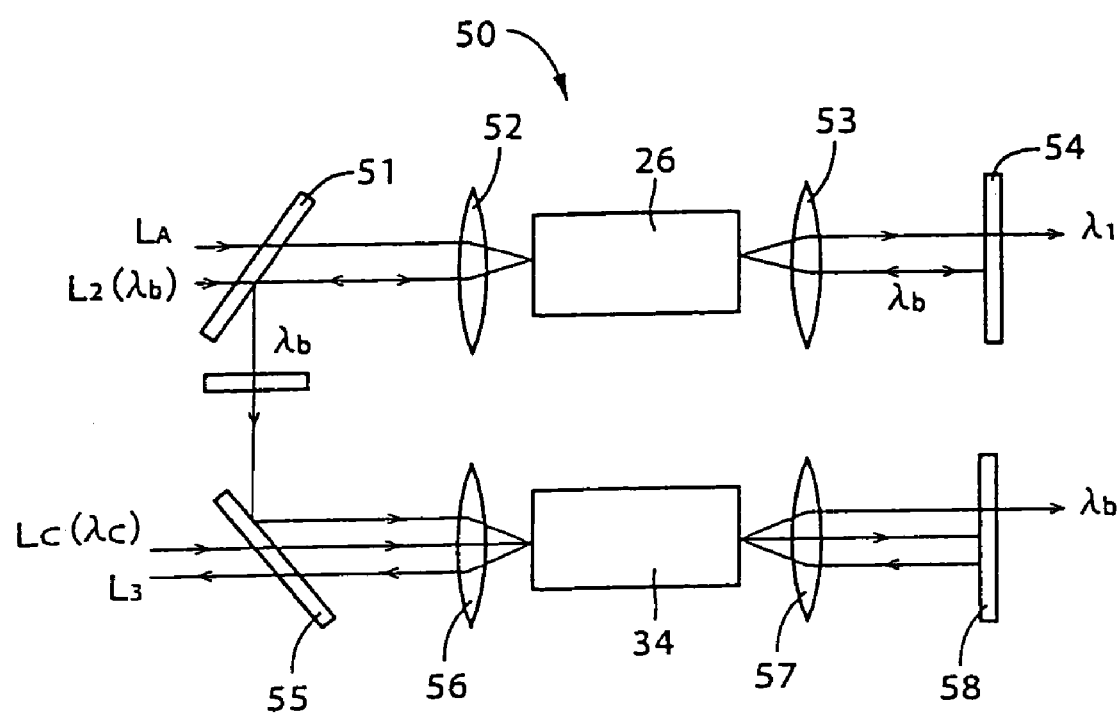
FIG. 8 is a diagram corresponding to FIG. 1 illustrating the arrangement of another embodiment of an optical signal amplifying triode.

FIG. 8 shows the principal parts of an arrangement example of an optical signal amplifying triode 50 of another embodiment of the above-described optical signal amplifying triode 10. With the optical signal amplifying triode 50 of the present embodiment, an optical signal $L_A$ is input via a half mirror 51 and a converging lens 52, which serve as the first optical input means, into one end face of the first optical amplifier 26. Among the light output from the other end face of the first optical amplifier 26 and via a converging lens 53, light of the first wavelength $\lambda_1$ is transmitted and light of a wavelength $\lambda_b$ of a bias light $L_2$ is reflected by a wavelength selective mirror 54, which functions as the first wavelength selector, and returned to the first optical amplifier 26. The light that is output from the one end face of the first optical amplifier 26 is reflected by the half mirror 51, multiplexed by a control light $L_C$ by a half mirror 55, which functions as the second optical input means, and made incident on one end face of the second optical amplifier 34 via a converging lens 56. Among the light output from the other end face of the second optical amplifier 34 and via a converging lens 57, light of the wavelength $\lambda_b$ of the bias light $L_2$ is transmitted, and the component of the same wavelength as the control light $L_C$ is reflected by a wavelength selective mirror 58, which functions as the second wavelength selector, and returned to the second optical amplifier 34. The output light $L_3$, output from the one end face of the second amplifier 34 will be the same as that of the above-described optical signal amplifying triode 10. The wavelength converter 50, arranged as described above, provides the same cross gain modulation type wavelength conversion action and optical amplification action as those of the above-described optical signal amplifying triode 10. The wavelength selective mirror 58 and the wavelength selective mirror 54 are optically coupled to the end face of the second optical amplifier 34 and the end face of the first optical amplifier 26 via the converging lens 57 and the converging lens 53. The converging lenses 52, 53, 56, and 57 are arranged, for example, from microlenses and the optical signal $L_A$, the output signal $L_3$, etc., are transmitted by optical fibers. The half mirrors 51 and 55 may be replaced by optical couplers or optical circulators.

Figure 9:
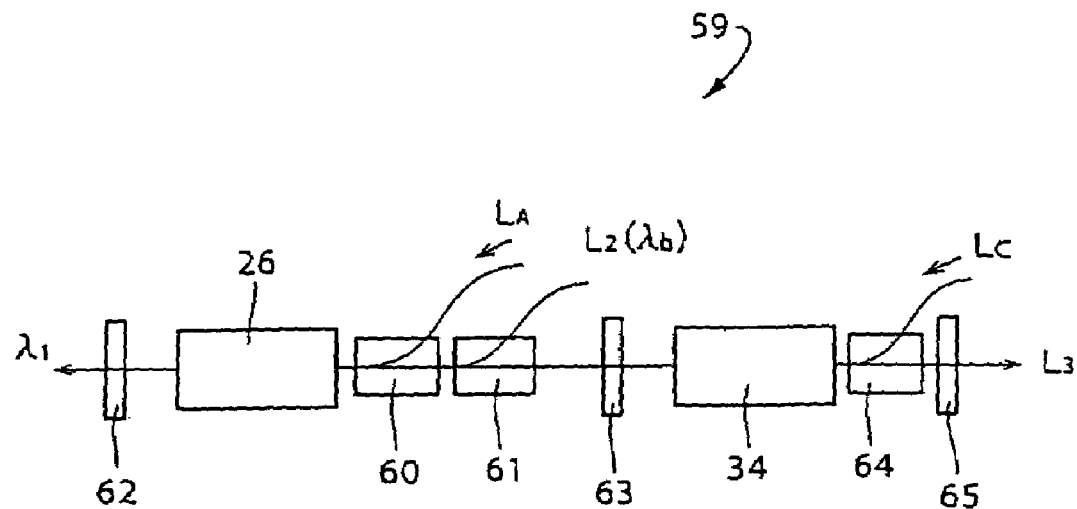
FIG. 9 is a diagram corresponding to FIG. 1 illustrating the arrangement of another embodiment of an optical signal amplifying triode.

FIG. 9 shows the principal parts of an arrangement example of an optical signal amplifying triode 59 of another embodiment of the above-described optical signal amplifying triode 10. The optical signal amplifying triode 59 of the present embodiment comprises the first optical amplifier 26 and the second optical amplifier 34, which are positioned in series, optical couplers 60 and 61, which make the optical signal $L_A$ and the bias light $L_b$ (wavelength: $\lambda_b$) be incident on the inner end face of the first optical amplifier 26, a wavelength selective reflector 62, which, from among the light from the outer end face of the first optical amplifier 26, transmits light of the first wavelength $\lambda_1$ but reflects the component of the wavelength $\lambda_b$ and returns it into the first optical amplifier 26, a filter 63, which transmits the component of wavelength $\lambda_b$ among the light emitted from the inner end face of the first optical amplifier 26 and makes it incident on the inner end face of the second optical amplifier 34, an optical coupler 64, which makes the control light $L_C$ incident on the outer end face of the second optical amplifier 34, and a filter 65, which transmits light of the same wavelength component as the control light $L_C$ among the light emitted from the outer end face of the second optical amplifier 34 and outputs it as the output light $L_3$. The optical couplers 60 and 61 function as the first optical input means, the optical coupler 64 functions as the second optical input means, and the reflector 62 and the filter 65 function as the first wavelength selector and the second wavelength selector. The wavelength converter 59, arranged as described above, provides the same cross gain modulation type wavelength conversion action and optical amplification action as those of the above-described optical signal amplifying triode 10. The optical signal of the wavelength $\lambda_c$ of the control light $L_C$ is reflected by the filter 63 and output upon transmission through the filter 65. The optical component of the wavelength $\lambda_b$ is not transmitted through the filter 65. The optical couplers 60 and 61 may be arranged from a single optical coupler.

Figure 10:
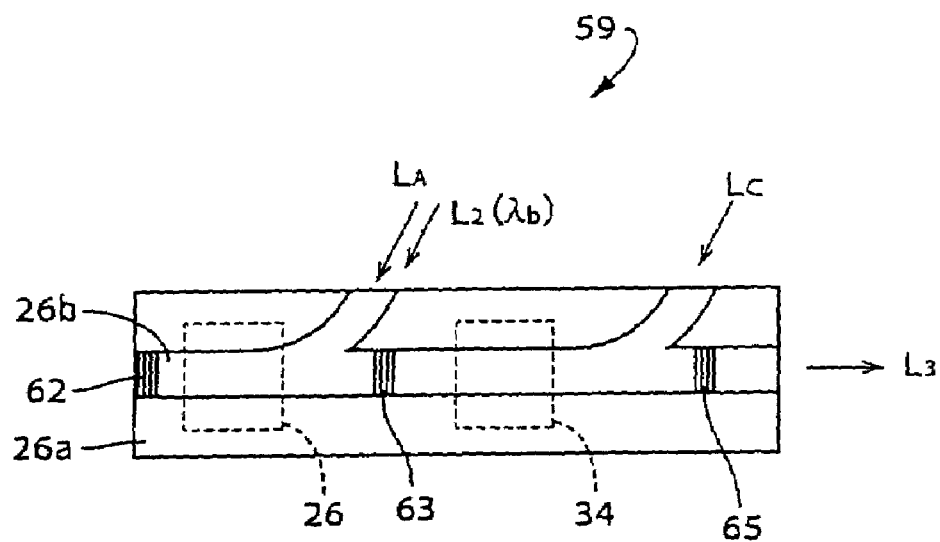
FIG. 10 is a diagram illustrating an arrangement wherein the optical signal amplifying triode of FIG. 9 is arranged as a monolithic structure.

FIG. 10 shows an example where the above-described optical signal amplifying triode 59 is arranged as a monolithic structure of the same type as the first optical amplifier 26 of monolithic structure that is shown in FIG. 2, that is, as a single chip structure on the semiconductor substrate 26a. With this embodiment's optical signal amplifying triode 59 of monolithic structure, the reflector 62, the filter 63, and the filter 65, each arranged from a grating that is varied periodically in refractive index, are disposed successively at a position at the outer side of the first optical amplifier 26, a position between the first optical amplifier 26 and the second optical amplifier 34, and at a position at the outer side of the second optical amplifier 34. The pair of branch waveguides that are branched from the straight optical waveguide 26b correspond to the optical couplers 60 and 61 and the optical coupler 64.

Figure 11:
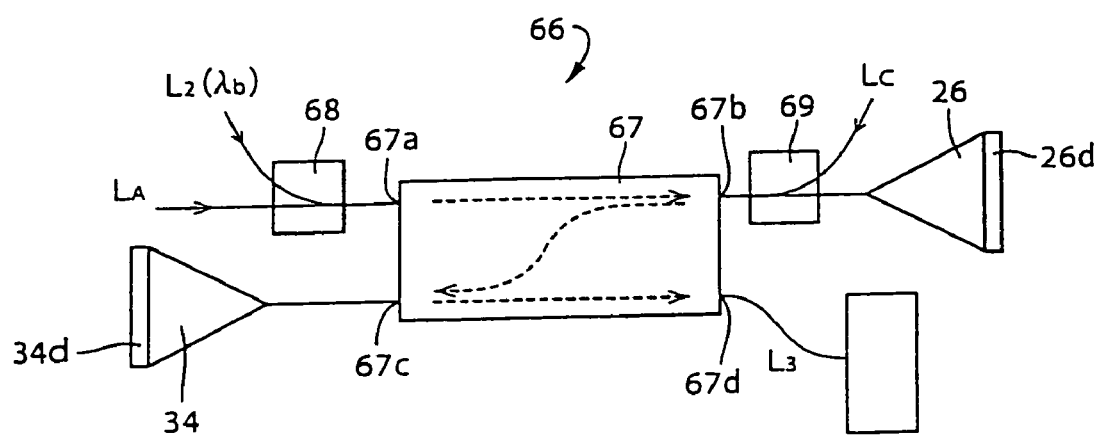
FIG. 11 is a diagram corresponding to FIG. 1 illustrating the arrangement of another embodiment of an optical signal amplifying triode wherein a four-terminal type optical circulator is used.

FIG. 11 shows the principal parts of an arrangement example of an optical signal amplifying triode 66 of another embodiment of the above-described optical signal amplifying triode 10. The wavelength converter 66 of the present embodiment comprises a pair of reflecting type first optical amplifier 26 and second optical amplifier 34, a four-terminal optical circulator 67, which is equipped with four terminals, including a second terminal 67b and a third terminal 67c that are connected to the pair of reflecting type first optical amplifier 26 and second optical amplifier 34 and which although transmitting light across the four terminals, makes the exit light from a certain terminal differ in optical path from the light incident onto that terminal, an optical coupler 68, which multiplexes the optical signal $L_A$ and the bias light $L_b$ (wavelength $\lambda_b$) and makes the multiplexed light incident onto the first terminal (first port) 67a of the four-terminal optical circulator 64, and an optical coupler 69, which multiplexes light of the wavelength $\lambda_b$ that propagates from the reflecting type first optical amplifier 36 to the second port 67b of the four-terminal optical circulator 67 with the control light $L_C$ and makes the multiplexed light incident onto the second optical amplifier 34, and makes light of the same wavelength component as the control light $L_C$ be transmitted from the fourth port 67d of the four-terminal optical circulator 67. A reflecting film 26d, which transmits light of the first wavelength $\lambda_1$ but selectively reflects light of the second wavelength $\lambda_b$, is disposed on the reflecting surface of the first optical amplifier 26, and a reflecting film 34d, which transmits light of the second wavelength $\lambda_b$ but selectively reflects light of the same wavelength $\lambda_c$ component as the control light $L_C$, is disposed on the reflecting surface of the second optical amplifier 34. The optical signal amplifying triode 66, arranged as described above, provides the same cross gain modulation type wavelength conversion action and optical amplification action as those of the above-described optical signal amplifying triode 10, and the modulation degree of the output light $L_3$ is increased due to passage through the four-terminal optical circulator 67. This embodiment's optical signal amplifying triode 66 provides the merit of being simple in arrangement in comparison to the optical signal amplifying triode 10 of FIG. 1. The optical coupler 69 may be arranged to multiplex the control light $L_C$ with light of wavelength $\lambda_b$ that propagates from the third port 67c of the four-terminal optical circulator 67 to the second optical amplifying element 34. With the present embodiment, the optical coupler 68 and the optical coupler 69 function as the first optical input means and the second optical input means, and the reflecting films 26d and 34d function as the first wavelength selector and as the second wavelength selector.

Figure 12:
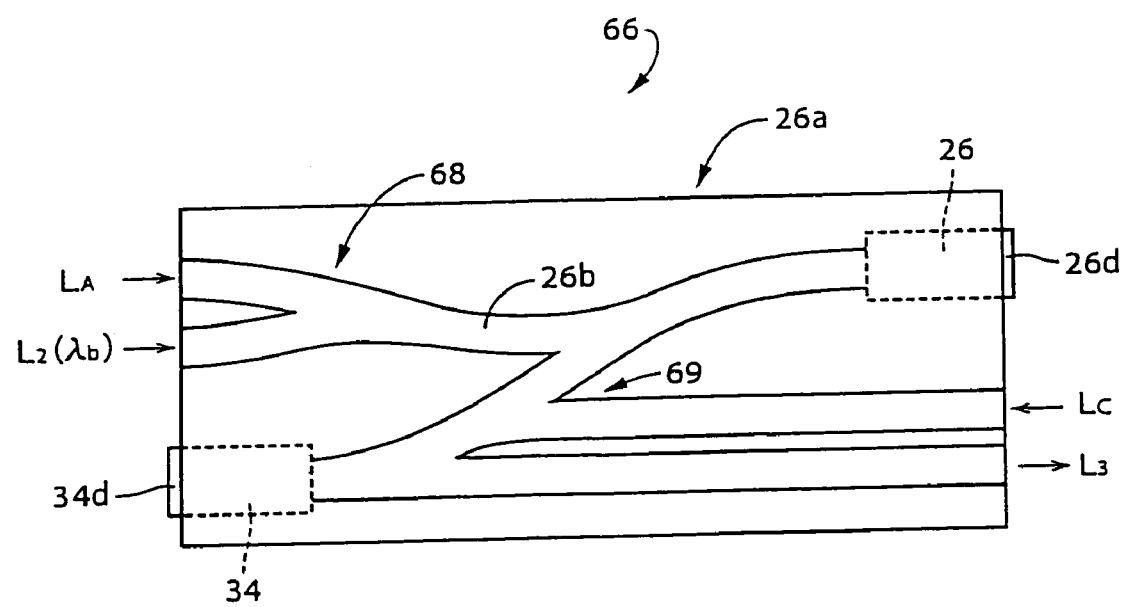
FIG. 12 is a diagram illustrating an arrangement wherein the optical signal amplifying triode of FIG. 11 is arranged as a monolithic structure.

FIG. 12 shows an example where the above-described optical signal amplifying triode 66 is arranged as a monolithic structure. As with the above-described arrangements of FIG. 6 and FIG. 10, this optical signal amplifying triode 66 of monolithic structure is equipped with the optical waveguide 26b formed on the semiconductor substrate 26a. This optical waveguide 26b is provided with a Z-like portion for providing the same function as the four-terminal optical circulator 67 and branch waveguides, which are branched from portions of the Z-like portion, for providing the functions of the optical couplers 68 and 69. At the refraction point of the Z-like portion of the optical waveguide 26b, the pair of reflecting type first optical amplifier 26 and second optical amplifier 34 are arranged in the same manner as those shown in FIG. 2 and FIG. 10 described above. The reflecting films 26d and 34d are provided at the outer end faces of the reflecting type first optical amplifier 26 and second optical amplifier 34.

Figure 13:
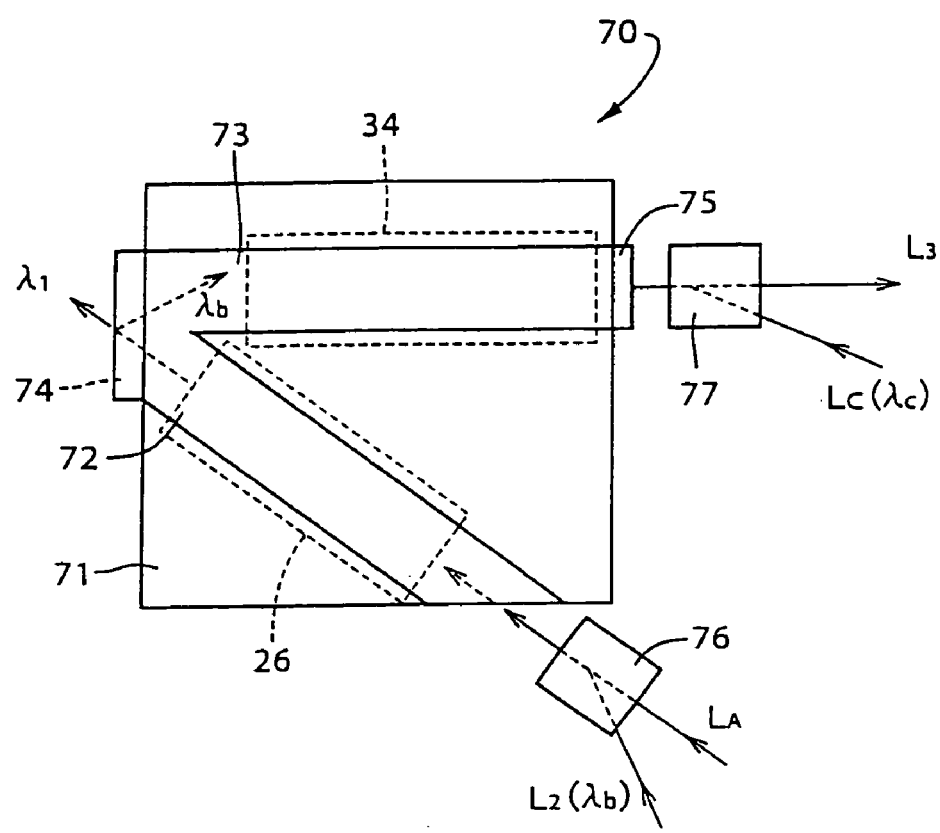
FIG. 13 is a diagram illustrating the arrangement of another embodiment of an optical signal amplifying triode, which is a monolithic structure having a V-type optical waveguide that has been epitaxially grown on a semiconductor substrate.

FIG. 13 shows the principal parts of an arrangement example of an optical signal amplifying triode 70 of another embodiment of the above-described optical signal amplifying triode 10. The optical signal amplifying triode 70 of the present embodiment comprises the first optical amplifier 26 and the second optical amplifier 34, respectively formed by providing a first optical waveguide 72 and a second optical waveguide 73 by shaping mixed crystal semiconductor layers, each having a pn junction layer (active layer) of, for example, GaInNAs grown on a rectangular semiconductor substrate 71 of, for example, GaAs, to a V-like shape by photolithography, and providing first optical waveguide 72 and second optical waveguide 73 with unillustrated electrodes, a wavelength selective reflecting film 74, disposed at an intersecting portion of the first optical waveguide 72 and the second optical waveguide 73 at one end face of the rectangular semiconductor substrate 71 and reflecting the control light $L_C$ and light of the second wavelength $\lambda_b$ of the bias light $L_b$ towards second optical waveguide 73 but selectively transmitting light of the first wavelength $\lambda_1$ of the optical signal $L_A$, and a wavelength selective reflecting film 75, disposed at the output side of the second optical waveguide 73 at one end face of the rectangular semiconductor substrate 71 and reflecting light of the second wavelength $\lambda_b$ but transmitting light of the same wavelength component as the control light $L_C$. The optical signal $L_A$ and bias light $L_b$ are multiplexed by an optical coupler 76 and then made incident onto an end face of optical waveguide 72, and the control light $L_C$ is made incident into the second waveguide 73 from an optical coupler 77, disposed at the outer side of the wavelength selective reflecting film 75. The optical signal amplifying triode 70, arranged as described above, provides the same cross gain modulation type wavelength conversion action and optical amplification action as those of the above-described optical signal amplifying triode 10. Also, since this embodiment's optical signal amplifying triode 70 is arranged as a single chip by processing mixed crystal semiconductor layers, each having a pn junction layer (active layer) formed of a group III-V mixed crystal layer, such as GaInNAs, grown on the rectangular semiconductor substrate of, for example, GaAs, by photolithography and providing electrodes, the merit of enabling an arrangement of extremely small size is provided. With the present embodiment, the optical couplers 76 and 77 function as the first and second optical input means and the wavelength selective reflecting film 74 and the wavelength selective reflecting film 75 function as the first wavelength selector and the second wavelength selector.

Figure 14:
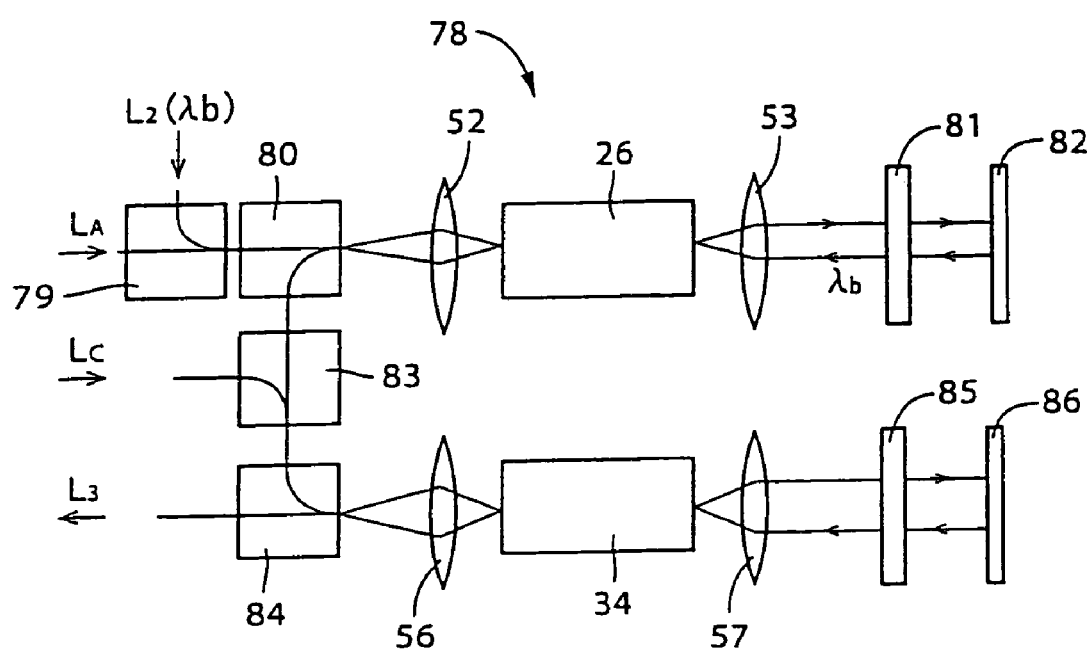
FIG. 14 is a diagram corresponding to FIG. 1 illustrating the arrangement of another embodiment of an optical signal amplifying triode.

FIG. 14 shows the principal parts of an arrangement example of an optical signal amplifying triode 78 of another embodiment of the above-described optical signal amplifying triode 10. With the optical signal amplifying triode 78 of the present embodiment, the optical signal $L_A$ is input into one end face of the first optical amplifier 26 via an optical coupler 79, used as a multiplexer, an optical coupler 80, used as an optical splitter, and the converging lens 52, and among the light output from the other end face of the first optical amplifier 26 and via the converging lens 53, the wavelength $\lambda_1$ of the above-mentioned optical signal $L_A$ is not transmitted (is absorbed) by a wavelength selective filter 81 and light of the wavelength $\lambda_b$ of the bias light is transmitted through the filter 81, reflected by a total reflecting mirror 82, and returned to the first optical amplifier 28. Light that is output from the one end face of the first optical amplifier 26 is transmitted from the optical coupler 80 to another optical coupler 83 and multiplexed there with the control light $L_C$. The light is then made incident on one end face of the second optical amplifier 34 through an optical coupler 84 and the converging lens 56. Among the light output from the other end face of the second optical amplifier 34 and through converging lens 57, light of the wavelength $\lambda_b$ of the bias light is not transmitted (is absorbed) by a wavelength selective filter 85 and component of the same wavelength $\lambda_c$ as control light $L_C$ is transmitted through the filter 85, reflected by a total reflecting mirror 86, and returned to the second optical amplifier 34. The output light $L_3$, which is output from the one end face of the second optical amplifier 34 is output via an optical coupler 84 to an external optical distributor 150, such as that described below. The optical signal amplifying triode 78, arranged as described above, not only provides the same cross gain modulation type wavelength conversion action and optical amplification action as those of the above-described optical signal amplifying triode 10 but also provides that merit that the characteristics are improved further due to the wavelength $\lambda_1$ of the optical signal $L_A$ being absorbed and not transmitted by wavelength selective filter 81 and the proportion thereof that returns to the first optical amplifier 26 side thus being made extremely small. With the present embodiment, the optical coupler 79 and the optical coupler 84 function as the first optical input means and the second optical input means and the wavelength selective filter 81 and the wavelength selective filter 85 function as the first wavelength selector and the second wavelength selector.

Figure 15:
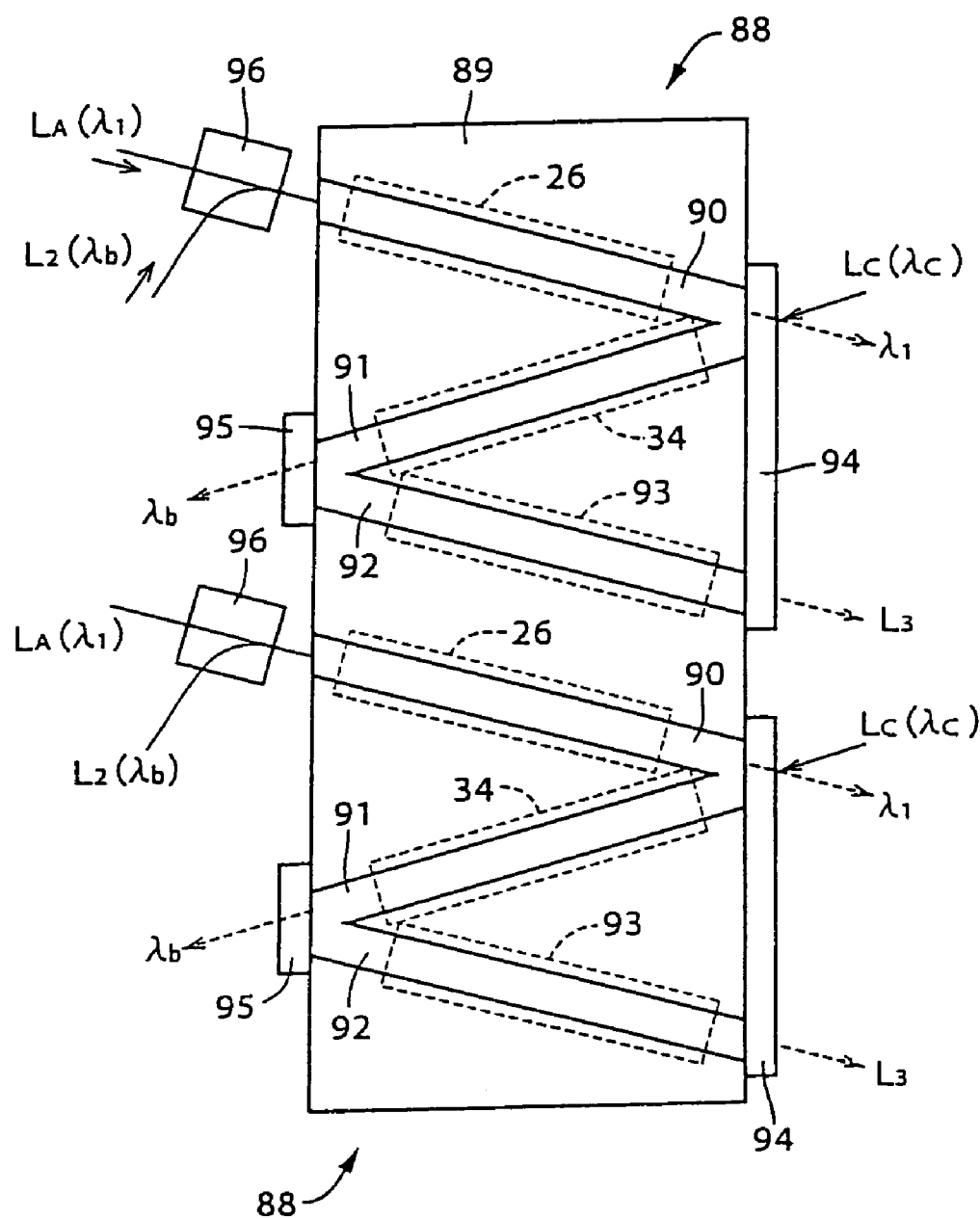
FIG. 15 is a diagram illustrating the arrangement of another embodiment of an optical signal amplifying triode, which is a monolithic structure equipped with V-type optical waveguides that have been epitaxially grown on a semiconductor substrate.

FIG. 15 shows the principal parts of an arrangement example of another embodiment of the above-described optical signal amplifying triode 10, which is a monolithic structure wherein a plurality (two in the present embodiment) of optical signal amplifying triodes 88 are integrated in a single chip. Each of the plurality of optical signal amplifying triodes 88 of the present embodiment comprises the first optical amplifier 26, the second optical amplifier 34, and a third optical amplifier 93, respectively formed by providing a first optical waveguide 90, a second optical waveguide 91, and a third optical waveguide 92 by shaping, by photolithography, mixed crystal semiconductor layers, each having a pn junction layer (active layer) of, for example, GaInNAs grown on a rectangular semiconductor substrate 89 of, for example, GaAs, into straight lines, extending from one end face to the other end face and forming V-like shapes in adjacent pairs, and by providing the first optical waveguide 90, the second optical waveguide 91, and the third optical waveguide 92 with unillustrated electrodes, a wavelength selective reflecting film (wavelength selective mirror) 94, disposed at an intersecting portion of the first optical waveguide 90 and the second optical waveguide 91 and across the output side end face of the third optical waveguide 92 at one end face of the rectangular semiconductor substrate 89 and reflecting the control light $L_C$ and light of the second wavelength $\lambda_b$ of the bias light $L_b$ towards the second optical waveguide 91 and selectively transmitting the control light $L_C$ and light of the first wavelength $\lambda_1$ of the optical signal $L_A$, and a wavelength selective reflecting film (wavelength selective mirror) 95, disposed at the output side end face of the second optical waveguide 91 at one end face of the rectangular semiconductor substrate 89 and transmitting light of the second wavelength $\lambda_b$ but reflecting light of the same wavelength component as the control light $L_C$ to the third optical waveguide 92. The optical signal $L_A$ and bias light $L_b$ are multiplexed by an optical coupler 96 and then made incident onto the input side end face of the first optical waveguide 90 and the control light $L_C$ is made incident into the second optical waveguide 91 from the exterior of the wavelength selective reflecting film 94. Each of the optical signal amplifying triodes 88, arranged as described above, provides the same cross gain modulation type wavelength conversion action and optical amplification action as those of the above-described optical signal amplifying triode 10. Also, since this embodiment's optical signal amplifying triodes 88 are arranged as a single chip by processing mixed crystal semiconductor layers, each having a pn junction layer (active layer) formed of a group III-V mixed crystal layer, such as GaInNAs, grown on a rectangular semiconductor substrate of, for example, GaAs, by photolithography and providing electrodes, the merit of enabling the optical signal amplifying triode 10, which can perform signal processing of optical signals of, for example, the 1.3 μm band, to be arranged at an extremely small size is provided. Also with this embodiment, a circulator is made unnecessary and a higher output is enabled by the three optical amplifiers 26, 34, and 93. With the present embodiment, the optical coupler 96 functions as the first optical input means, the wavelength selective reflecting film 94 functions as the second optical input means and the first wavelength selector, and the wavelength selective reflecting film 95 functions as the second wavelength selector.

FIG. 16 to FIG. 33 illustrate embodiments related to an optical signal transfer method and an optical signal router, that is, an optical signal relay (transfer) device for favorably carrying out the optical signal transfer method, and with these embodiments, optical communication for advanced information processing is enabled by the transferring of a optical signal train, which has been transmitted via a predetermined transmission path, to transmission paths, among a plurality of transmission paths, that correspond to the routing information contained in the optical signal.

Figure 16:
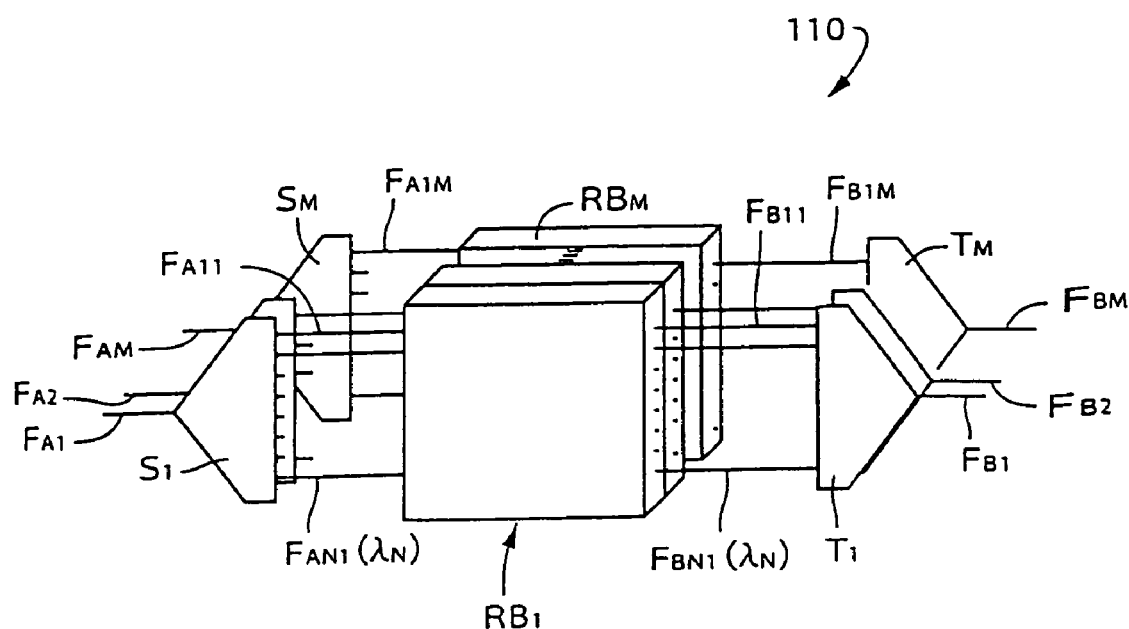
FIG. 16 is a schematic view illustrating the arrangement of an optical signal relay that is an embodiment of a device to which an optical signal transfer method is applied.

FIG. 16 is a diagram that schematically shows an optical signal relay (transfer) device 110 that is disposed between input optical fibers $F_{A1}$ to $F_{AM}$, which are a plurality of transmission paths in one optical network, and output optical fibers $F_{B1}$ to $F_{BM}$, which are a plurality of transmission paths in another optical network, and transfers each of wavelength multiplexed optical signals (laser light) $L_{A1}$ to $L_{AM}$, transmitted via any of the input optical fibers $F_{A1}$ to $F_{AM}$, to a wavelength bus in an output optical fiber among the output optical fibers $F_{B1}$ to $F_{BM}$ that has been determined based on routing information added by amplitude modulation to the optical signal. This optical signal relay device 110 is also referred to as an optical signal router.

In FIG. 16, each of the optical signals $L_{A1}$ to $L_{AM}$, transmitted via any of input optical fibers $F_{A1}$ to $F_{AM}$, is a wavelength division multiplexed (WDM) signal in which optical signals of a predetermined plurality of types of wavelengths are overlapped. Thus for example, an optical signal $L_{A11}$ of the wavelength $\lambda_1$ among a series of predetermined wavelengths contained in the optical signal $L_{A1}$ is, in accordance with routing information provided by amplitude modulation being applied to a label portion or tag portion thereof, transferred to a wavelength bus in an optical fiber $F_B$ among the output optical fibers $F_{B1}$ to $F_{BM}$, that is, transferred at a wavelength among a predetermined plurality of types, that is, N types of wavelengths $\lambda_1$ to $\lambda_N$. Wavelength multiplexed optical signals (laser light) $L_{B1}$ to $L_{BM}$ are transmitted by means of the output optical fibers $F_{B1}$ to $F_{BM}$, respectively.

In addition to M optical splitters (AWGs: Arrayed Waveguide Gratings) $S_1$ to $S_M$, which separate the wavelength multiplexed optical signals $L_{A1}$ to $L_{AM}$, transmitted from the predetermined number, that is, the M input optical fibers $F_{A1}$ to $F_{AM}$, respectively into optical signal trains (packets) according to the N types of wavelengths $\lambda_1$ to $\lambda_N$, so that, for example, the optical signal $L_{A1}$ is separated into $L_{A11}$ to $L_{A1N}$, the optical signal relay device 110 comprises M relays of first relay $R_1$ to Mth relay $R_M$, which perform wavelength conversion of the optical signal trains (packets). $L_{A11}$ to $L_{A1N}$ of N types of wavelengths $\lambda_1$ to $\lambda_N$ in accordance with the routing information attached to the optical signal trains by amplitude modulation and perform addition of the prior routing information or new routing information by amplitude modulation, and M multiplexers (AWGs) $T_1$ to $T_M$, which multiplex the optical signals output from first relay $R_1$ to Mth relay $R_M$ and guide the multiplexed signals to output optical fibers $F_{B1}$ to $F_{BM}$.

Figure 17:
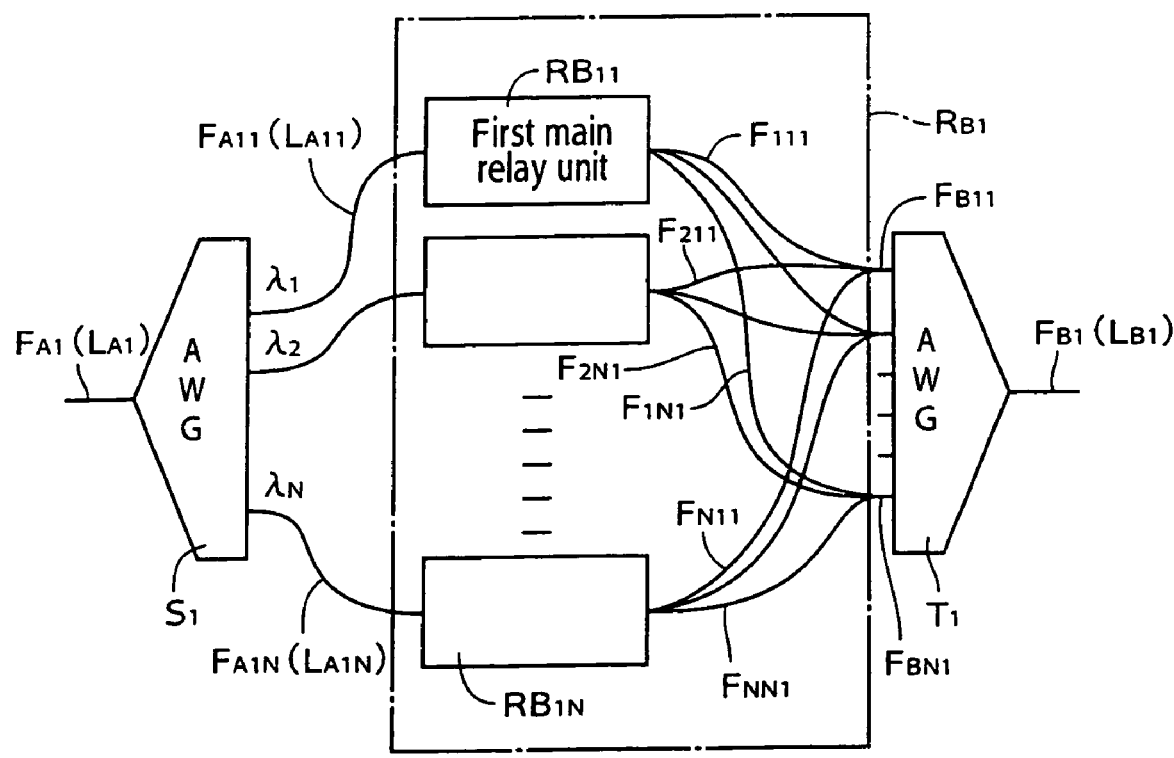
FIG. 17 is a block diagram illustrating an arrangement example of one relay among a plurality of relays that make up a portion of the optical signal relay device of the embodiment of FIG. 16.

FIG. 17 is a diagram illustrating the arrangement of a first relay $R_1$, disposed at a position between the input optical fiber $F_{A1}$ and the output optical fiber $F_{B1}$, as a representative example for describing the arrangement of the first relay $R_1$ to Mth relay $R_M$, which are arranged in the same manner as each other. In FIG. 17, the first relay $R_1$, is equipped with N main relay units, that is, first main relay unit $RB_{11}$ to Nth main relay unit $RB_{1N}$, which are arranged in the same manner as each other, and when the optical splitter $S_1$ separates the wavelength multiplexed optical signal $L_{A1}$, transmitted from the input optical fiber $F_{A1}$, into the optical signal trains (packets) $L_{A11}$ to $L_{A1N}$ in accordance with the N types of wavelengths $\lambda_1$ to $\lambda_N$, and these signal trains are input via optical fibers $F_{A11}$ to $F_{A1N}$, the main relay units perform wavelength conversion of the optical signals $L_{A11}$ to $L_{A1N}$ in accordance with the routing information attached to the label portions or tag portions of the optical signals by amplitude modulation and output optical signals upon adding, by amplitude modulation, the same routing information as those up until now or new routing information. The output signals of any of the wavelengths of the N types of wavelengths $\lambda_1$ to $\lambda_N$, which have been output respectively from the first main relay unit $RB_{11}$ to the Nth main relay unit $RB_{1N}$, are connected to the multiplexer $T_1$ respectively via N×N cross-connected fibers $F_{111}$ to $F_{NN1}$ for transmitting optical signals that have been branched according to the wavelength and the routing information. The output signals from the first main relay unit $RB_{11}$ to the Nth main relay unit $RB_{1N}$ are thus transmitted at the desired wavelengths via the desired output optical fibers among the output optical fibers $F_{B11}$ to $F_{BN1}$ to the multiplexer $T_1$. The main relay units $RB_{21}$ to $RB_{MN}$ that make up the other relays $R_2$ to $R_M$ are likewise connected to the multiplexers $T_2$ to $T_M$ respectively via N×N cross-connected fibers $F_{112}$ to $F_{NM2}$ . . . N×N cross-connected fibers $F_{11M}$ to $F_{NNM}$. As shown in FIG. 17, the output ends of, for example, the cross-connected fibers $F_{111}$, $F_{211}$, . . . $F_{N11}$, which transmit signals of the same wavelength, that is, the wavelength $\lambda_1$, are coupled together and input via the fiber $F_{B11}$ into the multiplexer $T_1$. The output ends of the cross-connected fibers $F_{1N1}$, $F_{2N1}$, . . . $F_{NN1}$, which transmit signals of wavelength $\lambda_N$, are coupled together and input via the fiber $F_{BN1}$ into the multiplexer $T_1$.

The optical splitter $S_1$ is a well-known optical splitting circuit that is arranged, for example, using an angular dispersion element, such as a diffraction grating, prism, etc., a wavelength selective reflecting/transmitting film, such as an interference filter arranged from a dielectric multilayer film, etc., or an optical waveguide type optical splitting circuit, etc. The multiplexer $T_1$ is arranged, for example, from an optical directional coupling circuit, having microlenses as principal components, a distribution coupling type optical multiplexing coupler, wherein portions of a plurality of optical fibers disposed in parallel are coupled together locally, or a concentrated coupling type optical multiplexing coupler that makes use of multiple reflection at the inner walls of a rectangular tube or mixing in a flat plate.

Figure 18:
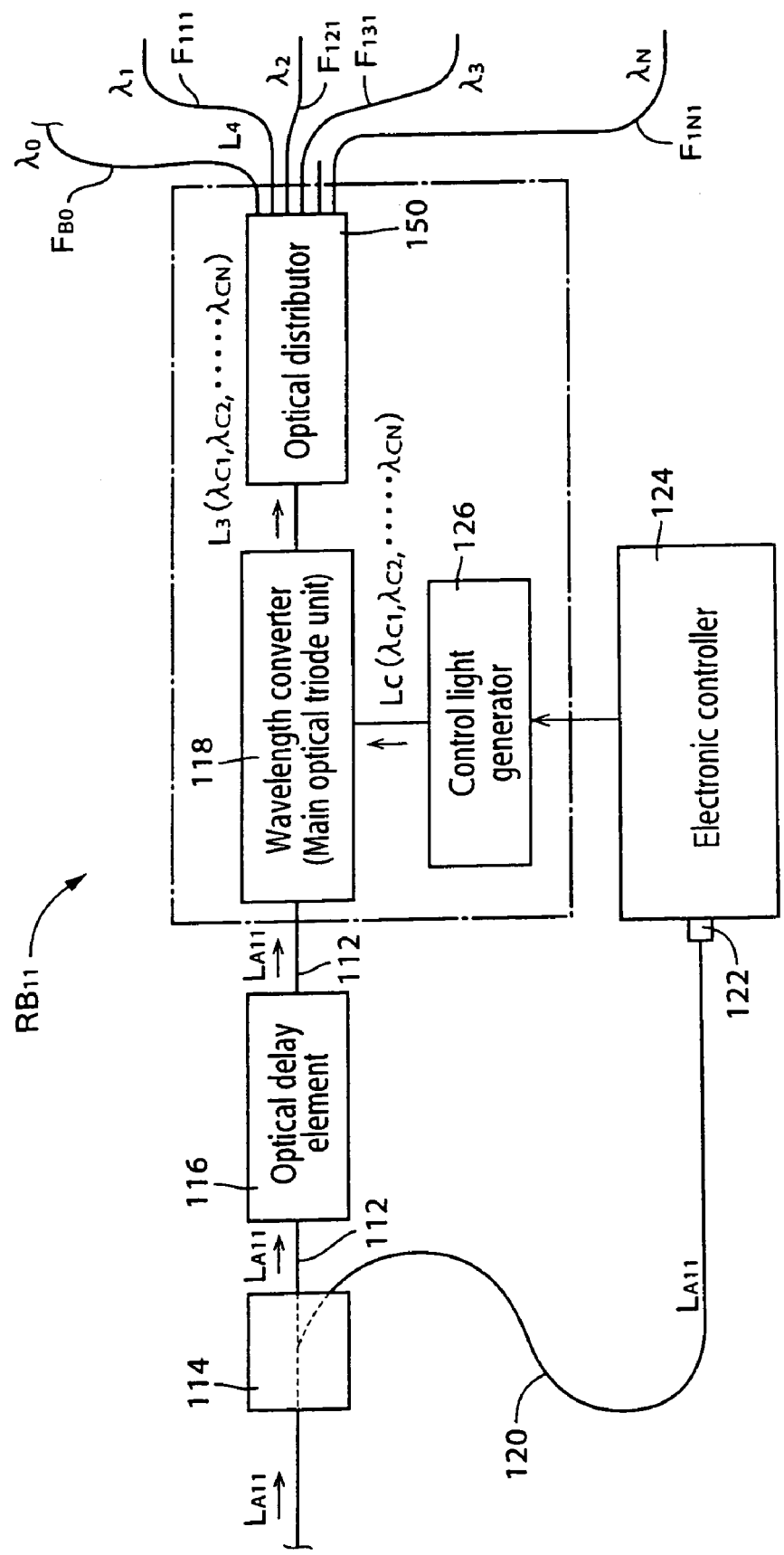
FIG. 18 is a block diagram illustrating the arrangement of the relay of FIG. 17.

Also, the first main relay unit $RB_{11}$ is arranged, for example, as shown in FIG. 18. In FIG. 18, the optical signal $L_{A11}$, input from the optical splitter $S_1$ via the optical fiber $F_{A11}$, is connected successively to a first optical coupler 114, which functions as an optical splitter/coupler, an optical delay element 116, and a cross gain modulation type wavelength converter (optical switching device or main optical signal amplifying triode unit) 118. The first optical coupler 114 is arranged from a branching circuit, having optical fibers as principal components, or a branching circuit, having microlenses as principal components, etc. A branching circuit having optical fibers as principal components is arranged, for example, by putting a pair of optical fibers into a parallel state of mutual close contact with each other or into a state of mutual close contact by twisting the fibers mutually in spiral form over a predetermined interval and disposing a reflecting film that can transmit and reflect at a branching point of the fibers. With a branching circuit having microlenses as principal components, for example, light that has been formed into a parallel beam by means of a converging rod lens is branched using a wedge type refracting surface or reflecting surface. Since this first optical coupler 114 is equipped with bidirectionality, that is, with reversibility, it functions as a multiplexer, which, when optical signals are propagated in an opposite direction, multiplexes the optical signals and makes the multiplexed signal propagate in the opposite direction inside a first optical fiber 112.

The optical delay element 116 delays an optical signal, transmitted inside the above-mentioned optical fiber $F_{A11}$ by just a predetermined amount of time and is arranged, for example, by winding an optical fiber of predetermined length and thereby providing a propagation distance to delay the optical signal by the propagation time it takes for the optical signal to propagate across the predetermined propagation distance. The delay time of the optical delay element 116 is determined by experiment in advance so that the optical signal to be subject to wavelength conversion inside the wavelength converter 118 will be synchronized with the control light that indicates the transmission destination of the optical signal.

The branched optical signal that is branched by the first optical coupler 114 from the optical signal inside the optical fiber $F_{A11}$ is supplied to an electronic controller 124, via an optical fiber 120 and a photoelectrical signal converter 122 connected thereto. The electronic controller 124 is, for example, arranged from a so-called microcomputer, wherein a CPU processes the input signal in accordance with a program stored in advance in a ROM and using the temporary storage function of a RAM. Based on a code signal, that is, routing information indicated by amplitude modulation and contained in the optical signal transmitted via the optical fiber 120, the electronic controller 124 supplies a wavelength command signal, corresponding to the routing information for routing the optical signal, to a control light generator 126. Since the electronic controller 124 extracts, for example, just the amplitude modulation signal contained in the optical signal $L_{A11}$ input from the optical fiber 120 and makes the control light $L_C$, which is in accordance with the wavelength corresponding to the routing information indicated by the amplitude modulation, be generated from the control light generator 126, electromagnetic waves corresponding to signals besides the address signal are not generated.

Figure 19:
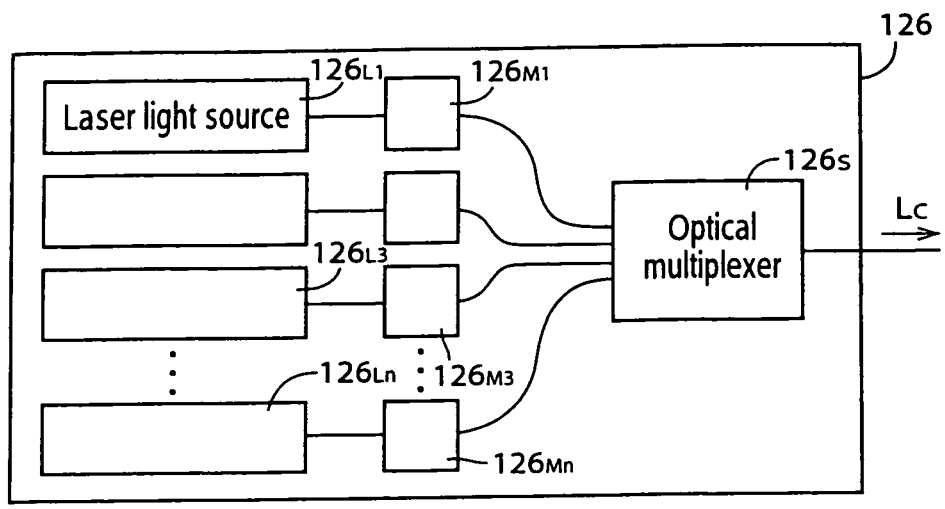
FIG. 19 is a block diagram illustrating an arrangement example of a control light generator of FIG. 18.
Figure 20:
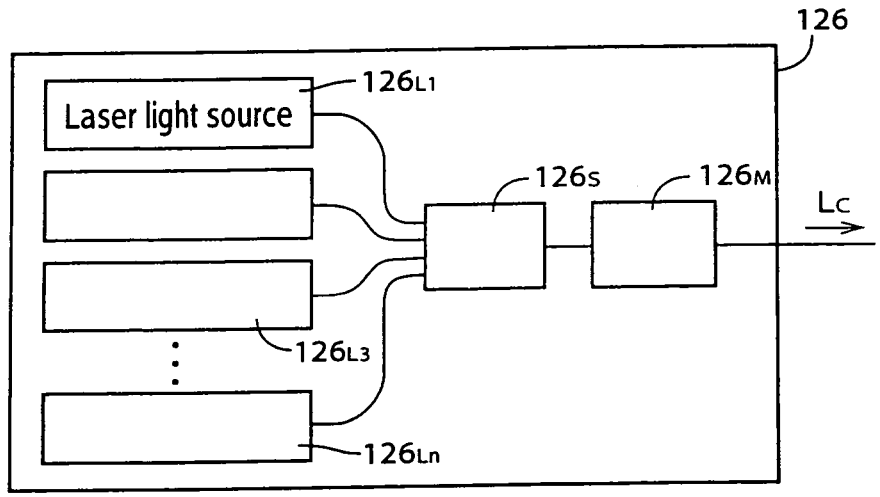
FIG. 20 is a block diagram illustrating another arrangement example of the control light generator of FIG. 18.
Figure 21:
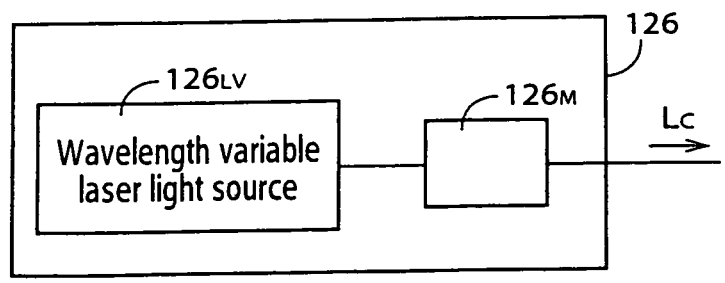
FIG. 21 is a block diagram illustrating another arrangement example of the control light generator of FIG. 18.

The control light generator 126 has a control light source that outputs the control light $L_C$ of a plurality of priorly set types of wavelengths $\lambda_c$ and, in accordance with the command signal from the electronic controller 124, that is, in accordance with the wavelength command signal selected in accordance with the branching information contained in the optical signal $L_1$, supplies control light $L_C$ of wavelengths $\lambda_c$ corresponding to the branching information to the wavelength converter 118. The control light generator 126 generates in an alternative or selective manner, the control light $L_C$ of a plurality of types, for example, N types of wavelengths $\lambda_{c1}$, $\lambda_{c2}$, $\lambda_{c3}$, . . . $\lambda_{cN}$ in correspondence to the number of wavelength buses inside the transfer destination output optical fibers $F_{B1}$ to $F_{BM}$. FIG. 19, FIG. 20, and FIG. 21 respectively illustrate arrangement examples of the control light generator 126.

In FIG. 19, the control light generator 126 comprises a plurality of laser light sources $126_{L1}$ to $126_{Ln}$, which are the control sources that output light, each of a single wavelength and differing from each other in wavelength, a plurality (N units) of optical modulators $126_{M1}$ to $126_{Mn}$, respectively being disposed at the output sides of the respective laser light sources $126_{L1}$ to $126_{Ln}$ to perform switching of the respective output light of laser light sources, and a single optical multiplexer $126_S$, which multiplexes the light transmitted via optical modulators $126_{M1}$ to $126_{Mn}$, and, by the operation of laser light sources $126_{L1}$ to $126_{Ln}$ and optical modulators $126_{M1}$ to $126_{Mn}$ in accordance with the branching command signal from the electronic controller 124, outputs control light $L_C$ of wavelengths $\lambda_c$ that have been selected in accordance with the routing information (branching information) indicated by the amplitude modulation signals contained in the optical signal $L_{A11}$. Semiconductor laser diodes are used, for example, as the plurality of laser light sources $126_{L1}$ to $126_{Ln}$. In FIG. 20, the control light generator 126 comprises the plurality of laser light sources $126_{L1}$ to $126_{Ln}$, which correspond to being the control light sources that output light, each of a single wavelength and differing from each other in wavelength, the single optical multiplexer $126_S$, which multiplexes the light output from the laser light sources $126_{L1}$ to $126_{Ln}$ in a single waveguide, and a single optical modulator $126_M$, which is disposed at the output side of the optical multiplexer $126_S$ and performs switching of the output light to cut off the blanking interval, and, by the operation of the laser light sources $126_{L1}$ to $126_{Ln}$ and the optical modulator $126_M$ in accordance with the branching command signal from the electronic controller 124, outputs control light $L_C$ of wavelengths $\lambda_c$ that have been selected in accordance with the branching information contained in the optical signal $L_{A11}$. In FIG. 21, the control light generator 126 comprises a wavelength variable laser light source $126_{LV}$, with which the wavelength of the output light can be varied, and the single optical modulator $126_M$, which is disposed at the output side of the wavelength variable laser light source $126_{LV}$ and performs switching of the output light to cut off the blanking interval, and, by the operation of the wavelength variable laser light source $126_{LV}$ and the optical modulator $126_M$ in accordance with the branching command signal from the electronic controller 124, outputs control light $L_C$ of wavelengths $\lambda_c$ that have been selected in accordance with the branching information contained in the optical signal $L_1$. For example a distributed Bragg reflection laser, a micromachine surface emission laser, a thermally tuned DFB laser, etc., is used as the wavelength variable laser light source $126_{LV}$. With a distributed Bragg reflection laser, an electric current is injected in to a DBR layer (Bragg reflection layer) that makes up one of a pair of mirrors that make up an optical oscillator of the laser and the refractive index of this portion is varied by a plasma effect to vary the optical oscillation wavelength. With a micromachine surface emission laser, the optical oscillation frequency is varied by the variation of the optical oscillator length by a micromachine. With a thermally tuned DFB laser, the optical oscillation wavelength is varied by a refractive index variation due to temperature. Each of the optical modulators $126_{M1}$ to $126_{Mn}$ and $126_M$ is arranged, for example, from a semiconductor optical modulator, with which transmitted light is switched on or off by a drive current or a drive voltage being applied to a pn junction portion, an externally modulated optical modulator, with which transmitted light is switched on or off by the application of a drive voltage from the exterior to lithium niobate or other monocrystal or substance that exhibits an electrooptical effect.

Figure 22:
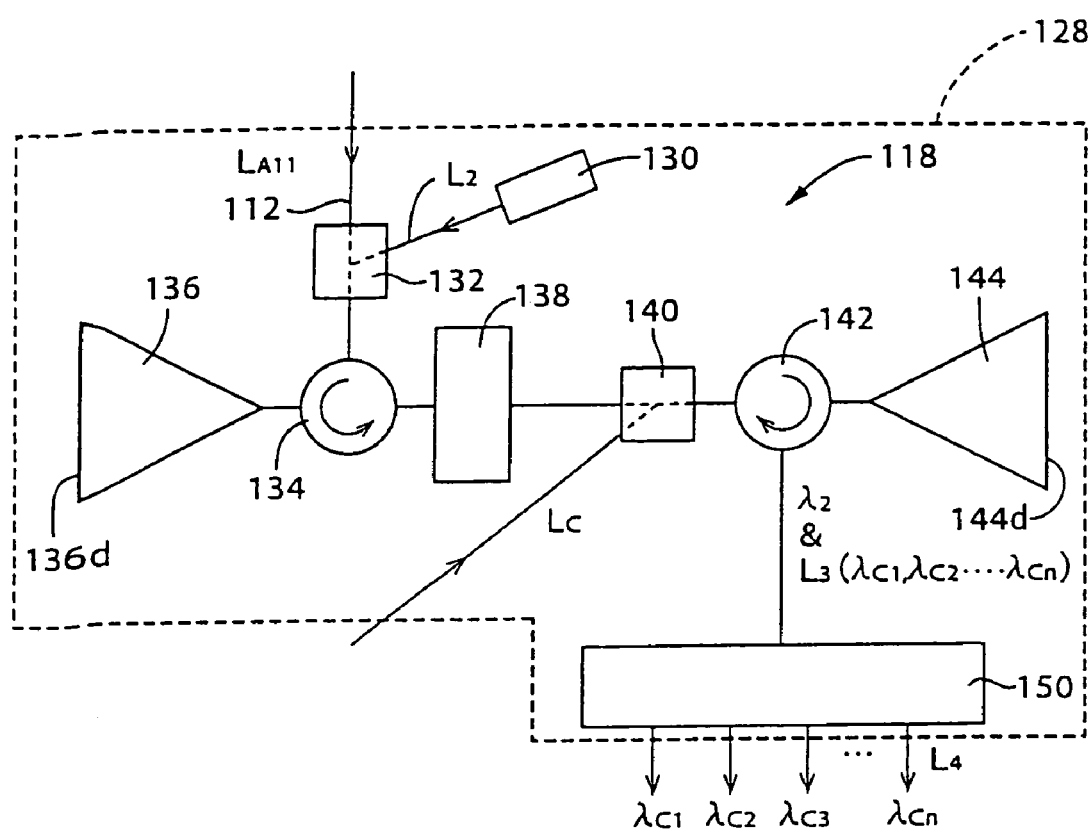
FIG. 22 is a block diagram illustrating an arrangement example of an optical signal amplifying triode of FIG. 18.

Along with the optical distributor 150, which also functions as the second wavelength selector, the optical wavelength converter 118 of FIG. 18 makes up an optical signal amplifying triode 128, which is basically arranged in the same manner as any of the optical signal amplifying triodes 10, 50, 59, 66, 70, 78, and 88 shown in FIG. 1 and FIG. 8 to FIG. 15. As shown in FIG. 22, the present embodiment's optical wavelength converter 118 has a pair of first optical amplifier 136 and second optical amplifier 144, which correspond to being the plurality of optical amplifiers that make use of cross gain modulation characteristics to amplify, perform wavelength conversion, and output light that has been input via first optical fiber 112, equipped in series and is arranged to amplify the optical signal input via the first optical fiber 112 and output the light $L_3$ of the same wavelength as the control light $L_C$ in synchronization with the input of the control light $L_C$ corresponding to the branching information contained in the optical signal. That is, in FIG. 22, a laser light source 130 is arranged from a single-wavelength semiconductor laser and performs continuous output at fixed intensity of a laser light (second input light) $L_2$ of a wavelength $\lambda_2$ of, for example, 1565 nm that is longer than the wavelength $\lambda_1$ of, for example, 1555 nm, of the optical signal $L_1$ (first input light). A third optical coupler 132 functions as the first optical input means that overlaps (multiplexes) the optical signal $L_1$, which had been amplitude modulated and transmitted inside the first optical fiber 112, with the laser light $L_2$, which is continuous light, and outputs the multiplexed light to the first optical amplifier 136 via the first optical circulator 34.

As with the first optical amplifier 26, shown in FIG. 2, each of the first optical amplifier 136 and the second optical amplifier 144 is arranged from a semiconductor optical amplifier (SOA). Since the first optical amplifier 136 is equipped on one end face thereof with a reflecting means 136d, which is a mirror having an end face treatment for reflection of light applied thereto by sputtering, etc., input of light or output of light is carried out through the other end face positioned at the opposite side of the one end face. The multiplexed light of the optical signal $L_1$ (first input light) and the laser light (second input light) $L_2$ of the longer wavelength $\lambda_2$ is thus input into the first optical amplifier 136 through the above-mentioned other end face, and light reflected by the reflecting means 136d is output by passing through the other end face again. As with the first optical amplifier 26 shown in FIG. 2, in the active layer of the first optical amplifier 136, light of the second wavelength $\lambda_2$ is amplified upon being modulated in the same manner as but inversely in phase with respect to the modulation of optical signal $L_1$ and then output from the first optical amplifier 136. The first optical amplifier 136, as well as the second optical amplifier 144, is thus equipped with cross gain modulation characteristics, that is, mutual gain modulation characteristics.

In FIG. 22, a first optical circulator 134 guides the light output from the first optical amplifier 136 not to the third optical coupler 132 but to a first wavelength selector 138. The first wavelength selector 138 extracts light of 1565 nm, which is the second wavelength $\lambda_2$, from among the light output from the first optical amplifier 136. This first wavelength selector 138 functions as an optical filter element and, for example, is a fiber grating filter, which is formed by making a portion of an optical fiber vary periodically in refractive index in the longitudinal direction by localized illumination of ultraviolet rays and selectively transmits light at a half-width, for example, of 1 nm to less than 20 nm with respect to a central wavelength of the second wavelength $\lambda_2$. The first wavelength selector 138 may instead be arranged from either a multilayer film filter, formed by layering a plurality of layers that differ in refractive index, or a photonic crystal, having a photonic bandgap.

A fourth optical coupler 140 functions as the second optical input means that overlaps (multiplexes) light of the second wavelength $\lambda_2$, which has been selected by the first wavelength selector 138 from among the light output from the first optical amplifier 136, and the control light $L_C$, which is laser light of a third wavelength $\lambda_3$, and inputs the multiplexed light via a second optical circulator 142 into the second optical amplifier 144, which is arranged in the same manner as the first optical amplifier 136. At the second optical amplifier 144, the second wavelength $\lambda_2$, which has been modulated in the first optical amplifier 136, is subject to further modulation by the control light $L_C$ of the third wavelength $\lambda_3$ that is within the wavelength range of spontaneously emitted light centered about the second wavelength $\lambda_2$, and a mixed light of the light of the wavelength $\lambda_2$ with the modulated light (output light signal) $L_3$, which is made the same in wavelength as the control light $L_C$, is output. The second optical circulator 142 guides this mixed light (light of the wavelength $\lambda_2$ and the modulated light $L_3$), output from the second optical amplifier 144, not to the fourth optical coupler 140, but to an optical distributor 150.

Figure 23:
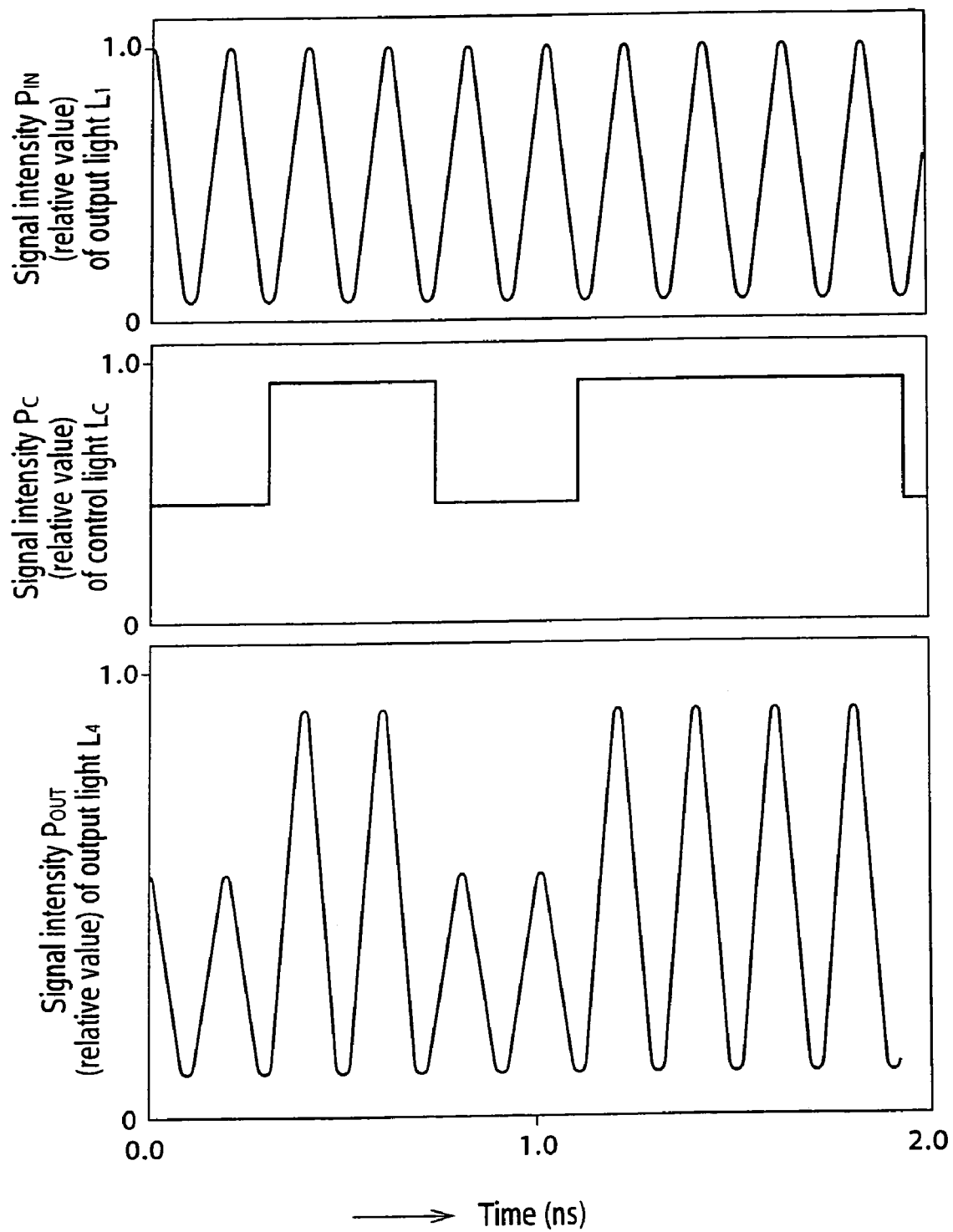
FIG. 23 shows time charts illustrating the actions of the optical signal amplifying triode of FIG. 22 with the waveform of a signal light that is an input light being indicated in the top stage, the waveform of a control light being indicated in the middle stage, and the waveform of an output light being indicated in the bottom stage.

Since the modulated light $L_3$, which is contained in the light output from the second optical amplifier 144, is light of the third wavelength $\lambda_3$, which is the same as the wavelength of the control light $L_C$, when the wavelength of the control light $L_C$ is varied, for example, to $\lambda_{c1}, \lambda_{c2}, \lambda_{c3}, \ldots \lambda_{cN}$, the wavelength of the light $L_3$ from the second optical amplifier 144 is also varied, for example, to $\lambda_{c1}, \lambda_{c2}, \lambda_{c3}, \ldots \lambda_{cN}$. FIG. 23 shows the waveform of the output light $L_4$ of the optical distributor 150 when the optical signal $L_1$ (first input light) is experimentally set to the waveform shown in the top stage of the Figure and the control light $L_C$ is set to the waveform shown in the middle diagram of the Figure. The intensity variation of the control light $L_C$ corresponds to the amplitude modulation of the output light $L_4$ of the optical distributor 150 that is shown in the bottom stage, and the output light $L_4$ of the optical distributor 150 has a gain of approximately 2 times to 30 times with respect to the control light $L_C$. Also, the phase of the output light $L_4$ is the same as and not inverted with respect to that of the optical signal $L_1$ (first input light).

Figure 24:
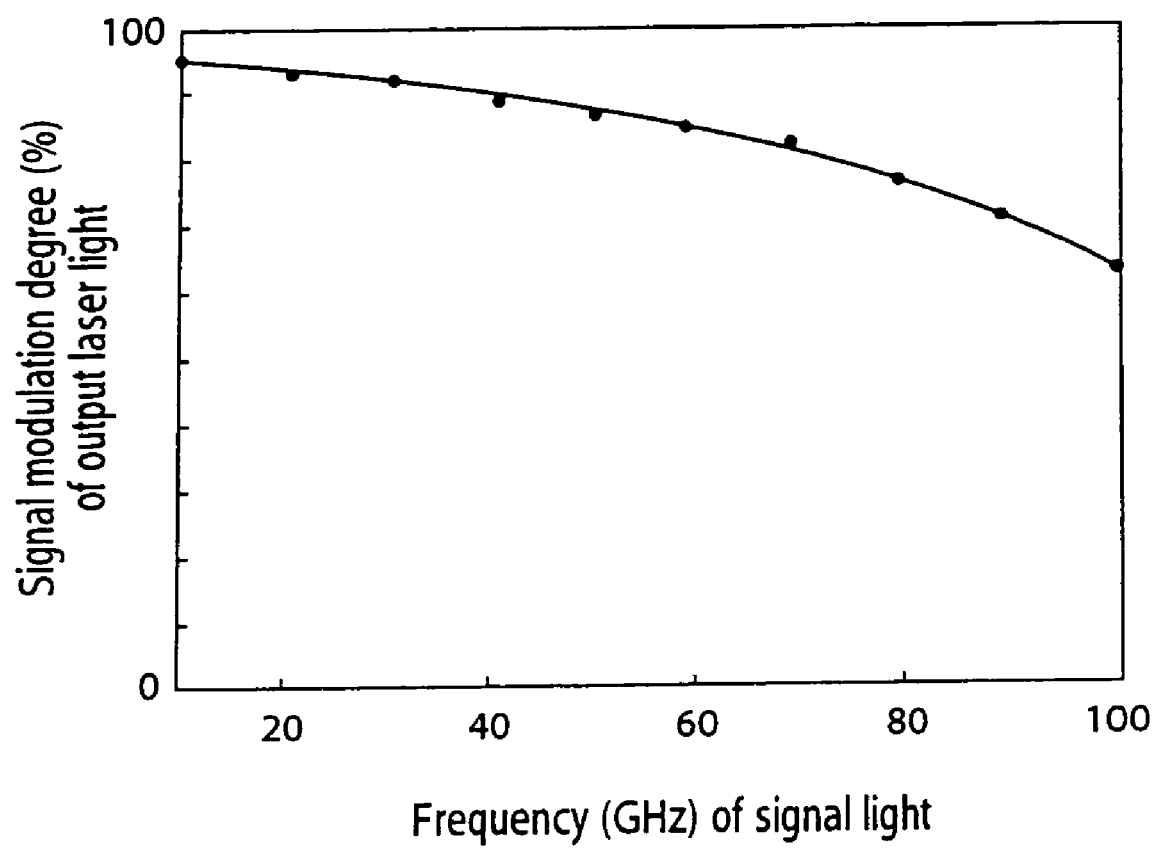
FIG. 24 is a diagram showing the frequency characteristics of the optical signal amplifying triode of FIG. 22.

FIG. 24 shows the characteristics in the case where, in the wavelength converter 118 and the optical distributor 150 that function as the optical signal amplifying triode 128 by being arranged in the above-described manner, the active layer of the first optical amplifier 136 is arranged from quantum dots. In FIG. 24, the frequency characteristics of the output light $L_4$ are shown in a two-dimensional coordinate system with the abscissa indicating the frequency of the signal light $L_{A11}$, which is the first input light, and the ordinate indicating the signal modulation degree H (%) of the output light $L_4$, which is the output light. As shown in FIG. 24, lowering of the signal modulation degree H is not seen up to 100 GHz. This signal modulation degree H is expressed, for example, by the Equation (1) described above.

Returning now to FIG. 18, the modulated light $L_3$, among the light from the above-mentioned wavelength converters 118, are selectively distributed by the optical distributors 150, in accordance with their wavelengths, that is, the wavelengths $\lambda_c (=\lambda_{c1}, \lambda_{c2}, \lambda_{c3}, \ldots \lambda_{cN})$ of the control light $L_C$, among cross-connected fibers $F_{111}$ to $F_{11M}$, $F_{121}$ to $F_{12M}$, $\ldots F_{1N1}$ to $F_{1NM}$, which have been set in advance to correspond to a plurality of waveguides. Of the light from each wavelength converter 118, light of the wavelength $\lambda_2$, which differs from wavelengths $\lambda_c$, is distributed to a branch optical fiber $F_{B0}$. Since the terminal end of this branch optical fiber $F_{B0}$ is not connected to a subsequent stage but is closed, the propagation of light of the wavelength $\lambda_2$ is stopped here. Each optical distributor 150 thus also functions as the second wavelength selector that selects output light of the third wavelength $\lambda_c$ from the light from the second optical amplifier 144.

Figure 25:
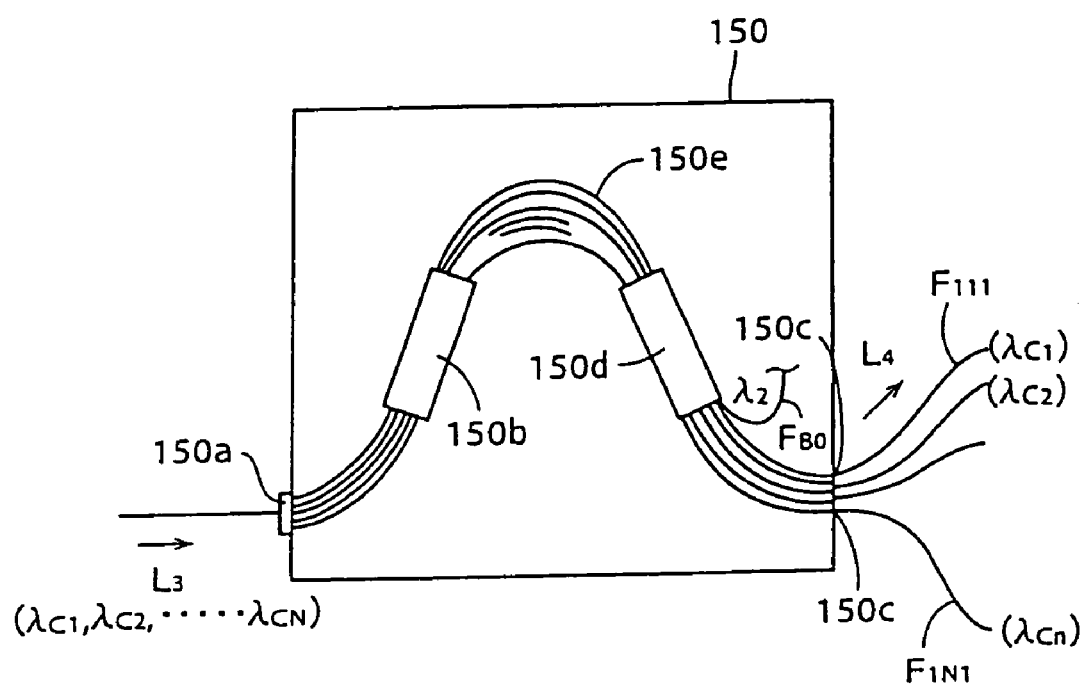
FIG. 25 is a diagram illustrating an arrangement example of an optical distributor of FIG. 22.

With the optical distributors 150, when, for example, the modulated light $L_3$ are each a monochromatic light of one wavelength among wavelengths $\lambda_c$ of the control light $L_C$, these are distributed alternatively to one set among the cross-connected fiber sets $F_{111}$ to $F_{11M}$, $F_{121}$ to $F_{12M}$, $\ldots$ $F_{1N1}$ to $F_{1NM}$, and in the case where the modulated light $L_3$ are each a mixture of two types, it is distributed to two sets among the cross-connected fiber sets $F_{111}$ to $F_{11M}$, $F_{121}$ to $F_{12M}$, $\ldots F_{1N1}$ to $F_{1NM}$. The optical distributors 150 are arranged, for example as shown in FIG. 25, from array waveguide grating type optical splitters that are equipped with first slab waveguides 150b, connected to input ports 150a, second slab waveguides 150d, connected to pluralities of output ports 150c, pluralities of array waveguides 150e of different lengths, disposed between the first slab waveguides 150b and the second slab waveguides 150d, and the cross-connected fibers $F_{111}$ to $F_{11M}$, $F_{121}$ to $F_{12M}$, $\ldots F_{1N1}$ to $F_{1NM}$, respectively connected to the plurality of output ports 150c, and distribute the modulated light $L_3$ (input light) from the wavelength converters 118, which are input from the input ports 150a, to output ports among the pluralities of output ports 150c, that is, fibers among the cross-connected fibers $F_{111}$ to $F_{11M}$, $F_{121}$ to $F_{12M}$, $\ldots F_{1N1}$ to $F_{1NM}$ in accordance with the wavelength of the input light. The optical distributors 150 are equipped as necessary with optical systems, comprising converging lenses for converging branched light to the end faces of cross-connected fibers $F_{111}$ to $F_{11M}$, $F_{121}$ to $F_{12M}$, $\ldots F_{1N1}$ to $F_{1NM}$. With the present embodiment, the above-described control light generator 126, wavelength converter 118, and optical distributor 150 make up the principal portions of the main optical signal relay unit $RB_1$.

Figure 26:
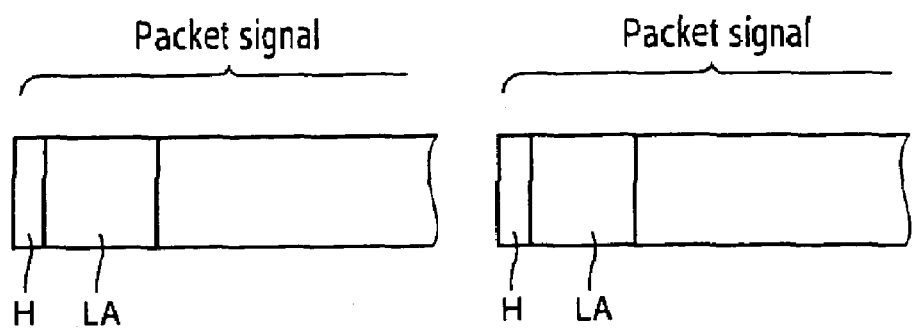
FIG. 26 is a diagram illustrating an arrangement example of an input optical signal train of FIG. 23.
Figure 27:
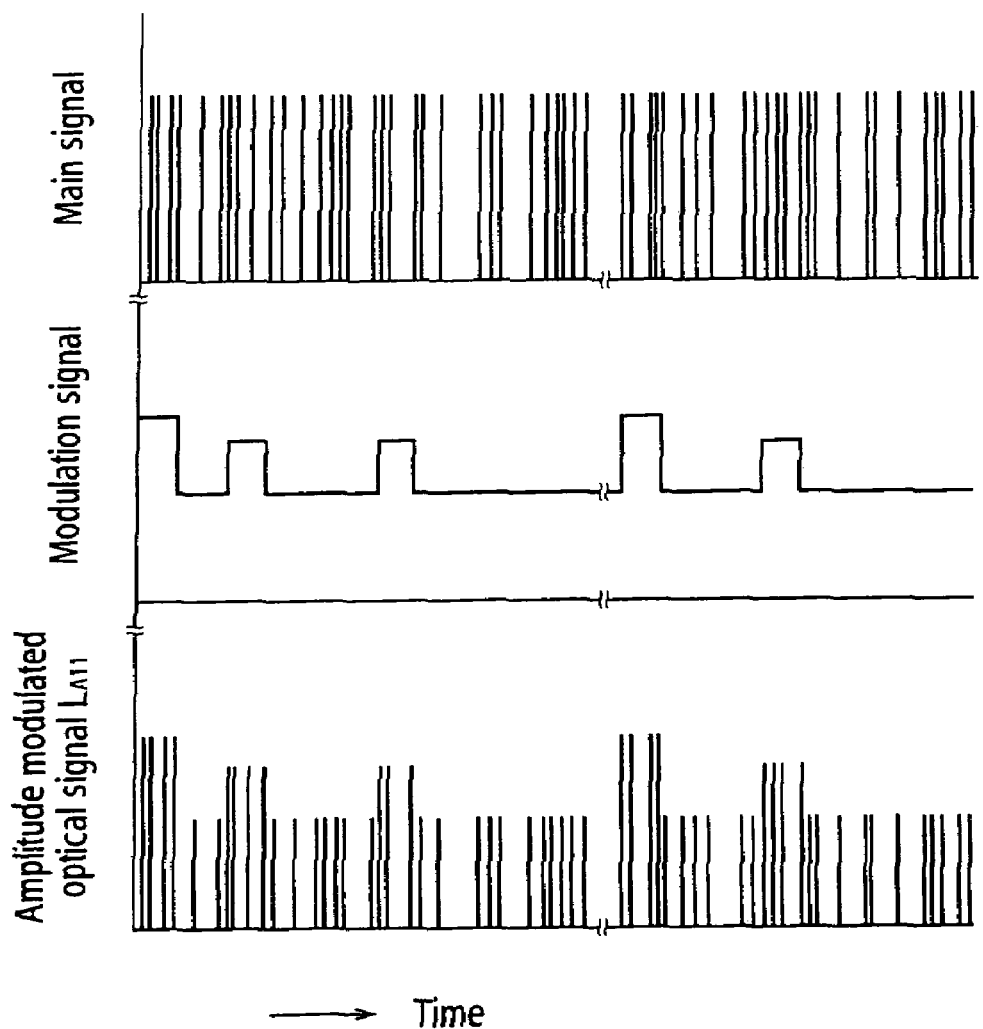
FIG. 27 shows time charts that illustrate the input optical signal train of FIG. 26 using a main signal and an amplitude modulation signal that make up the input optical signal train.

FIG. 26 is a diagram showing the conceptual arrangement of the optical signal $L_{A11}$ of the wavelength $\lambda_1$, which has been transmitted via the input optical fiber $F_{A1}$ and separated by the splitter $S_1$, and FIG. 27 shows diagrams illustrating a waveform to which the amplitude modulation of the signal light $L_{A11}$ has been added and a process of adding the amplitude modulation. In FIG. 26, the optical signal $L_{A11}$ is a signal train that is referred to, for example, as a packet, and at a head portion or front end portion thereof are provided a header portion H, to which is added such header information as the packet title, date, document name, page number, etc., and a label portion (tag portion) LA, to which is added signals indicating such routing information as route information, data link layer connection information, etc. With the optical signal $L_{A11}$, the routing information are added to at least one of either header portion H or label portion LA by the application of amplitude modulation as shown in FIG. 27. This amplitude modulation is carried out, for example, by the overlapping of the modulation signal shown in the second stage of FIG. 27 to the main signal shown in the top stage of FIG. 27 using the wavelength converter 118, shown in FIG. 22, or an amplitude modulator, such as that shown in FIG. 30 and which is to be described later.

Figure 28:
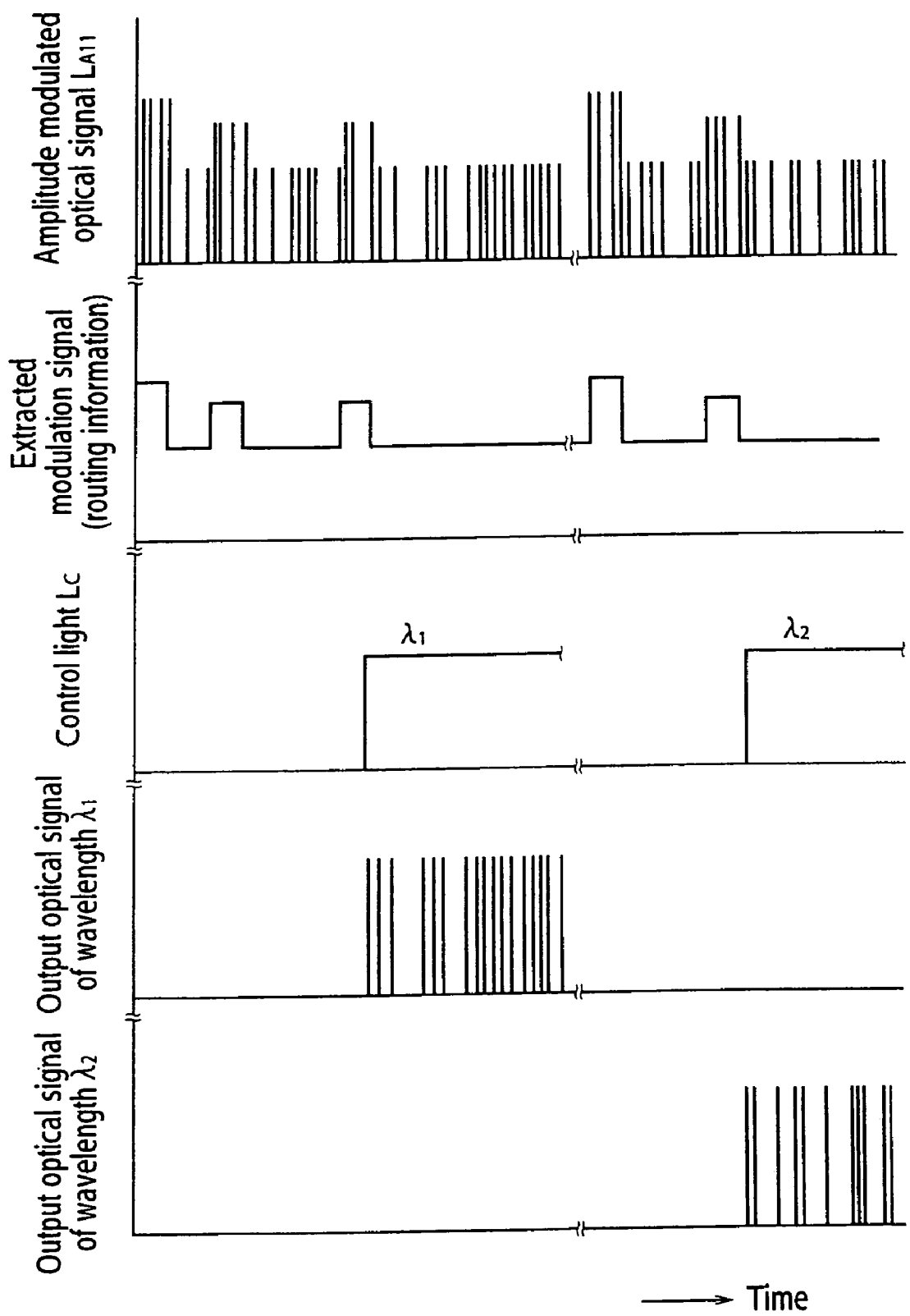
FIG. 28 shows time charts that illustrate the actions of a main relay unit of FIG. 18 in regard to the input optical signal train of FIG. 26 and illustrate the actions in the case where routing information are not attached.

FIG. 28 shows time charts illustrating the actions of the first main relay unit $RB_{11}$, shown in FIG. 18, as a representative example for describing the actions of the present embodiment's optical relay 110 that is arranged as described above. In first main relay unit $RB_{11}$, the optical signal $L_{A11}$, shown at the top stage of FIG. 28, is input via the optical delay element 116 into the wavelength converter 118 (input step). Meanwhile, a portion of the optical signal $L_{A11}$ is supplied by the first optical coupler 114 to the electronic controller 124 upon conversion into an electrical signal by the photoelectrical signal converter 122, the modulation pulse signals (routing information), which are extracted by the electronic controller 124 and are shown in the second stage of FIG. 28, are supplied to the control light generator 126, control light $L_C$ of wavelengths $\lambda_c$, which have been determined in accordance with the routing information indicated by the modulation pulse signals, are generated by the control light generator 126 as shown in the third stage of FIG. 28, and in synchronization to this generation, the optical signal $L_{A11}$ is input into the wavelength converter 118 and is output upon being converted to the wavelengths $\lambda_c$ of the control light $L_C$ at the wavelength converter 118 (wavelength conversion step). This synchronization is carried out by the optical signal $L_{A11}$ being delayed by the optical delay element 116 by just the amount of time corresponding to the operational operation time of the electronic controller 124 after photoelectric conversion by the photoelectrical signal converter 122, etc. For example, when the routing information indicated by an amplitude modulation pulse $P_1$ contained in the optical signal $L_{A11}$ indicates the wavelength bus of the wavelength $\lambda_1$, control light $L_C$ of the wavelength $\lambda_1$ is generated and the optical signal $L_{A11}$ is converted to the wavelength $\lambda_1$ as shown in the second stage from the bottom of FIG. 28 and output from the wavelength converter 118. Also, when the routing information indicated by the amplitude modulation pulse $P_1$ contained in the optical signal $L_{A11}$ indicates the wavelength bus of the wavelength $\lambda_2$, control light $L_C$ of the wavelength $\lambda_2$ is generated and the optical signal $L_{A11}$ is converted to the wavelength $\lambda_2$ as shown in the bottom stage of FIG. 28 and output from the wavelength converter 118 and is then distributed according to the wavelength by the optical distributor 150 (optical distribution step). Here, with the optical signal $L_{A11}$, which is the input light since a gain by which the output of the first optical amplifier 136 will saturate is set, the optical signal, which is output from the first optical amplifier 136 and then input via the first wavelength selector 138 into the second optical amplifier 144, will be of a fixed magnitude, the optical signal after wavelength conversion that is output from the second optical amplifier 144 and then input into the optical distributor 150 will be of fixed amplitude, and amplitude modulation will thus be facilitated. With the wavelength converter 118 of the optical relay 110 of the present embodiment, there is no phase inversion between the signal of the optical signal $L_{A11}$, which is the input light, and the signal of the output light $L_3$ or $L_4$, thus providing the merit of there being a high degree of freedom in that any wavelength within the gain range of the first optical amplifier 136 may be selected as the wavelength of the optical signal $L_{A11}$.

Figure 29:
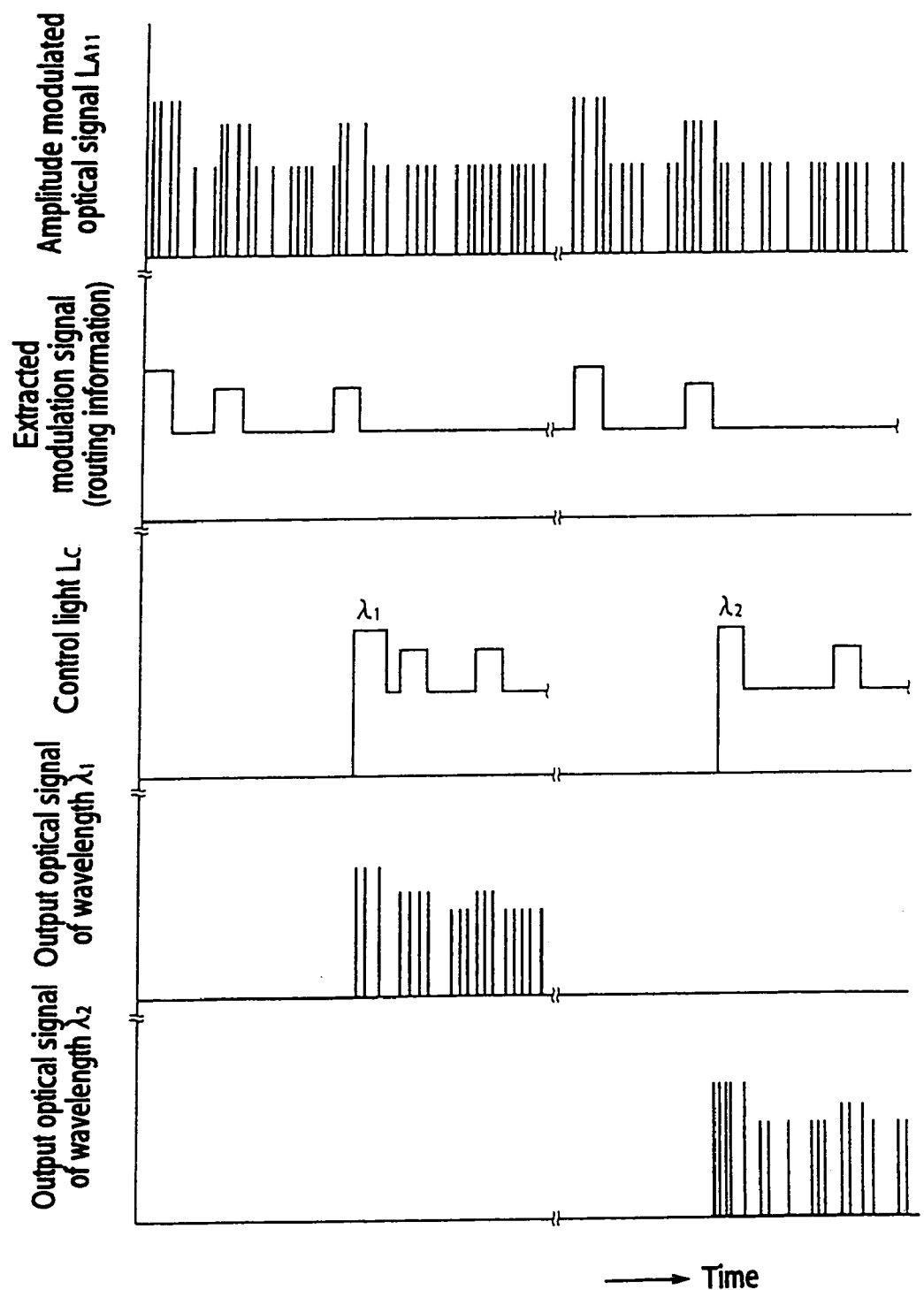
FIG. 29 shows time charts that illustrate the actions of a main relay unit of FIG. 18 in regard to the input optical signal train of FIG. 26 and illustrate the actions in the case where routing information, which differ from the input optical signals, are attached.

FIG. 29 shows time charts illustrating another action of the first main relay unit $RB_{11}$, shown in FIG. 18, as a representative example to describe another action of the optical relay 110, that is, the action of performing wavelength conversion at the same time as labeling and then outputting the resulting signal. In first main relay unit $RB_{11}$, the optical signal $L_{A11}$, shown at the top stage of FIG. 29, is input via the optical delay element 116 into the wavelength converter 118. Meanwhile, a portion of the optical signal $L_{A11}$ is supplied by the first optical coupler 114 to the electronic controller 124 upon conversion into an electrical signal by the photoelectrical signal converter 122, the modulation pulse signals (routing information), which are extracted by the electronic controller 124 and are shown in the second stage of FIG. 29, are supplied to the control light generator 126. At the control light generator 126, control light $L_C$ of wavelengths $\lambda_c$, which have been determined in accordance with the routing information indicated by the modulation pulse signals, are generated, and in synchronization to this generation, the optical signal $L_{A11}$ is input into the wavelength converter 118 and output from the wavelength converter 118 upon conversion to the wavelengths $\lambda_c$ of the control light $L_C$. Since the modulation pulse signals here contain routing information to be re-attached, the electronic controller 124 makes the control light $L_C$ be amplitude modulated and generated so as to contain the pulse signals indicating the routing information as shown in the third stage of FIG. 29. For example, when the routing information indicated by an amplitude modulation pulse $P_1$ contained in the optical signal $L_{A11}$ indicates the wavelength bus of the wavelength $\lambda_1$, control light $L_C$ of the wavelength $\lambda_1$ is generated and the optical signal $L_{A11}$ is converted to the wavelength $\lambda_1$ as shown in the second stage from the bottom of FIG. 29 and output from wavelength converter 118. Also, when the routing information indicated by the amplitude modulation pulse $P_1$ contained in the optical signal $L_{A11}$ indicates the wavelength bus of the wavelength $\lambda_2$, control light $L_C$ of the wavelength $\lambda_2$ is generated and the optical signal $L_{A11}$ is converted to the wavelength $\lambda_2$ as shown in the bottom stage of FIG. 29 and output from the wavelength converter 118.

As described above, with the present embodiment, amplitude modulation signals are added as routing information to the optical signal train $L_{A11}$ and the optical signal $L_{A11}$ is transferred to the destinations indicated by the amplitude modulation signals. Thus in the case where an amplitude modulated optical signal train is input into the cross gain modulation type wavelength converter 118, when the control light $L_C$ of the wavelength corresponding to the routing information indicated by the amplitude modulation of the optical signal $L_{A11}$ is supplied to the cross gain modulation type wavelength converter 118, output light of the same wavelengths as the control light $L_C$ are output and routing is carried out, for example, by the output light being distributed among the transmission paths corresponding to the wavelengths by means of optical distributor 150. A routing device, that is, the optical signal transfer device or optical signal relay device 110 of high speed and compact size can thus be arranged.

Also with the present embodiment, since the amplitude modulation added to the optical signal train $L_{A11}$ is added at a modulation degree of no more than 90%, the optical signal $L_{A11}$ is not degraded and yet the routing information is added to the optical signal without fail. Also, since the optical signal train $L_{A11}$ is a packet signal and the routing information are label information or tag information provided at a head portion of the packet signal, the label information or tag information are added by amplitude modulation to the label portion LA or the tag portion.

Also since the present embodiment includes (a) the input step of inputting the optical signal train $L_{A11}$, to which amplitude modulation has been applied as routing information, into the cross gain modulation type wavelength converter 118, (b) the wavelength conversion step of supplying the control light $L_C$, of wavelengths that differ from that of the optical signal $L_{A11}$ and correspond to the amplitude modulation signals, to the above-mentioned cross gain modulation type wavelength converter 118 and making optical signals of the wavelengths of the control light $L_C$ be output from the cross gain modulation type wavelength converter 118, and (c) the optical distribution step of inputting the optical signals, output from the cross gain modulation type wavelength converter 118, into the optical distributor 150 and distributing the optical signals according to their wavelengths among the plurality of optical transmission paths connected to the optical distributor 150, the optical signal $L_{A11}$ is distributed among the plurality of optical transmission paths connected to the optical distributor 150 at the wavelengths that are in accordance with the routing information indicated by the amplitude modulation signals.

Also with the present embodiment, since in the above-mentioned wavelength conversion step, new routing information are re-added to the optical signal $L_{A11}$, output from the cross gain modulation type wavelength converter 118, by applying amplitude modulation using the control light $L_C$ to the optical signal $L_{A11}$ and transfer destinations can thus be re-added as suited inside the optical signal relay (transfer) device 110, dynamic routing, by which the transfer route is determined, for example, according to the link state, node state, and traffic state, is enabled.

Also with the optical signal relay device 110 of the present embodiment, when the optical signal train $L_{A11}$, having amplitude modulation signals added as routing information, is transmitted, the control light $L_C$ of wavelengths, corresponding to the destinations indicated by the amplitude modulation signals of the optical signal train $L_{A11}$ and differing in wavelength from the optical signal $L_{A11}$, are generated from the amplitude modulation signals of the optical signal train $L_{A11}$ by the control light generator 126, the optical signal train $L_{A11}$ is converted into optical signals of the wavelengths of the control light $L_C$ by the cross gain modulation type wavelength converter 118, and the optical signals output from the cross gain modulation type wavelength converter 118 are distributed among the plurality of optical transmission paths in accordance with their wavelengths by the optical distributor 150. A routing device, that is, the optical signal transfer device or optical signal relay device 110 of high speed and compact size can thus be realized.

Also since the present embodiment is equipped with the electronic controller 124 that makes the control light $L_C$ of wavelengths, which are in accordance with the routing information indicated by the amplitude modulation signals contained in the optical signal $L_{A11}$, be generated from the control light generator 126 in accordance with the amplitude modulation signals, and the cross gain modulation type wavelength converter 118, having a wavelength conversion function and a switching function, can thus output optical signals of wavelengths corresponding to the routing information and these signals can then be distributed by the optical distributor 150, a routing device, that is, the optical signal transfer device or optical signal relay device 110 of high speed and compact size can be realized.

Also, with this embodiment, since (a) the first optical coupler (optical splitter) 114, which branches and thereby supplies optical signal $L_{A11}$, propagating inside the optical fiber 112, to the electronic controller 124, (b) the photoelectric converter 122, which converts the optical signal branched by the first optical coupler 114 into an electrical signal and supplies the electrical signal to the electronic controller 124, and (c) the optical delay element 116, which is disposed at the downstream side of the first optical coupler 114 along the optical fiber 112 and delays the optical signal $L_1$ to be input from the first optical fiber 112 into the wavelength converter 118, are provided and the electronic controller 124 extracts the amplitude modulation signals contained in the optical signal $L_{A11}$ and makes the control light $L_C$ of wavelengths corresponding to the routing information indicated by the amplitude modulation signals be generated from the control light generator 126, the cross gain modulation type wavelength converter 118, having a wavelength conversion function and a switching function, can output optical signals of wavelengths corresponding to the routing information and these signals can then be distributed by the optical distributor 150. A routing device, that is, an optical signal transfer device or optical signal relay device of high speed and compact size can thus be realized. Also, since while a portion of the optical signal $L_{A11}$ is branched from the first optical coupler 114 and supplied to the electronic controller 124, the other portion of the optical signal $L_{A11}$ is delayed by the optical delay element 116 and then supplied to the wavelength converter 118, despite the delay time used in the electronic signal processing by the electronic controller 124, the control light $L_C$, supplied from the control light generator 126 to the wavelength converter 118 are favorably synchronized with the optical signal $L_1$ at the wavelength converter 118.

Also with the present embodiment, since the cross gain modulation type wavelength converter 118 comprises (a) the first optical amplifier 136 and the second optical amplifier 144, each using cross gain modulation characteristics to amplify and perform wavelength conversion on input light and then outputting the resulting light, (b) the third coupler (first optical multiplexer) 132 that multiplexes the signal light $L_{A11}$ of the first wavelength $\lambda_1$, which is input from the optical fiber 112, with the laser light (second input light) $L_2$, which is continuous light of the wavelength $\lambda_2$ that differs from that of the signal light $L_{A11}$, and inputs the multiplexed light into the first optical amplifier 126, (c) the first wavelength selector 138 that selects light of the second wavelength $\lambda_2$ from among the light from the first optical amplifier 136, and (d) the fourth optical coupler (second multiplexer) 140 that multiplexes the light of second wavelength $\lambda_2$, which has been selected by the first wavelength selector 138, with the control light $L_C$ of third wavelength $\lambda_3$ and inputs the multiplexed light into the second optical amplifier 144, and the output light $L_3$ of third wavelength $\lambda_3$ is light of the same wavelength as the control light $L_C$ and is modulated in response to the intensity variation of either or both of the signal light $L_1$ of the first wavelength $\lambda_1$ and the control light $L_C$ of the third wavelength $\lambda_3$, and since when light of second wavelength $\lambda_2$ that has been selected from the light from the first optical amplifier 126, into which the signal light $L_1$ and the laser light (second input light) $L_2$ have been input, and the control light $L_C$ are input into the second optical amplifier 144, the modulated light $L_3$ or the output light $L_4$ of the third wavelength $\lambda_3$ that is selected from the light output from the second optical amplifier 144 will thus be light that is modulated in response to the intensity variation of either or both of the signal light $L_1$ and the control light $L_C$ and will be an amplified signal with a signal gain of 2 or more with respect to the control light $L_C$, the amplification process of the optical signal $L_1$ can be performed directly using the control light $L_C$.

Also with this embodiment, the optical distributor 150 is equipped with the first slab waveguide 150b, connected to the input port 150a, the second slab waveguide 150d, connected to the plurality of output ports 150c, the plurality of array waveguides 150e of different lengths, disposed between the first slab waveguide 150b and the second slab waveguide 150d, and the branch optical fibers $F_{B1}$, $F_{B2}$, $F_{B3}$, ... $F_{Bn}$, respectively connected to the plurality of output ports 150c, and is arranged to distribute the output light $L_3$ (input light), which are input into the input port 150a from the wavelength converter 118, to output ports among the plurality of output ports 150c, that is, fibers among the branch optical fibers $F_{B1}$, $F_{B2}$, $F_{B3}$, ... $F_{Bn}$ in accordance with the wavelengths of the input light. The modulated light $L_3$ of the same wavelengths as the control light $L_C$, which are output from the wavelength converter 18, are thus favorably distributed selectively to fibers among optical fibers $F_{B1}$, $F_{B2}$, $F_{B3}$, ... $F_{Bn}$ in accordance with the wavelengths.

Also, since the present embodiment's optical signal relay device 110 has a plurality of single-wavelength laser light sources (control light sources) or a wavelength variable laser light source, outputting control light of a plurality of priorly set types of wavelengths, and is equipped with the control light generator 126, which supplies the control light $L_C$ of the wavelengths selected in accordance with the branching information contained in the optical signal $L_1$ to the wavelength converter 118, the optical signal $L_1$ is selectively distributed in accordance with the wavelengths of the control light $L_C$ to certain priorly set optical fibers among the optical fibers $F_{B1}$, $F_{B2}$, $F_{B3}$, ... $F_{Bn}$ that correspond to the plurality of branch optical waveguides.

Also since the present embodiment's control light generating device 126 is equipped with the optical modulator 126$_M$ for switching the control light output from the plurality of types of laser light sources 126$_{L1}$ to 126$_{Ln}$ or wavelength variable laser light source 126$_{LV}$, the control light $L_C$ of mutually different wavelengths that are output from the control light generator 126 are made sharp in their leading edges and trailing edges and the response characteristics are thus improved.

Also since the present embodiment is equipped with the electronic controller 124, which makes the control light generator 126 generate the control light $L_C$, having wavelengths that are in accordance with the branching information contained in the optical signal $L_1$ input from the first optical fiber 112, in accordance with the branching information, the modulated light $L_3$, output from the wavelength converter 118, is switched in wavelength in accordance with the routing (branching) information contained in the optical signal $L_{A11}$ and are selectively distributed according to the wavelengths to fibers among the plurality of optical fibers $F_{B1}$, $F_{B2}$, $F_{B3}$, ... $F_{Bn}$.

Also with the present embodiment, since the electronic controller 124 extracts just the routing information (address signals) contained in the optical signal $L_{A11}$, input from optical fiber 112 and makes the control light $L_C$ of wavelengths corresponding to the address signals be generated from the control light generator 126 and electromagnetic waves corresponding to signals besides the address signals will thus not be generated by the signal processing, the merit that the confidentiality of the optical signals can be secured is provided.

Another embodiment shall now be described. In the following description, portions in common to the above-described embodiment shall be provided with the same symbols and description thereof shall be omitted.

Figure 30:
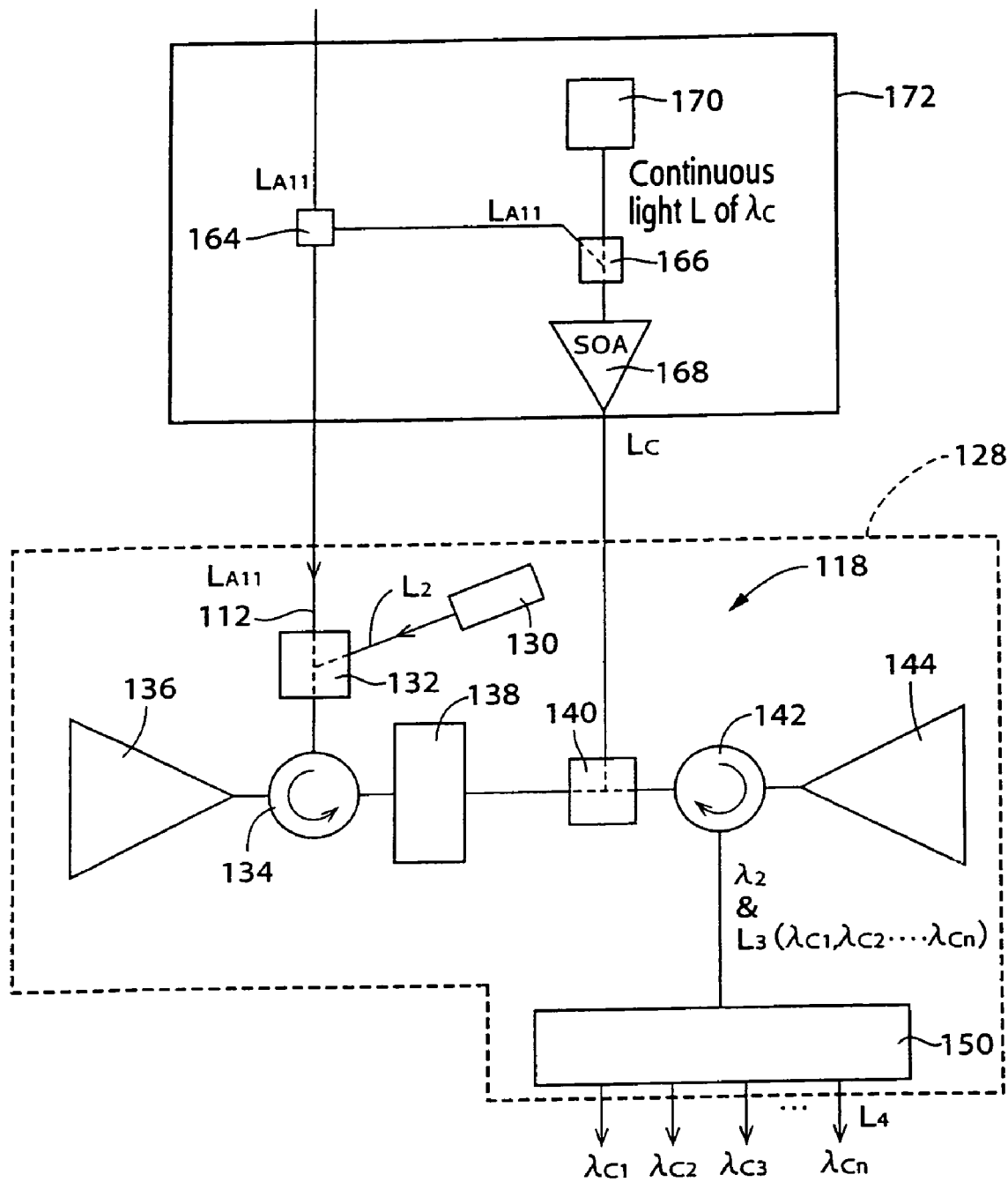
FIG. 30 is a diagram corresponding to FIG. 22 illustrating the arrangement of another embodiment of an optical signal amplifying triode, wherein control light is generated in an all-optical manner.
Figure 31:
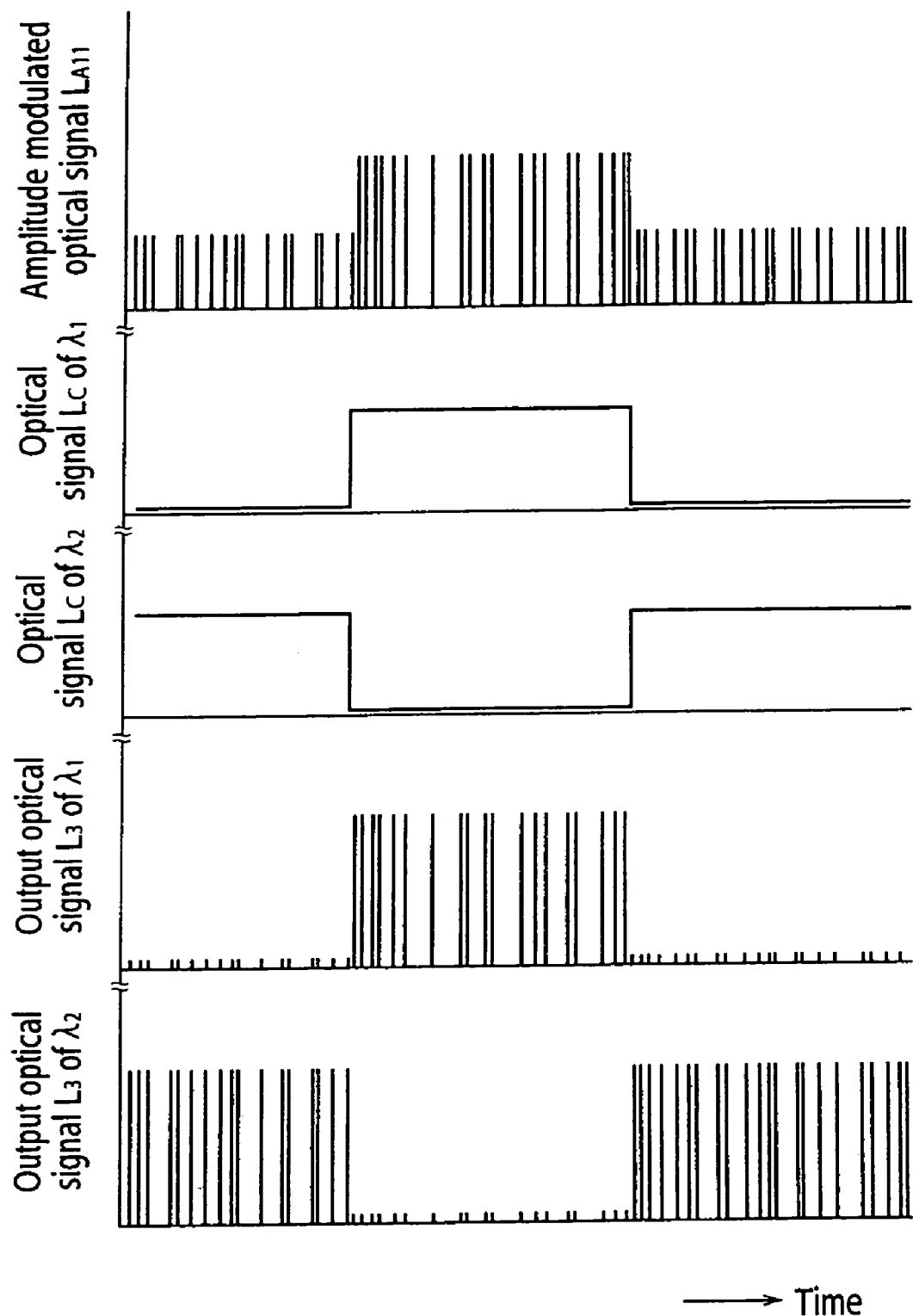
FIG. 31 shows time charts illustrating the actions of the optical signal amplifying triode of FIG. 30.

FIG. 30 shows an embodiment, with which the first main relay unit $RB_{11}$, shown in FIG. 18 and FIG. 22 described above, is arranged in an all-optical manner. In FIG. 30, a portion of the input optical signal $L_{A11}$, input into the third optical coupler 132 of the wavelength converter 118, is branched by an optical coupler (optical splitting/multiplexing element or optical multiplexer/optical multiplexer) 164, then multiplexed with laser light L, which are continuous light of predetermined wavelengths, that is for example, wavelengths among wavelengths $\lambda_1$ to $\lambda_N$, by an optical coupler 166, and input into a semiconductor optical amplifier (SOA) 168, equipped with cross gain modulation characteristics, in other words, mutual gain modulation characteristics by being arranged in the same manner as the first optical amplifier 136 shown in FIG. 22. For the laser light L, which are continuous light, a laser light source 170, which, for example, is arranged in the same manner as the laser light sources 126$_{L1}$ to 126$_{LN}$ and the optical multiplexer 126$_S$, shown in FIG. 19 and FIG. 20, or the variable laser light source 126$_{LV}$, shown in FIG. 21, is used. This semiconductor optical amplifier 168 is arranged to have characteristics such that the response speed is slow relative to the first semiconductor optical amplifier 136 and the second semiconductor optical amplifier 144. For example, in the case where each of the first semiconductor optical amplifier 136 and the second semiconductor optical amplifier 144 is equipped with an active layer arranged from quantum wells or quantum dots as described above, the semiconductor optical amplifier 168 is arranged with an active layer arranged from bulk. By adjustment and setting of either or both the gain and polarization states, the semiconductor optical amplifier 168 is arranged so as not to respond to high-speed switching. Thus when the input optical signal $L_{A11}$, shown in the top stage of FIG. 31, is input, since the control optical signal $L_C$ (second stage or third stage of FIG. 31) of waveforms corresponding to the amplitude modulation signals of the input optical signal $L_{A11}$ are input from the semiconductor optical amplifier 168 into the fourth optical coupler (second optical multiplexer) 140, the output optical signals $L_3$ of the wavelengths $\lambda_1$ or $\lambda_N$, which have been amplitude modulated as shown in the second stage from the bottom or the bottom stage of FIG. 31, are output to the optical distributor 150. The amplitude modulation signals of the output optical signals $L_3$ indicate, for example, branching information. In the present embodiment, the optical coupler 164, the optical coupler 166, the semiconductor optical amplifier (SOA) 168, and the laser light source 170 make up an all-optical controller 172, which outputs the control light $L_C$ for providing the wavelengths of wavelength conversion and adding the routing (branching) information.

With the present embodiment, since the optical signals $L_C$, generated by the optical coupler 164, the optical coupler 166, and the semiconductor optical amplifier 168, adds, in real time, the same routing information as those contained in the input optical signal $L_{A11}$ to the head portions of the output light train by amplitude modulation in the same manner as the control light $L_C$ of FIG. 18, the merit that the electronic controller 124 of the above-described embodiment is made unnecessary and an all-optical arrangement is enabled in regard to such switching operation is provided.

Also with the present embodiment, since the all-optical controller, which makes control light $L_C$ of wavelengths that are in accordance with the routing information indicated by the amplitude modulation signals contained in the optical signal $L_{A11}$ be generated from the control light generator 126 in accordance with the amplitude modulation signals, is equipped and control is performed so as to generate control light of signals that are in accordance with the routing information indicated by the amplitude modulation signals contained in input optical signal $L_{A11}$, and the cross gain modulation type wavelength converter 118, having a wavelength conversion function and a switching function, can thus output optical signals of wavelengths corresponding to the routing information and these signals can then be distributed by the optical distributor, a routing device, that is, an optical signal transfer device or optical signal relay device of high speed and compact size can be realized. Since electromagnetic waves are not generated by the optical signal processing, the merit that the confidentiality of the optical signals is secured is provided.

Figure 32:
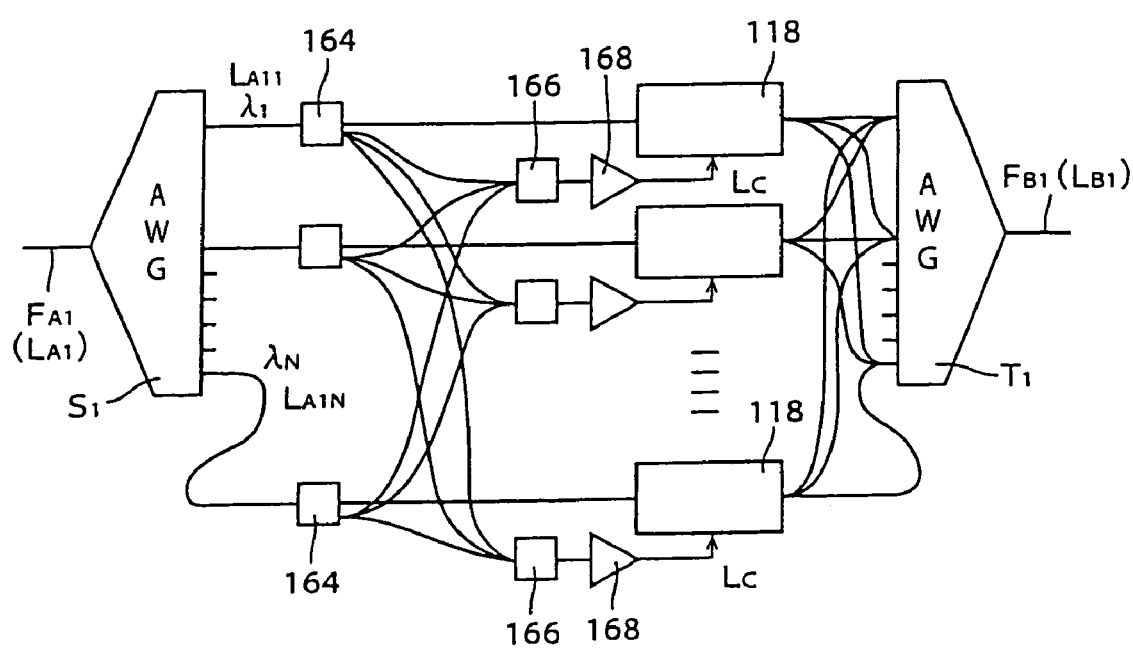
FIG. 32 is a diagram corresponding to FIG. 17 illustrating the arrangement of an optical signal relay, which includes a wavelength converter of the embodiment of FIG. 30.

FIG. 32 is a diagram, corresponding to FIG. 17, illustrating an all-optical type optical signal relay device 180 that is arranged using the art of the above-described wavelength converter 118 of FIG. 30. This arrangement shall now be described using the input optical signal $L_{A11}$ of wavelength $\lambda_1$, among the plurality of light split by the optical splitter $S_1$, as a representative example. As with the arrangement of FIG. 30, a portion of the input optical signal $L_{A11}$, input into the third optical coupler (first optical multiplexer) 132 of the wavelength converter 118, is branched by the optical coupler 164, then multiplexed with the laser light L, which are continuous light of predetermined wavelengths, that is for example, wavelengths among wavelengths $\lambda_2$ to $\lambda_N$, by the optical coupler 166, and input into the semiconductor optical amplifier (SOA) 168, equipped with cross gain modulation characteristics, in other words, mutual gain modulation characteristics by being arranged in the same manner as the first optical amplifier 136. The present embodiment differs from the embodiment of FIG. 30 in that wavelengths, among the other wavelengths $\lambda_2$ to $\lambda_N$ resulting from the splitting of the laser light L, which are continuous light, by the optical splitter $S_1$, are used. Thus when as shown in FIG. 31, the input optical signal $L_{A11}$, shown in the top stage, is input, since the optical signal $L_C$ (second stage or third stage of FIG. 31) of waveforms corresponding to the amplitude modulation signals of the input optical signal $L_{A11}$ are input from the semiconductor optical amplifier 168 into the fourth optical coupler (second optical multiplexer) 140, the output optical signals $L_3$ of wavelengths $\lambda_1$ or $\lambda_N$, shown in the second stage from the bottom or the bottom stage of FIG. 31, are output to the optical distributor 150. This embodiment provides the merit of enabling arrangement in a more fully optical manner.

Yet another embodiment shall now be described.

With the above-described embodiments, there is the possibility that in the relay process of converting an optical packet signal, which is, an input optical signal $L_{ANM}$, in another main relay unit $RB_{MN}$, to a predetermined wavelength and outputting the result to a predetermined fiber $F_{BNM}$, an optical signal of the same wavelength may be output redundantly from the main relay unit $RB_{11}$, which performs the relay process on an optical signal, which is, the input optical signal $L_{A11}$, thereby causing overlapping of optical signals. In such a case, for example the embodiment of FIG. 18 is arranged so that when the electronic controller 124 detects header information, added by the amplitude modulation signals to the header portion H at the head of the optical packet signal that is the input optical signal $L_{A11}$, before the main relay unit $RB_{MN}$, which is performing a relay process priorly, confirms the end terminal of the corresponding optical packet signal, information that instructs diversion is added to the optical packet signal by amplitude modulation. For example, though the final destination information is not changed, an intermediate address is changed by amplitude modulation. With this embodiment, when a plurality of optical packet signals are about to be sent substantially simultaneously to a certain fiber $F_{BNM}$ of the same transmission path, mutual collision of the packet signals can be avoided.

Figure 33:
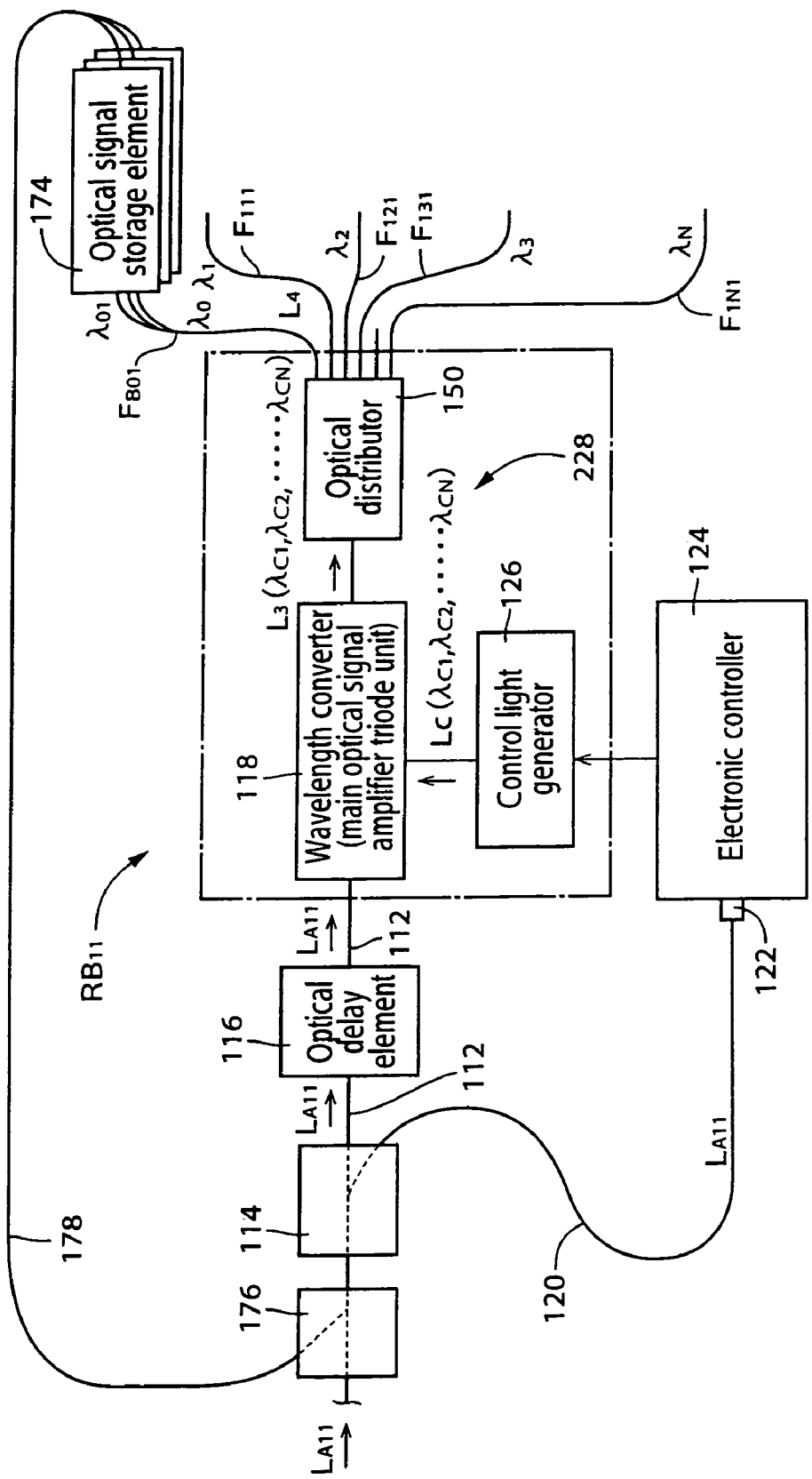
FIG. 33 is a diagram corresponding to FIG. 18 illustrating the principal portion, that is, a relay of another embodiment of an optical signal relay.

FIG. 33 is a diagram showing the principal parts of a relay device 110, which is arranged so that during the relay process in the other main relay unit $RB_{MN}$, wherein an optical packet signal, that is, an input optical signal $L_{ANM}$ is converted to a predetermined wavelength and output to a predetermined fiber $F_{BNM}$, an optical packet signal, that is, an input optical signal $L_{A11}$, which has arrived overlappingly in timing, is stored temporarily and the relay process thereof is enabled after completion of the relay process of the optical packet signal that is being converted to the above-mentioned predetermined wavelength. In FIG. 33, a plurality of optical signal storage elements 174, formed by connecting in parallel a plurality of optical fibers that differ in length in order to temporarily store optical packet signals distributed by the optical distributor 150, an optical feedback transmission path, that is, a feedback optical fiber 178, feeding back optical signal output from the optical signal storage elements 174 to the input side, and an optical coupler 176, re-inputting an optical packet signal of any of standby wavelengths $\lambda_{01}$ to $\lambda_{03}$, which has been transmitted to the input side via the feedback optical fiber 178, as the input optical signal $L_{A11}$ into the first coupler 114, are equipped. When during a relay process in the other main relay unit $RB_{MN}$, wherein an optical packet signal, that is, the input optical signal $L_{ANM}$ is converted to a predetermined wavelength and output to a predetermined fiber $F_{BNM}$, it is judged that an optical packet signal $L_{A11}$, which has routing information and which the main relay unit $RB_{11}$ is to output to the predetermined fiber $F_{BNM}$ in accordance with the header information attached by amplitude modulation signals to the header portion H at the head of the optical packet signal, is received, the electronic controller 124 judges that this optical packet signal $L_{A11}$ is to be stored temporarily. In response to a signal from the electronic controller of the other main relay unit $RB_{MN}$, the electronic controller 124 makes the control light generator 126 output a control signal among control signals $L_{C01}$ to $L_{C03}$ for conversion of the optical pack signal $L_{A11}$ to a wavelength among the priorly set standby wavelengths $\lambda_{01}$ to $\lambda_{03}$. The optical signal of a wavelength among the standby (temporary storage) wavelengths $\lambda_{01}$ to $\lambda_{03}$ that is output from the optical distributor 150 is sent to one of the optical signal storage elements 174 connected to the optical distributor 150 and, after being stored there for a predetermined amount of time, is transmitted via the feedback optical fiber 178 to the optical coupler 176 and then re-input as the input optical signal $L_{A11}$ into the first coupler 114 and subject again to the above-described relay process. The plurality of optical signal storage elements 174 are respectively arranged, for example, like the above-described optical delay element 116 and, in order to be equipped with lengths corresponding to storage time required by the optical packet signals to be stored therein, are respectively arranged by winding a plurality of optical fibers of mutually different optical lengths that are required for propagation for just the corresponding storage time. With the present embodiment, mutual collision of a plurality of optical packet signals that are about to be sent substantially simultaneously to the same transmission path, that is, a predetermined fiber $F_{BNM}$ can be prevented.

Also with the above-described embodiment of FIG. 18, the electronic controller 124 may be arranged to generate the control light $L_C$ that make wavelength converter 118 execute wavelength conversion processes selectively so that, for example, for input optical signals $L_{A11}$ to $L_{A1N}$, $L_{A21}$ to $L_{A2N}$, . . . $L_{AM1}$ to $L_{AMN}$, the processing time zones are mutually differed according to the wavelength set or transmission path set in order to transfer the desired wavelengths to the desired transmission paths.

Also with the wavelength converter 118, though the third optical coupler 132, the fourth optical coupler 140, the first optical amplifier 136, the second optical amplifier 144, the first wavelength selector 138 and other component parts may be connected by optical fibers these may instead be coupled by means of optical waveguides, etc., formed on a semiconductor substrate or a substrate formed of a light transmitting substance, such as a glass substrate.

Though the optical distributor 150 is equipped with the first slab waveguide 150b, connected to the input port 150a, the second slab waveguide 150d, connected to the plurality of output ports 150c, the plurality of array waveguides 150e of different lengths, disposed between the first slab waveguide 150b and the second slab waveguide 150d, and the branch optical fibers $F_{B1}$, $F_{B2}$, $F_{B3}$, . . . $F_{Bn}$, respectively connected to the plurality of output ports 150c, and is arranged to distribute the output light $L_3$ (input light), input into the input port 150a from the wavelength converter 118, to output ports among the plurality of output ports 150c, that is, fibers among the branch optical fibers $F_{B1}$, $F_{B2}$, $F_{B3}$, ... $F_{Bn}$ in accordance with the wavelength of the input light, the optical distributor 150 may instead be arranged from a diffraction grating type optical multiplexer/splitter that makes use of the diffraction angles of a diffraction grating that differ according to wavelength to selectively distribute the output light $L_3$, which is the light that is input thereinto, among the plurality of branch optical fibers $F_{B1}$, $F_{B2}$, $F_{B3}$, ... $F_{Bn}$ that are aligned in array form, or be arranged from a prism optical multiplexer/splitter that uses a prism in place of the diffraction grating. In this case, the optical distributor 150 is arranged from a prism type optical distributor that makes use of the refraction angles of a prism that differ according to wavelength to selectively distribute the input light among the plurality of array waveguides aligned in array form. The same applies to the optical splitters $S_1$ to $S_M$ and the multiplexers $T_1$ to $T_M$.

Also in place of the electronic controller 124 of the above-described embodiments, an optical operational controller, arranged from an operational device, comprising a plurality of optical triodes, a laser light source, etc., may be used. By the use of an all-optical device in place of the electronic controller 124, the entirety of the optical signal relay device 110 becomes arranged from optical elements.

Also, in place of the first optical fiber 112, the second optical fiber 120, etc., which are used as the optical waveguides in the above-described embodiments, two-dimensional optical waveguides, which guide light in two-dimensional directions, and three-dimensional optical waveguides, which guide light in three-dimensional directions, may be disposed and used at portions of optical circuits.

Also with the above-described embodiments, the optical modulators $126_{M1}$ to $126_{Mn}$ and $126_M$ may be eliminated from the control light generator 126 shown in FIG. 19, FIG. 20, and FIG. 21. In this case, for example, with the optical modulator 126 of FIG. 19 and FIG. 20, the control light $L_C$ of different wavelengths are output selectively by selective on/off drive of the laser light sources $126_{L1}$ to $126_{Ln}$. Also with the optical modulator 126 of FIG. 21, the control light $L_C$ of different wavelengths are output selectively by step-wise variation of the injection current into the DBR layer of the wavelength variable laser light source $126_{LV}$.

FIG. 34 to FIG. 38 illustrate examples where an optical signal storage device, enabling the taking out of optical signals at desired timings, is applied to an optical multiplexer/splitter for optical communication for advanced information processing.

Figure 34:
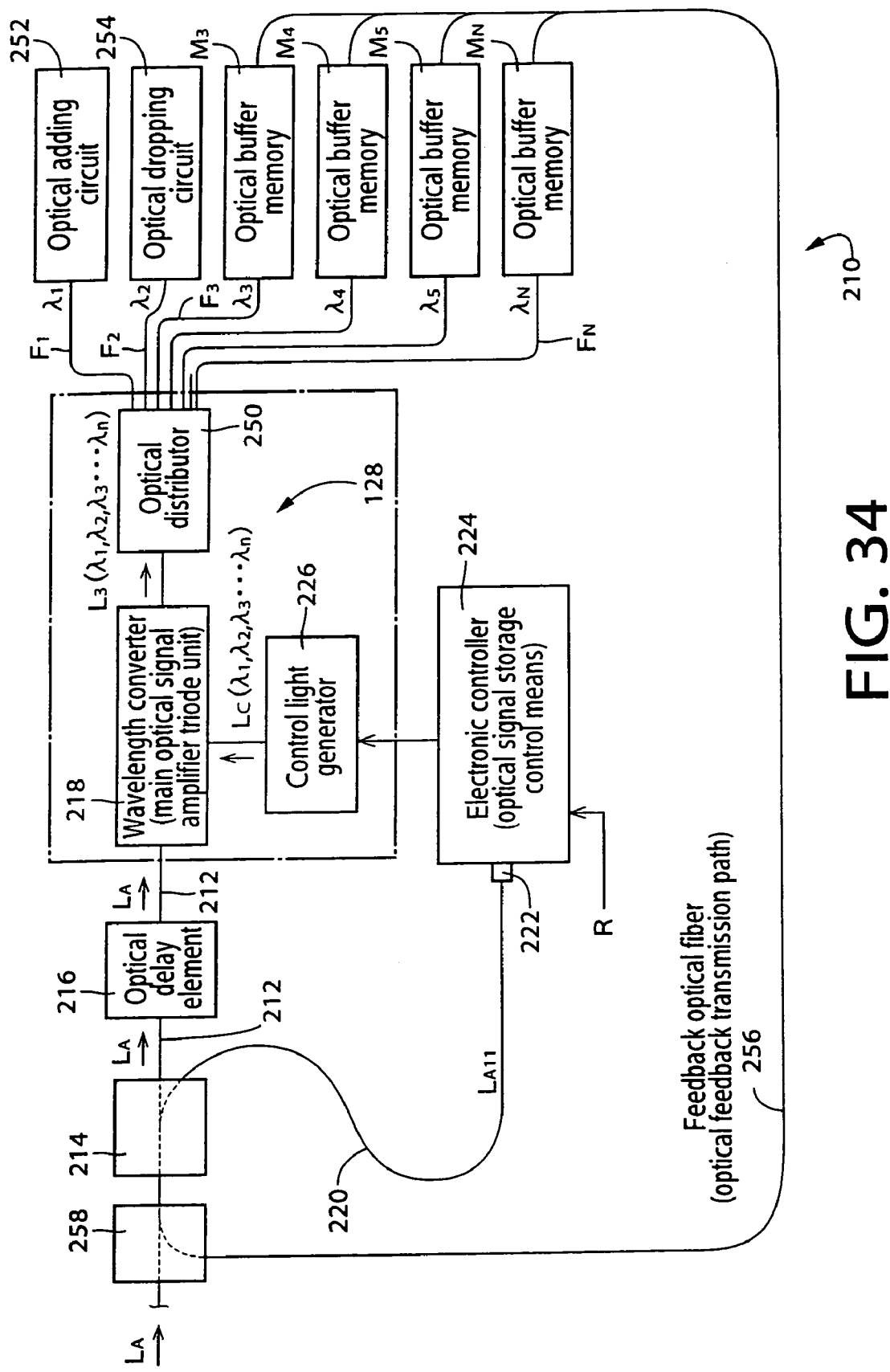
FIG. 34 is a schematic view illustrating the arrangement of an embodiment of an optical signal storage device.

FIG. 34 is a diagram illustrating the arrangement of the principal parts of an optical signal storage device 210. In FIG. 34, a first coupler 214, functioning as an optical splitter/multiplexer, an optical delay element 216, and a cross gain modulation type wavelength converter (optical switching device, main optical signal amplifying triode unit) 218 are successively connected to an optical fiber 212 that transmits an optical packet signal, optical data communication signal or other optical signal $L_A$ from an optical network, etc.

The optical delay element 216 delays the optical signal transmitted inside the optical fiber 212 for just a predetermined amount of time and is arranged, for example, by winding an optical fiber of predetermined length and thereby providing a propagation distance to delay the optical signal by the propagation time it takes for the optical signal to propagate across the predetermined propagation distance. The delay time of the optical delay element 216 is determined by experiment in advance so that the optical signal to be amplified inside the wavelength converter 218 will be synchronized with the control light that indicates the transmission destination of the optical signal by wavelength.

The branched optical signal, which is branched from the optical signal inside the optical fiber 212 by the first optical coupler 214, is supplied to an electronic controller 224, via an optical fiber 220 and a photoelectrical signal converter 222 connected thereto. The electronic controller 224 is, for example, arranged from a so-called microcomputer, wherein a CPU processes the input signal in accordance with a program stored in advance in a ROM and using the temporary storage function of a RAM. Based on a code signal, that is, routing information indicated by amplitude modulation and contained in the optical signal transmitted via the optical fiber 220, the electronic controller 224 supplies a wavelength command signal, corresponding to the routing information for routing the optical signal, to a control light generator 126. The electronic controller 224 extracts, for example, routing information contained in the optical signal $L_A$ input from the optical fiber 220 and makes control light $L_C$, which are in accordance with the wavelengths corresponding to the routing information, be generated from the control light generator 226.

The control light generator 226 has a control light source that outputs the control light $L_C$ of a plurality of priorly set types of wavelengths $\lambda_c$ and, in accordance with the command signal from the electronic controller 224, that is, in accordance with the wavelength command signal selected in accordance with the branching information contained in the optical signal $L_1$, supplies the control light $L_C$ of wavelengths $\lambda_c$ that correspond to the branching information to the wavelength converter 218. The control light generator 226 generates in an alternative or selective manner, control light $L_C$ of a plurality of types, for example, N types of wavelengths $\lambda_1, \lambda_2, \lambda_3, \ldots \lambda_N$ in correspondence to transfer destination output optical fibers $F_1$ to $F_N$. The FIG. 19, FIG. 20, and FIG. 21 of the above-described embodiments respectively illustrate arrangement examples of the control light generator 226. The optical fiber 212, the first optical coupler 214, the optical delay element 216, the wavelength converter 218, the optical fiber 220, the photoelectrical signal converter 222, the electronic controller 224, the control light generator 226, and the optical signal distributor 250 of the present embodiment are arranged in the same manner as the optical fiber 112, the first optical coupler 114, the optical delay element 116, the wavelength converter 118, the optical fiber 120, the photoelectrical signal converter 122, the electronic controller 124, the control light generator 126, and the optical signal distributor 150 of the above-described embodiments, and the wavelength converter 218 and the optical signal distributor 250 make up an optical signal amplifying triode 228 of the same arrangement as the optical signal amplifying triode 128.

Returning now to FIG. 34, output light $L_3$ from the wavelength converter 218 are selectively distributed by the optical distributor 250 in accordance with their wavelength, that is, in accordance with the wavelengths $\lambda_1, \lambda_2, \lambda_3, \ldots \lambda_N$ of the control light $L_C$ to cross-connected fibers $F_1$, $F_2$, $F_3$, ... $F_N$, which have been set in advance to correspond to a plurality of waveguides. Also, light of the same wavelength $\lambda_b$ as bias light $L_2$, which differs from the above wavelengths, is distributed to a branch optical fiber $F_b$. When, for example, the output light $L_3$ is a monochromatic light, it is distributed alternatively to one fiber among the cross-connected fibers $F_1$, $F_2$, $F_3$, . . . $F_N$, and in the case where output light $L_3$ are a mixture of two types, it is distributed to two sets among the cross-connected fibers $F_1$, $F_2$, $F_3$, . . . $F_N$. The cross-connected fibers $F_1$ and $F_2$ are connected to an optical adding circuit 252 for performing a multiplexing process on the optical signal $L_A$ and an optical dropping circuit 254 for performing a splitting process on the optical signal $L_A$, and the cross-connected fibers $F_3$ to $F_N$ are connected to optical buffer memory elements $M_3$ to $M_N$. These optical buffer memory elements $M_3$ to $M_N$ are delay elements, each of which is arranged, for example, by winding an optical fiber of predetermined length and outputs the optical signal $L_A$ upon delaying the signal by a delay time corresponding to the time of propagation inside the optical fiber of predetermined length.

The optical signal $L_A$, which is output from any of the above-mentioned optical buffer memory elements $M_3$ to $M_N$, is fed back, via a feedback optical fiber 256, which makes up an optical feedback transmission path, and a fifth optical coupler (optical multiplexer) 258, which is arranged in the same manner as the first optical coupler 214, to the optical fiber 212 at the upstream side of the first optical coupler 214 and is thereby circulated along a circulation path formed of the first optical coupler 214, the optical delay element 216, the wavelength converter 218, the optical distributor 250, one of the optical buffer memory elements $M_3$ to $M_N$, the feedback optical fiber 256, and the fifth optical coupler 258.

With the optical signal storage device 210, arranged as described above, the optical signal $L_A$, which is transmitted from the optical fiber 212, has the routing signals (labeling) contained therein extracted by the electronic controller 224 and so that it will be distributed to the transmission destinations indicated by the routing signals, the electronic controller 224 controls the control light generator 226 to output the control light $L_C$ of wavelengths corresponding to the routing signals. When the wavelength of the control light $L_C$ is $\lambda_1$, since the output light $L_3$, which is output from the wavelength converter 218, will be the optical signal $L_A$ of the wavelength $\lambda_1$, it is distributed by optical distributor 250 to the optical adding circuit 252 and thus multiplexed or branched. When the wavelength of the control light $L_C$ is $\lambda_2$, since the output light $L_3$, which is output from the wavelength converter 218, will be the optical signal $L_A$ of the wavelength $\lambda_2$, it is distributed by the optical distributor 250 to the optical dropping circuit 254 and thus multiplexed or branched.

However, in the case where it is unsuitable to transmit the optical signal $L_A$ immediately to the optical adding circuit 252 or the optical dropping circuit 254, the optical signal $L_A$ is taken out, by electronic processing by the electronic controller 224, after the receiving of a reading timing signal R from the exterior or after storage until the elapse of a storage time contained in the optical signal $L_A$. That is, if the wavelength of the control light $L_C$ that is output from the control light generator 226 to wavelength converter 218 is any of $\lambda_3$ to $\lambda_N$, that is, if for example this wavelength is $\lambda_3$, since the wavelength of the output light $L_3$ (optical signal $L_A$), output from the wavelength converter 218, will be $\lambda_3$, the light will be distributed by the optical distributor 250 to the optical buffer memory $M_3$. After being stored for a fixed amount of time in the optical buffer memory $M_3$, this optical signal $L_A$ is stored by being circulated repeatedly along the circulation path formed of the feedback optical fiber 256, the fifth optical coupler 258, the first optical coupler 214, the optical delay element 216, the wavelength converter 218, the optical distributor 250, and the optical buffer memory element $M_3$. When this optical signal $L_A$ that is in circulation passes through the wavelength converter 218, the wavelength of the control light $L_C$ that is output from the control light generator 226 to the wavelength converter 218 is made $\lambda_3$. When during the storage of such an optical signal $L_A$, another optical signal is input and is to be stored, it is converted in the same manner as described above to a wavelength that differs from the wavelength $\lambda_3$, that is for example to $\lambda_4$ and, in the same manner as described above, is stored by being circulated repeatedly along the circulation path formed of the feedback optical fiber 256, the fifth optical coupler 258, the first optical coupler 214, the optical delay element 216, the wavelength converter 218, the optical distributor 250, and the optical buffer memory element $M_4$.

And when, for example, the takeout timing signal R for takeout to the optical adding circuit 252 is supplied to the electronic controller 224 from the exterior, the electronic controller 224 makes the control light generator 226 generate the control light $L_C$ of the wavelength $\lambda_1$ in order to convert the optical signal $L_A$, which is circulated repeatedly along the circulation path formed of the feedback optical fiber 256, the fifth optical coupler 258, the first optical coupler 214, the optical delay element 216, the wavelength converter 218, the optical distributor 250, and the optical buffer memory element $M_3$, to the output wavelength $\lambda_1$ at the cross gain modulation type wavelength converter 218. As a result, the optical signal $L_A$ is distributed towards the optical adding circuit 252 by the optical distributor 250 and is thus output to the optical adding circuit 252. The electronic controller 224 thus also functions as an optical signal storage control means.

With the optical signal storage device 210 of the present embodiment, since the electronic controller 224, which functions as the optical signal storage control means, makes the control light generator 226 generate the control light $L_C$ of the wavelength $\lambda_1$ in order to convert the optical signal $L_A$, which is circulated repeatedly along the circulation path formed of the feedback optical fiber 256, the fifth optical coupler 258, the first optical coupler 214, the optical delay element 216, the wavelength converter 218, the optical distributor 250, and the optical buffer memory element $M_3$, to the output wavelength $\lambda_1$ at the cross gain modulation type wavelength converter 218, this optical signal $L_A$ is stored for an arbitrary amount of time and the optical signal $L_A$ is taken out an arbitrary timing (takeout time) in response to the output timing indicated by the stored output information (reading timing signal R) that is supplied from the exterior or is contained in the optical signal $L_A$.

Also with the present embodiment, since the electronic controller 224, which functions as the optical signal storage control means, makes the control light generator 226 generate the control light $L_C$ for conversion of the wavelength of the optical signal $L_A$, which is to be input into the cross gain modulation type wavelength converter 218, to a wavelength among the recording wavelengths $\lambda_3$ to $\lambda_N$, the storage of the optical signal $L_A$ is started by the input optical signal $L_A$ being converted in wavelength to a wavelength among the recording wavelengths $\lambda_3$ to $\lambda_N$ and thereby being circulated in the circulation transmission path that repeatedly passes through the cross gain modulation type wavelength converter 218, the optical distributor 250, one of the optical buffer memory elements $M_3$ to $M_N$, the optical feedback transmission path 256, the fifth optical coupler 258, the first optical coupler 214, and the optical delay element 216.

Also, with this embodiment, since (a) the first optical coupler (optical splitter) 214, which branches and thereby supplies the optical signal $L_A$, propagating inside the optical fiber 212, to the electronic controller 224, (b) the photoelectric converter 222, which converts the optical signal branched by the first optical coupler 214 into an electrical signal and supplies the electrical signal to the electronic controller 224, and (c) the optical delay element 216, which is disposed at the downstream side of the first optical coupler 214 along the optical fiber 212 and delays the optical signal $L_A$ to be input from the first optical fiber 212 into the cross gain modulation type wavelength converter 218 are provided, the electronic controller 224 makes the control light generator 226 generate the control light $L_C$ of wavelengths corresponding to the routing information contained in the optical signal $L_A$, and the cross gain modulation type wavelength converter 218, having a wavelength conversion function and a switching function, can thus output optical signals of wavelengths corresponding to the routing information and these signals can then be distributed by the optical distributor 250, a routing device, that is, an optical signal transfer device or optical signal relay device of high speed and compact size can be realized. Also, since while a portion of the optical signal $L_A$ is branched from the first optical coupler 214 and supplied to the electronic controller 224, the other portion of the optical signal $L_A$ is delayed by the optical delay element 218 and then supplied to the wavelength converter 216, despite the delay time used in the electronic signal processing by the electronic controller 224, the control light $L_C$, supplied from the control light generator 226 to the wavelength converter 218, are favorably synchronized with the optical signal $L_A$ at the wavelength converter 218.

Also with the present embodiment, since the cross gain modulation type wavelength converter 218 comprises (a) the first optical amplifier 236 and the second optical amplifier 244, each using cross gain modulation characteristics to amplify and perform wavelength conversion on input light and then outputting the resulting light, (b) the third coupler (first optical multiplexer) 232 that multiplexes the signal light $L_A$ of the first wavelength $\lambda_1$, which is input from the optical fiber 212, with the laser light (second input light, bias light) $L_2$, which is continuous light of the wavelength $\lambda_2$ that differs from that of the signal light $L_A$, and inputs the multiplexed light into the first optical amplifier 136, (c) the first wavelength selector 238 that selects light of the second wavelength $\lambda_2$ from among the light from the first optical amplifier 236, and (d) the fourth optical coupler (second multiplexer) 240 that multiplexes the light of the second wavelength $\lambda_2$, which has been selected by the first wavelength selector 238, with the control light $L_C$ of the third wavelength $\lambda_3$ and inputs the multiplexed light into the second optical amplifier 244, and the output light $L_3$ of the third wavelength $\lambda_3$ is light of the same wavelength as the control light $L_C$ and is modulated in response to the intensity variation of either or both of the signal light $L_1$ of the first wavelength $\lambda_1$ and the control light $L_C$ of the third wavelength $\lambda_3$, and since when the light of the second wavelength $\lambda_2$ that has been selected from the light from the first optical amplifier 236, into which the signal light $L_A$ and the laser light (second input light) $L_2$ have been input, and the control light $L_C$ are input into the second optical amplifier 244, the modulated light $L_3$ or the output light $L_4$ of the third wavelength $\lambda_3$ that is selected from the light output from the second optical amplifier 244 will thus be light that has been modulated in response to the intensity variation of either or both of the signal light $L_1$ and the control light $L_C$ and will be an amplified signal with a signal gain of 2 or more with respect to the control light $L_C$, the amplification process of the optical signal $L_1$ can be performed directly using the control light $L_C$.

Another embodiment of the optical signal storage device 210 shall now be described.

In order to restrain increase or decrease of the gain of the optical signal $L_A$, which is stored by being circulated in the circulation transmission path that repeatedly passes through the cross gain modulation type wavelength converter 218, the optical distributor 250, one of the optical buffer memory elements $M_3$ to $M_N$, the optical feedback transmission path 256, the fifth optical coupler 258, the first optical coupler 214, and the optical delay element 216, the electronic controller 224 may further comprise an optical signal gain controlling means that controls the circulated signal light $L_A$ or the control light $L_C$, which is supplied to the cross gain modulation type wavelength converter 218. That is, the electronic controller 224 controls the control light $L_C$ in accordance with a priorly stored program so as to make fixed the gain of the circulated signal light $L_A$, which is input via the first optical coupler 214 and the photoelectrical signal converter 222. For example, when the gain of the signal light $L_A$ drops, the gain of the control light $L_C$ is increased so that the signal light $L_A$ will be amplified at the cross gain modulation type wavelength converter 218, and when the gain of the signal light $L_A$ increases, the gain of the control light $L_C$ is decreased so that the signal light $L_A$ will be reduced at the cross gain modulation type wavelength converter 218.

Figure 35:
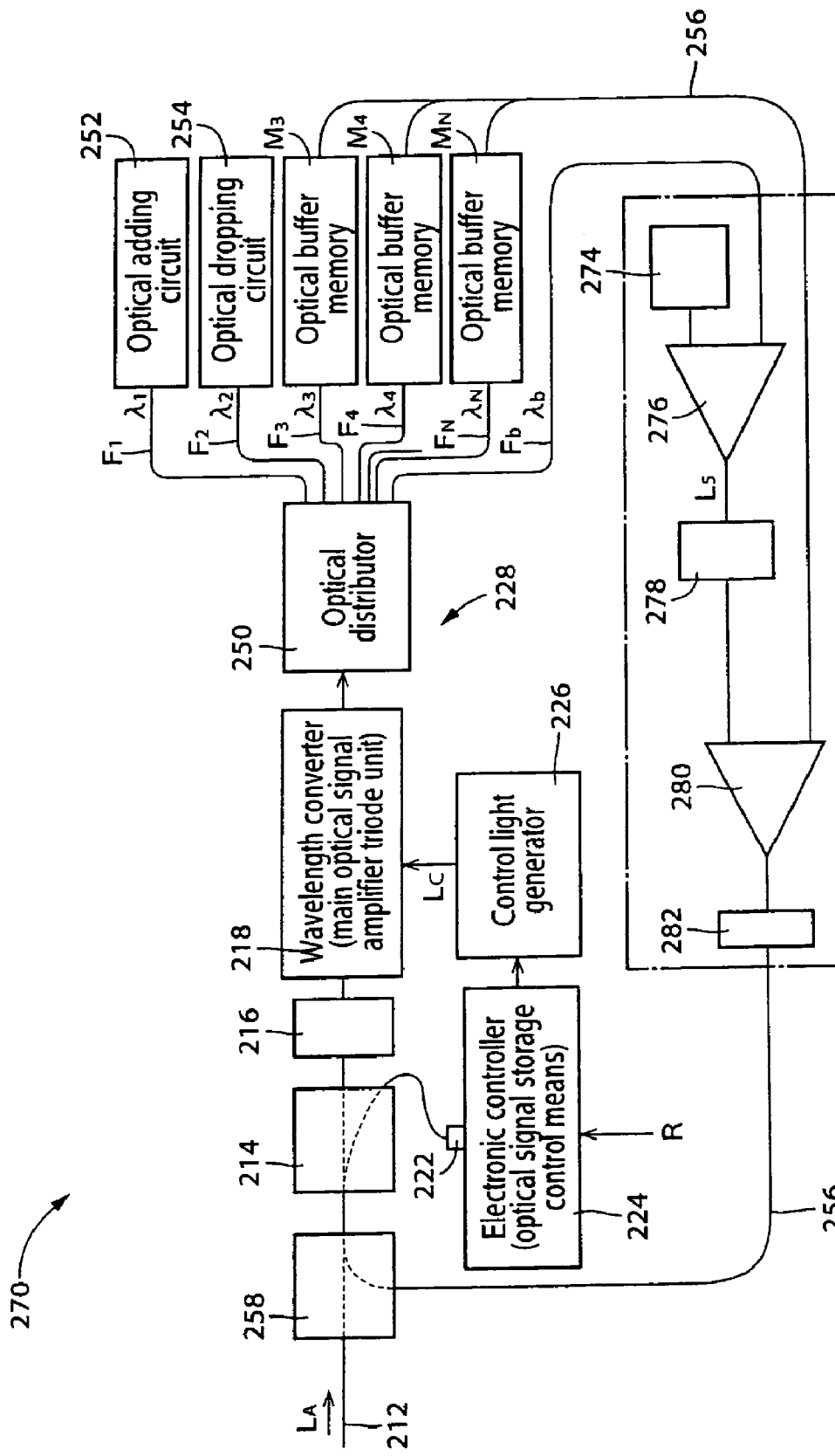
FIG. 35 is a schematic view illustrating the arrangement of another embodiment that differs from the optical signal storage device of FIG. 34.

FIG. 35 shows an optical signal storage device 270 of yet another embodiment. The optical signal storage device 270 of this embodiment differs from optical signal storage device 210 of the above-described embodiment in that a feedback optical amplifier 272, for restraining intensity fluctuations, such as oscillatory increase or attenuation, that accompany the storage time (number of times of circulation) of the circulated optical signal $L_A$, is interposed in the feedback optical fiber 256 and that, of the above-mentioned functions, the electronic controller 224 is not provided with the optical signal gain control function of controlling the control light $L_C$, supplied to the cross gain modulation type wavelength converter 218 to make fixed the gain of the optical signal $L_C$, which is stored by being circulated, and is otherwise arranged in the same manner. Also with the present embodiment, the response times (response characteristics) of a first gain control optical amplifier 276 and a second gain control optical amplifier 280 are set to be longer (slower) than those of the first optical amplifier 236 and the second optical amplifier 244. For example, either or each of the first gain control optical amplifier 276 and the second gain control optical amplifier 280 is arranged from an optical amplifier, which is slow in the response time of cross gain modulation, such as an optical amplifier, with which a three-level or four-level energy level system is formed inside a light transmitting medium, for example, by the doping of elemental erbium or other rare earth element inside an optical fiber or optical waveguide. By arranging with optical amplifiers of slow response times, the signal components of the circulated optical signal $L_A$ are smoothed and variation of the signal gains thereof are detected readily.

The feedback optical amplifier 272 corresponds to being the optical gain control means and amplifies the optical signal $L_A$, which is fed back to the feedback optical fiber 256, based on decrease of the gain of the light of the same wavelength $\lambda_b$ as the bias light $L_2$, contained in the output light from the second optical amplifier 244 of the wavelength converter 218. That is, the feedback optical amplifier 272 is equipped with a laser light source 274, outputting a fixed laser light of wavelength $\lambda_p$, the first gain control optical amplifier 276, receiving light, which is output via the fiber $F_b$ from the optical distributor 250 and is of the same wavelength $\lambda_b$ as the bias light $L_2$, and the laser light of the wavelength $\lambda_p$ and outputting a gain control light $L_5$ of the wavelength $\lambda_p$ that decreases in gain in accompaniment with an increase in gain of the light of the same wavelength $\lambda_b$ as the bias light $L_2$, a filter 278, transmitting light of the wavelength $\lambda_p$ from among the output light from the first gain control optical amplifier 276, a second gain control optical amplifier 280, receiving the light of the wavelength $\lambda_p$ that has been transmitted through the filter 278 and the optical signal $L_A$, which is fed back, and outputting the optical signal $L_A$ that increases in gain in accompaniment with a decrease in gain of the gain control light $L_5$, and a filter 282, transmitting the optical signal $L_A$ of any wavelength among the wavelengths $\lambda_3$ to $\lambda_N$ from among the output light from the second gain control optical amplifier 280 or not transmitting just light of the wavelength $L_5$. By the gain of the fed-back optical signal $L_A$ being increased or decreased by the second gain control optical amplifier 280 in accordance with a decrease or increase of the gain of the light of the same wavelength $\lambda_b$ as the bias light $L_2$ that is opposite the increase or decrease of the gain of the circulated optical signal $L_A$, the optical signal $L_A$ is restrained from increasing and decreasing in gain at each circulation and is thus maintained at a substantially fixed gain. Also with the present embodiment, since in addition to the same effects as the above-described embodiment, the effect that slow attenuation variations are restrained while fast response signals are kept as they are is provided, the merit that the optical signal $L_A$, which is circulated for storage, is restrained in the increase and decrease of gain and is maintained at a substantially fixed gain is provided.

Figure 36:
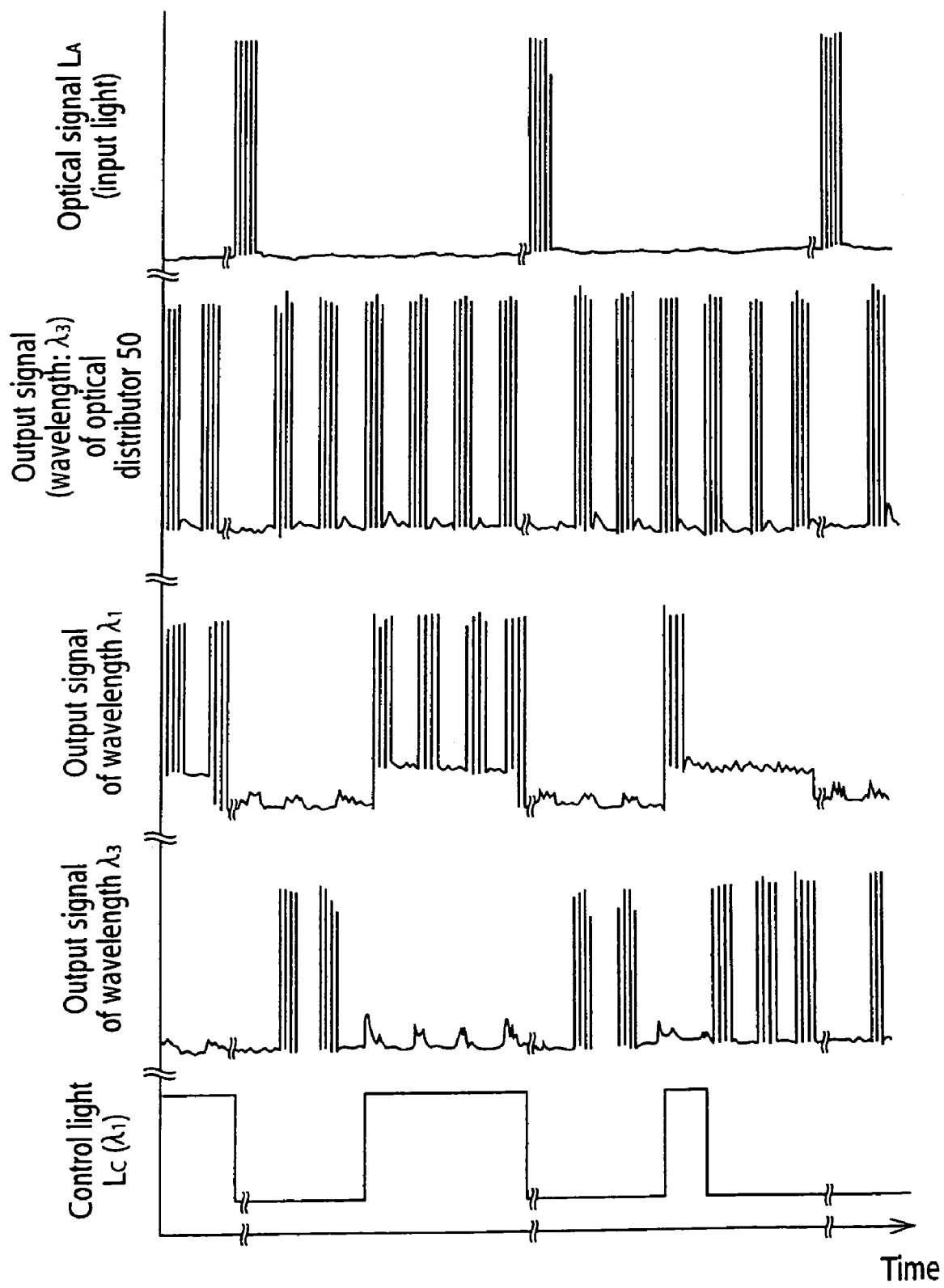
FIG. 36 shows time charts illustrating the optical signal storage actions of the optical signal storage device of FIG. 35.

FIG. 36 shows time charts that illustrate the actions of the optical signal storage device 270. When the optical signal $L_A$ is the signal to be stored, the optical signal $L_A$ that is input is converted in accordance with the control light $L_C$ ($\lambda_3$) to the storage wavelength, such as $\lambda_3$, at the wavelength converter 218, then distributed by the optical distributor 250 to the optical buffer memory $M_3$. The optical signal $L_A$ is thereafter circulated along the circulation path formed of the optical buffer memory $M_3$, the feedback optical fiber 256, the feedback optical amplifier 272, the feedback optical fiber 256, the fifth optical coupler 258, the wavelength converter 218, and the optical distributor 250. In this process, since the gain of the circulated optical signal $L_A$ is restrained from becoming attenuated and is held at a fixed level by the feedback optical amplifier 272, if the optical signal $L_A$ that is input is as shown in the top stage of FIG. 36, the optical signal $L_A$ that is circulated will be in the state shown in the stage below the top stage. In the case where the optical signal $L_A$, which is stored by such circulation, is to be taken out, just an arbitrary interval is converted at an arbitrary timing in accordance with the control light $L_C$ ($\lambda_1$) to the output wavelength, which for example is $\lambda_1$, at the wavelength converter 218 and is then output by the optical distributor 250 to the optical adding circuit 252. The waveform shown at the third stage from the bottom of FIG. 36 is the output waveform of this optical signal $L_A$. The second stage from the bottom of FIG. 36 shows the other output waveform that remains after the above-mentioned output.

Figure 37:
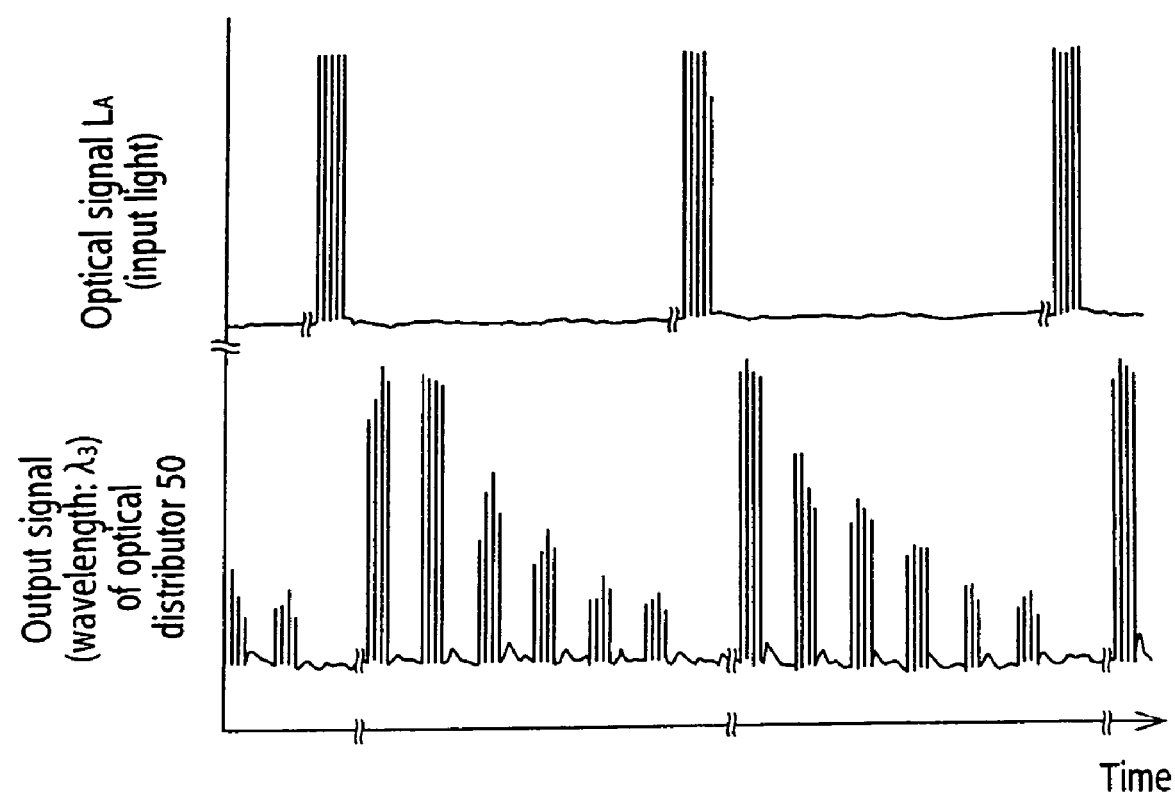
FIG. 37 shows time charts illustrating the optical signal storage actions of the optical signal storage device of FIG. 35 in the case where a feedback optical amplifier is not provided.

FIG. 37 shows the signal waveform in the case where the feedback optical amplifier 272 is not provided and the attenuation of the gain of the circulated optical signal $L_A$ is not restrained. This is the signal waveform, for example, in the case where the feedback optical amplifier 272 is not equipped in the optical signal storage device 270 or in the case where an optical signal gain control means is not equipped in the electronic control device 224 of the optical signal storage device 210 of FIG. 34. The top and bottom stages of this FIG. 37 correspond to the top stage and the stage below the top stage of FIG. 36.

Figure 38:
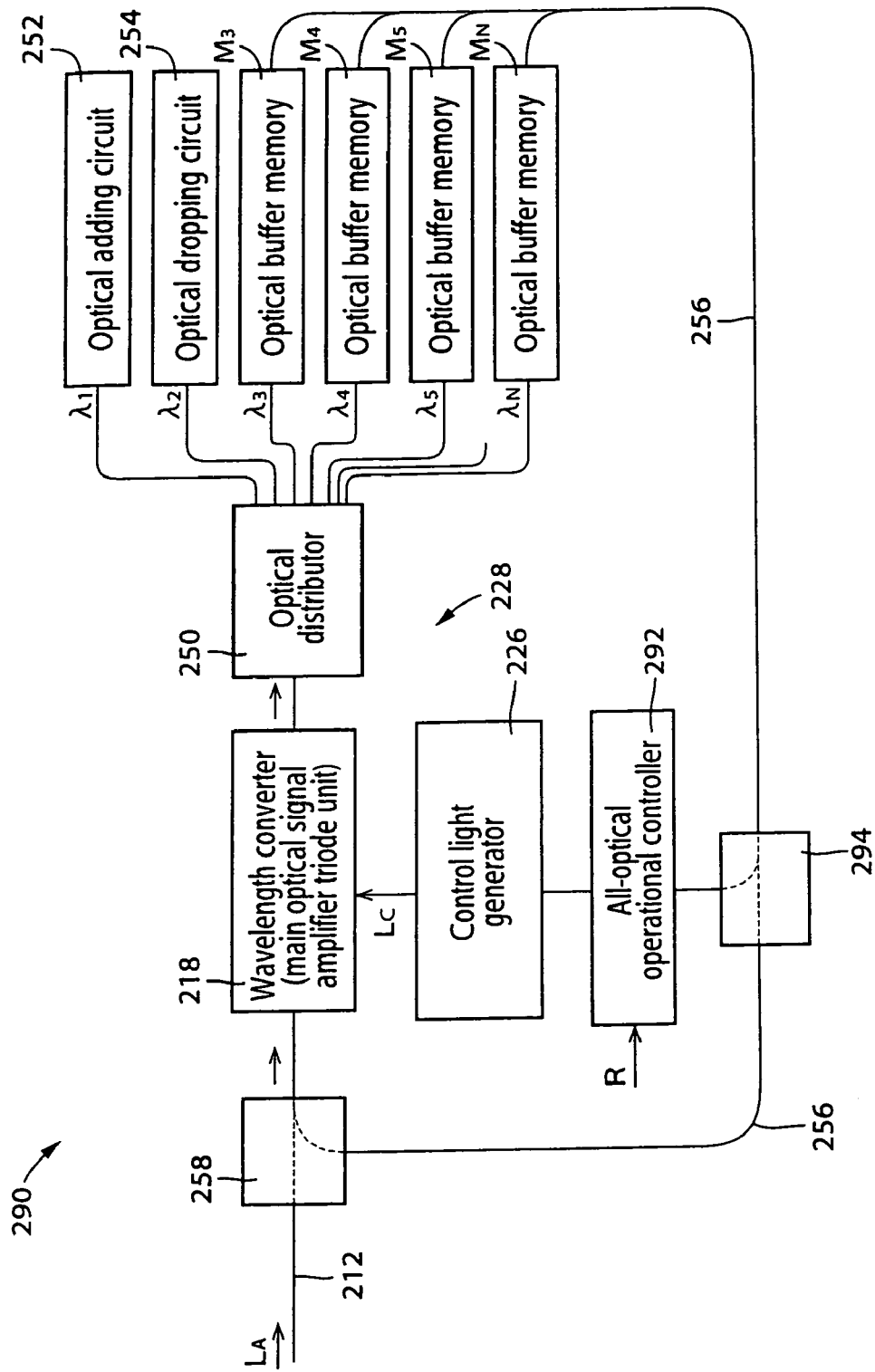
FIG. 38 is a schematic view illustrating the arrangement of another embodiment that differs from the optical signal storage devices of FIG. 34 and FIG. 35.

FIG. 38 shows an optical signal storage device 290 of another embodiment of this invention. This embodiment's optical signal storage device 290 differs from the optical signal storage device 210 of the above-described embodiment in that the optical delay element 216 and the first optical coupler 214 are omitted, an all-optical operational controller 292 is provided in place of the electronic controller 224, an optical coupler 294 of the same arrangement as the first optical coupler 214 is provided in order to branch a portion of optical signal $L_A$ that is fed back by the feedback optical fiber 256 and input this portion into the all-optical operational controller 292, and the all-optical operational controller 292 functions as the optical signal gain control means that restrains the attenuation that accompanies the storage time (number of times of circulation) of the circulated optical signal $L_A$ based on the attenuation, and is otherwise arranged in the same manner.

The all-optical operational controller 292 is equipped, for example, with N sets of optical control circuits, each comprising a laser light source, outputting continuous light of wavelength $\lambda_3$, an optical coupler, multiplexing the laser light of wavelength $\lambda_3$ with the reading timing signal R from the exterior, and a wavelength converter of the same arrangement as the cross gain modulation type wavelength converter 18 that receives the light multiplexed by the optical coupler and outputs the control light $L_C$ of wavelength $\lambda_3$ for just the reading interval of the reading timing signal R, and is thereby arranged to take out the optical signal $L_A$, which is stored by circulation, in response to the reading timing signal R that is supplied at an arbitrary timing. Also, the all-optical operational controller 292 is equipped with a low-response optical delay element, which receives the circulating optical signal $L_A$, supplied from the optical coupler 294, and forms an envelop curve that indicates the attenuation of the gain of the optical signal, and is arranged to supply the light indicating the attenuation curve of the wavelength $\lambda_3$ that is output from the optical delay element as the control light $L_C$ to the cross gain modulation type wavelength converter 218. Attenuation due to circulation of the optical signal $L_A$ of the wavelength $\lambda_3$, which is output from the cross gain modulation type wavelength converter 218, is thereby restrained. The present embodiment provides the same effects as the embodiment of FIG. 35.

Also, the optical distributor 250 may be an interference film type optical distributor. A multilayer filter that is classified as an interference film is arranged so as to reflect a specific wavelength by layering several dozen layers of an $SiO_2$ thin film and a $TiO_2$ thin film in alternating manner.

Also, in place of the electronic controller 224 of the above-described embodiments, an optical operational controller, arranged from an operational device, comprising a plurality of optical triodes, a laser light source, etc., may be used. By the use of an all-optical device in place of the electronic controller 224, the entirety of the optical signal storage device 210 becomes arranged from optical elements.

Also with the optical signal storage device 210 of the above-described embodiment, the numbers of the optical adding circuit 252, the optical dropping circuit 254, the optical buffer memories $M_3$ to $M_N$ may be changed variously and portions of these may be eliminated or added.

Also, for example with the cross gain modulation type wavelength converter 218, the wavelength $\lambda_c$ of the control light $L_C$ may be made the same as the wavelength $\lambda_1$ of the signal light $L_A$. In this case, the wavelength of the output light $L_3$ from the cross gain modulation type wavelength converter 18 will be the same as the wavelength $\lambda_1$ of the signal light $L_A$.

The above-described embodiments are simply examples of the present invention, and various modifications may be applied within a scope that does not fall outside the gist of the present inventions.

What is claimed is:

1. An optical signal storage device, storing an optical signal input from an input optical transmission path and enabling taking out of the optical signal at an arbitrary time, comprising:

a control light generator, generating control light for converting the optical signal input from the input optical transmission path to wavelengths, which correspond to the transmission destinations contained in the input signal and are the same as or different from that of the optical signal;

a main optical signal amplifying triode unit, receiving the optical signal that has been input and the control light and converting the optical signal that has been input to optical signals of the wavelengths of the control light;

an optical distributor, distributing the optical signals, output from the main optical signal amplifying triode unit, in accordance with the wavelengths of the optical signals;

an optical buffer memory element, temporarily storing an optical signal of a storage wavelength that has been distributed by the optical distributor;

an optical feedback transmission path, feeding back the optical signal output from the optical buffer memory element to the input optical transmission path to re-input the optical signal into the main optical signal amplifying triode unit; and an optical signal storage control means, making the control light generator output control light for conversion of the optical signal, which is repeatedly circulated through the main optical signal amplifying triode unit, optical distributor, optical buffer memory element, and the optical feedback transmission path, to an output wavelength at the main optical signal amplifying triode unit.

2. The optical signal storage device according to claim 1, further comprising an optical signal gain control means, controlling the optical signal, fed back by the optical feedback transmission path, or the control light supplied to the main optical signal amplifying triode unit in order to restrain the increase and decrease of the gain of the optical signal that is circulated.

3. The optical signal storage device according to claim 2, wherein the main optical signal amplifying triode unit comprises: a first semiconductor optical amplifier, which performs conversion to a wavelength of a bias light and inversion of the optical signal; and a second semiconductor optical amplifier, which performs conversion to the wavelength of the control light and inversion of the optical signal that has been inverted by the first semiconductor optical amplifier; and the optical signal gain control means controls the optical signal, fed back to the optical feedback transmission path, based on the increase or decrease of the gain of the bias light contained in the output light from the second semiconductor optical amplifier.

4. The optical signal storage device according to claim 2, wherein the optical signal gain control means comprises: a first gain control optical amplifier, receiving the bias light and a gain control light, which is a continuous light of a wavelength that differs from that of the bias light, and outputs a gain control light, which decreases in gain in accompaniment with an increase of the gain of the bias light; and a second gain control optical amplifier, receiving the output light from the first gain control optical amplifier and the optical signal, which is fed back by the optical feedback transmission path, and outputs an optical signal, which increases in gain in accompaniment with a decrease of the gain of the gain control light.

5. The optical signal storage device according to claim 4, wherein either or each of the first gain control optical amplifier and second gain control optical amplifier is arranged from an optical fiber amplifier or an optical waveguide amplifier into which a rare earth element is doped.

6. The optical signal storage device according to claim 2, wherein the optical signal gain control means comprises: an optical operational controller, which controls the gain of the control light supplied to the main optical signal amplifying triode unit based on the increase/decrease of the gain of the optical signal fed back by the optical feedback transmission path in order to maintain fixed the gain of the optical signal that is circulated.

7. The optical signal storage device according to claim 1, further comprising:

an electronic controller, controlling the control light generator;

a photoelectric signal converter, converting the optical signal branched by the optic splitter into an electrical signal and supplying the electrical signal to the electronic controller; and an optical delay element, disposed at the downstream side of the optical splitter and delaying the optical signal that is to be input into the main optical signal amplifying triode unit upon passage through optical splitter; and wherein the electronic controller makes the control light, for conversion of the optical signal to the output wavelength, be generated from the control light generator in response to an output timing indicated by stored signal output information that is supplied from the exterior or is contained in the optical signal.

8. The optical signal storage device according to claim 1, further comprising an all-optical operational controller, which makes the control light, for conversion of the optical signal to the output wavelength, be generated from the control light generator in response to an output timing indicated by stored signal output information that is supplied from the exterior or is contained in the optical signal.

* * * * *